(12) United States Patent
Hirayama et al.

(10) Patent No.: US 9,921,360 B2
(45) Date of Patent: Mar. 20, 2018

(54) ILLUMINATION DEVICE AND DISPLAY DEVICE

(71) Applicant: Sharp Kabushiki Kaisha, Osaka (JP)

(72) Inventors: Yoshinobu Hirayama, Osaka (JP); Shugo Yagi, Yonago (JP); Toru Inata, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/107,902

(22) PCT Filed: Dec. 18, 2014

(86) PCT No.: PCT/JP2014/083517
§ 371 (c)(1),
(2) Date: Jun. 23, 2016

(87) PCT Pub. No.: WO2015/098680
PCT Pub. Date: Jul. 2, 2015

(65) Prior Publication Data
US 2016/0320545 A1 Nov. 3, 2016

(30) Foreign Application Priority Data

Dec. 24, 2013 (JP) .................................. 2013-265543

(51) Int. Cl.
*F21V 8/00* (2006.01)

(52) U.S. Cl.
CPC ......... *G02B 6/0038* (2013.01); *G02B 6/0053* (2013.01); *G02B 6/0061* (2013.01); *G02B 6/0085* (2013.01); *G02B 6/0036* (2013.01)

(58) Field of Classification Search
CPC .................. G02F 2001/133607; G02B 6/0038
See application file for complete search history.

(56) References Cited

U.S. PATENT DOCUMENTS

| 2008/0008434 A1 | 1/2008 | Lee et al. |
| 2009/0122229 A1* | 5/2009 | Kim ..................... G02B 6/0038 349/65 |

(Continued)

FOREIGN PATENT DOCUMENTS

| JP | 9-61631 A | 3/1997 |
| JP | 2009-122637 A | 6/2009 |

(Continued)

OTHER PUBLICATIONS

U.S. Appl. No. 15/105,537, filed Jun. 16, 2016.

*Primary Examiner* — Edmond Lau
(74) *Attorney, Agent, or Firm* — Chen Yoshimura LLP

(57) ABSTRACT

A backlight device is provided with: LEDs; a light guide plate having a light-receiving face, a light-exiting surface, and an opposite plate surface; a prism sheet including a plurality of light-exiting side unit prisms aligned along a second direction; a light-exiting surface-side prism portion including a plurality of light-exiting surface-side prism units aligned along the second direction; a light emission reflection portion including a plurality of reflection units aligned along a first direction at an interval; an opposite plate surface-side prism portion including a plurality of opposite plate surface-side unit prisms aligned along the second direction; and bow-shaped portions disposed into such a form as to be adjacent to the light-exiting surface-side prism units in the second direction while extending along the first direction, the bow-shaped portions having a bow-shaped cross-section.

13 Claims, 46 Drawing Sheets

(56) References Cited

U.S. PATENT DOCUMENTS

| | | | |
|---|---|---|---|
| 2010/0165243 A1 | 7/2010 | Yoon et al. | |
| 2013/0170250 A1* | 7/2013 | Kikuchi | G02B 6/0038 |
| | | | 362/609 |
| 2013/0194823 A1 | 8/2013 | Yagi et al. | |
| 2014/0146561 A1* | 5/2014 | Yuki | G02B 6/0035 |
| | | | 362/606 |
| 2016/0313496 A1 | 10/2016 | Hirayama et al. | |

FOREIGN PATENT DOCUMENTS

| | | |
|---|---|---|
| JP | 2011-14442 A | 1/2011 |
| JP | 2012-104390 A | 5/2012 |
| JP | 2012-113890 A | 6/2012 |
| WO | 2012/050121 A1 | 4/2012 |

* cited by examiner

FIG. 16
| | Comparative Example 1 | Working Example 1 |
|---|---|---|
| Picture | 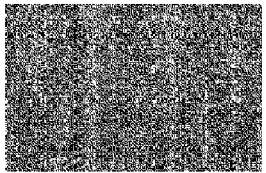 | 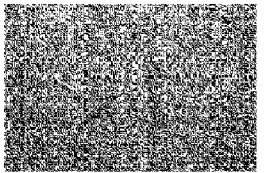 |
| Uneven Brightness | Slightly Uneven | Not Uneven |

ILLUMINATION DEVICE AND DISPLAY DEVICE

TECHNICAL FIELD

The present invention relates to an illumination device and a display device.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. In the liquid crystal display device, a liquid crystal panel used therein does not emit light, and therefore, it is necessary to separately provide a backlight device as an illumination device. Backlight devices are largely categorized into a direct-lighting type and an edge-lighting type depending on the mechanism thereof. Edge lit backlight devices include a light guide plate that guides light emitted from light sources disposed on the edge, and an optical member that applies optical effects on the light from the light guide plate and supplies the light as even planar light to the liquid crystal panel, and one known example thereof is the matter disclosed in Patent Document 1 below. Patent Document 1 discloses a configuration in which a light guide plate has a light focusing function by arranging a plurality of cylindrical lenses on the light-exiting surface of the light guide plate, and a prism sheet is disposed on the light-exiting surface.

RELATED ART DOCUMENT

Patent Document

Patent Document 1: WO 2012/050121

Problems to be Solved by the Invention

In Patent Document 1 mentioned above, a configuration is adopted in which the light focusing effect is heightened by the cylindrical lenses provided on the light-exiting surface of the light guide plate having the same light focusing direction as the prism sheet disposed on the light-exiting surface. However, if further improvement in luminance of the backlight device is needed, then there is a risk that the light focusing effect is insufficient with the configuration above, and there is room for improvement. On the other hand, if the light focusing effect were simply heightened, then this would pose the risk of increased susceptibility to uneven luminance, and it was difficult to balance improvement of luminance with mitigation of uneven luminance.

SUMMARY OF THE INVENTION

The present invention was completed in view of the above-mentioned situation, and an object thereof is to achieve a balance between improvement of luminance and mitigation of uneven luminance.

Means for Solving the Problems

An illumination device of the present invention includes: a light source; a light guide plate having a rectangular plate shape, a light-receiving face formed from at least one of a pair of edge faces forming opposing sides among outer edge faces of the light guide plate and into which light emitted by the light source is radiated, a light-exiting surface formed from one plate surface of the light guide plate and from which light exits, and an opposite plate surface formed from another plate surface of the light guide plate; and a light-exiting side anisotropic light focusing member disposed on a light-exiting side of the light guide plate, the light-exiting side anisotropic light focusing member being formed by arranging a plurality of light-exiting side light focusing units that extend along a first direction in a second direction, the first direction being parallel to a pair of edge faces of the light guide plate that do not include the light-receiving face, and the second direction being perpendicular to the first direction, wherein the light guide plate further includes: a light-exiting surface-side anisotropic light focusing prism that is disposed in the light-exiting surface of the light guide plate, and that is formed by arranging a plurality of light-exiting surface-side light focusing prism units, extending in the first direction, along the second direction; a light emission reflection portion that is disposed in the opposite plate surface of the light guide plate and that is formed by arranging a plurality of reflection units, extending in the second direction, along the first direction with gaps therebetween; an opposite plate surface-side anisotropic light focusing portion that is disposed in the opposite plate surface of the light guide plate, and that is formed by arranging a plurality of opposite plate surface-side light focusing units, extending in the first direction, along the second direction; and bow-shaped portions that are arranged adjacent in the second direction to the light-exiting surface-side prism units in the light-exiting surface of the light guide plate, and that extend in the first direction and have a bow shaped cross-section in the second direction.

In this manner, light emitted from the light source enters the light-receiving face of the light guide plate, is propagated inside the light guide plate, and in the process is reflected by the light emission reflection portions disposed in the opposite plate surface of the light guide plate. The light emission reflection portions formed by arranging a plurality of reflection units, extending in the second direction, along the first direction with gaps therebetween, and thus, by reflecting light traveling in the light guide plate along the first direction off of the plurality of reflection units, the light can be caused to travel upward towards the light-exiting surface. In this manner, it is possible to cause the light to be emitted from the light-exiting surface.

The light that has reached the light-exiting surface of the light guide plate is anisotropically focused by the light-exiting surface-side anisotropic light focusing prism portion disposed in the light-exiting surface of the light guide plate. In other words, the light-exiting surface-side anisotropic light focusing prism portion has a configuration in which a plurality of light-exiting surface-side prism units, extending along the first direction, are arranged in the second direction, and thus, the light emitted from the light-exiting surface-side prism units is selectively focused in the second direction, which is the direction along which the light-exiting surface-side prism units are aligned. The light emitted from the light-exiting surface is further anisotropically focused by the light-exiting side anisotropic light focusing member disposed on the light-exiting side of the light guide plate. In other words, the light-exiting side anisotropic light focusing member has a configuration in which a plurality of light-exiting side unit light focusing units, extending along the first direction, are arranged in the second direction, and thus, the light emitted from the light-exiting side unit light focusing unit is selectively focused in the second direction, which is the direction along which the light-exiting side unit light focusing units are aligned.

In this manner, the light emitted from the illumination device is first selectively focused in the second direction by the light-exiting surface-side anisotropic light focusing prism portion, and then selectively focused in the second direction by the light-exiting side anisotropic light focusing member, causing the light to travel towards the front in an excellent manner. However, when the light that has been anisotropically focused by the light-exiting surface-side anisotropic light focusing prism portion has entered the light-exiting side anisotropic light focusing member, there is still a lot of light that is retroreflected by the light-exiting side unit light focusing units, which means that the usage rate of light is not sufficiently high, which has meant that there is room for improvement in the luminance of light emitted by the illumination device.

However, the opposite plate surface-side anisotropic light focusing portion is disposed in the opposite plate surface of the light guide plate, and the opposite plate surface-side anisotropic light focusing portion has a configuration in which a plurality of opposite plate surface-side unit light focusing units, extending along the first direction, are arranged along the second direction, and thus, the light that was propagated in the light guide plate and has reached the opposite plate surface is selectively focused in the second direction, which is the direction along which the opposite plate surface-side unit light focusing units are aligned. The light that has been anisotropically focused at the opposite plate surface is caused to travel upward towards the light-exiting surface by the light emission reflection portions and then further selectively focused in the second direction by the light-exiting surface-side anisotropic light focusing prism portion at the light-exiting surface. In this manner, it is possible to include, in the light that was emitted from the light-exiting surface towards the light-exiting side anisotropic light focusing member, a large portion of light that would be emitted by the light-exiting side unit light focusing units without being retroreflected. In this manner, the usage rate of light can be sufficiently increased, and it is possible to increase the luminance of light emitted by the illumination device. Furthermore, as a result of the opposite plate surface-side anisotropic light focusing portion being disposed in the opposite plate surface of the light guide plate, it is possible to decrease the number of parts required and to contribute to the thinning of the illumination device, compared to an arrangement whereby an anisotropic light focusing portion is added to the light-emitting side of the light guide plate.

Additionally, bow-shaped portions that are arranged adjacent in the second direction to the light-exiting surface-side prism units on the light-exiting surface of the light guide plate, and that extend in the first direction and have a bow shaped cross-section in the second direction are provided, and thus, the light that was propagated inside the light guide plate and that has reached the light-exiting surface includes components that are totally reflected off of the surface of the bow-shaped portions, which are arc-shaped in a cross-sectional view, and returned to the opposite plate surface. The light that is returned to the opposite plate surface by the surface of the bow-shaped portions is scattered to a greater degree in the second direction and propagated in the light guide plate compared to the light that was totally reflected by the light-exiting surface-side prism units and returned to the opposite plate surface. Thus, the light emitted by the illumination device is less susceptible to uneven luminance. In this manner, it is possible to achieve a balance between improvement of luminance and mitigation of uneven luminance for the light emitted by the illumination device.

As embodiments of the illumination device of the present invention, the following configurations are preferred.

(1) The light-exiting surface-side prism units and the bow-shaped portions are arranged such that, with respect to proportions occupied by each in the light-exiting surface in the second direction, the proportion occupied by the light-exiting surface-side prism units is low and the proportion occupied by the bow-shaped portions is high in areas close to the light-receiving face in the first direction, whereas the proportion occupied by the light-exiting surface-side prism units is high and the proportion occupied by the bow-shaped portions is low in areas far from the light-receiving face in the first direction. Areas of the light guide plate close the light-receiving face in the first direction are more susceptible to uneven luminance in light emitted from the light-exiting surface compared to areas far from the light-receiving face, whereas areas far from the light-receiving face in the first direction are more susceptible to insufficient luminance in light emitted from the light-exiting surface compared to areas close to the light-receiving face. By contrast, the proportion of the light-exiting surface occupied in the second direction is lowest for the light-exiting surface-side prism units and highest for the bow-shaped portions in areas close to the light-receiving face in the first direction, and thus, in areas close to the light-receiving face in the first direction where uneven luminance is of concern, uneven luminance is more suitably mitigated by the bow-shaped portions. Additionally, the proportion of the light-exiting surface occupied in the second direction is highest for the light-exiting surface-side prism units and lowest for the bow-shaped portions in areas far from the light-receiving face in the first direction, and thus, in areas far from the light-receiving face in the first direction where insufficient luminance is of concern, luminance is more suitably improved by the light-exiting surface-side prism units. In this manner, it is possible to more suitably achieve a balance between improvement of luminance and mitigation of uneven luminance for the light emitted by the illumination device.

(2) The light-exiting surface-side prism units and the bow-shaped portions are arranged such that the proportion in the light-exiting surface occupied by the light-exiting surface-side prism units gradually and continuously increases farther away from the light-receiving face in the first direction, whereas the proportion in the light-exiting surface occupied by the bow-shaped portions gradually and continuously decreases farther away from the light-receiving face in the first direction. In this manner, compared to a case in which the proportion of the light-exiting surface occupied by the light-exiting surface-side prism units and the bow-shaped portions were changed in a stepwise fashion, it is possible to more suitably mitigate uneven luminance and to suitably improve luminance.

(3) In the light guide plate, one of the pair of edge faces that are opposite sides among the outer edge faces is the light-receiving face, whereas another of the pair of edge faces is a non-light-receiving opposite face into which light from the light source is not radiated, and the light-exiting surface-side prism units and the bow-shaped portions are arranged such that, from the light-receiving face to the non-light-receiving opposite face in the first direction, the proportion in the light-exiting surface occupied by the light-exiting surface-side prism units gradually and continuously increases, whereas the proportion in the light-exiting surface occupied by the bow-shaped portions gradually and continuously decreases. In this manner, the edge of the light guide plate towards the light-receiving face in the first direction is more susceptible to uneven luminance in light emitted from the light-exiting surface, whereas the edge towards the non-light-receiving opposite face in the first direction is more susceptible to insufficient luminance in light emitted from the light-exiting surface. However, whereas the proportion of the light-exiting surface occupied in the second direction by the light-exiting surface-side prism units gradually and continuously increases from the light-receiving face towards the non-light-receiving opposite face in the first direction, the same proportion occupied by the bow-shaped portions gradually and continuously decreases from the light-receiving face towards the non-light-receiving opposite face, and thus, at the edge of the light guide plate towards the light-receiving face in the first direction, uneven luminance is more suitably mitigated, and at the edge towards the non-light-receiving opposite face in the first direction, luminance is more suitably increased. In this manner, it is possible to more suitably achieve a balance between improvement of luminance and mitigation of uneven luminance for the light emitted by the illumination device.

(4) The proportion in the light-exiting surface occupied by the light-exiting surface-side prism units is 100% of the light-exiting surface in portions farthest from the light-receiving face in the first direction. In this manner, compared to a case in which the bow-shaped portions were provided in portions farthest from the light-receiving face in the first direction, it is possible to more suitably mitigate uneven luminance and increase luminance. In portions farthest from the light-receiving face in the first direction, it is typically difficult to see uneven luminance, and thus, the effect of mitigating uneven luminance by the bow-shaped portions need not be attained (5) The bow-shaped portions are arranged such that a width and a height of the light-exiting surface-side prism units gradually and continuously increase farther away from the light-receiving face in the first direction, whereas vertex angles of the bow-shaped portions remain the same. By the width of the light-exiting surface-side prism units gradually and continuously increasing farther away from the light-receiving face in the first direction, the proportion of the light-exiting surface occupied by the light-exiting surface-side prism units in the second direction similarly gradually and continuously increases. The optical characteristics, that is, the light focusing characteristics of the light-exiting surface-side prism units change depending on the vertex angle. Also, by the height of the light-exiting surface-side prism units gradually and continuously increasing in portions farther away from the light-receiving face in the first direction, the vertex angle thereof remains the same, and thus, the optical characteristics are not susceptible to changing along the first direction. As a result, it is possible to suitably mitigate uneven luminance.

(6) The bow-shaped portions are arranged such that one edge in the second direction is continuous with an inclined surface of the light-exiting surface-side prism unit, whereas another edge in the second direction is at a lower position than the one edge. In this manner, compared to a case in which both edges of the bow-shaped portion in the second direction were disposed at the same height as the other edge, the surface area of the light-exiting surface-side prism units becomes smaller in proportion to the degree to which the one edge in the second direction of the bow-shaped portion is continuous with the inclined surface of the light-exiting surface-side prism unit and higher than the other edge. In this manner, the light focusing effect on light by the light-exiting surface-side anisotropic light focusing prism portion is mitigated, enabling a relative reduction in uneven luminance by the bow-shaped portions. In addition, compared to a case in which both edges of the bow-shaped portion in the second direction were disposed at the same height as the one edge, the surface area of the bow-shaped portions is increased, and thus, uneven luminance is mitigated to a greater degree by the bow-shaped portions. As a result, it is possible to suitably mitigate uneven luminance.

(7) The light-exiting surface of the light guide plate is provided with flat portions that are flat along the first direction and the second direction, and that are disposed so as to be adjacent to the bow-shaped portions in the second direction. In this manner, some of the light that was propagated in the light guide plate and that has reached the light-exiting surface is totally reflected by the bow-shaped portions and returned back to the opposite plate surface, and some of the light is totally reflected by the flat portions and returned back to the opposite plate surface. The light that is returned to the opposite plate surface by the flat portions spreads in the second direction and is propagated in the light guide plate compared to the light that was totally reflected by the light-exiting surface-side prism units and returned to the opposite plate surface, but the direction of travel of the light differs from that of the light returning towards the opposite plate surface as a result of the bow-shaped portions. In this manner, light that is being propagated in the light guide plate is scattered in various directions along the second direction, and thus, uneven luminance can be mitigated in a more suitable manner.

(8) A plurality of the light-exiting surface-side prism units forming the light-exiting surface-side anisotropic light focusing prism portion include a first light-exiting surface-side prism unit having a vertex portion at a relatively low position, and a second light-exiting surface-side prism unit having a vertex portion at a relatively high position, and a gap is present between the first light-exiting surface-side prism unit and the light-exiting side anisotropic light focusing member. In this manner, a gap is formed between the first light-exiting surface-side prism units included among the plurality of light-exiting surface-side prism units and the light-exiting side anisotropic light focusing member, which means that the light-exiting side anisotropic light focusing member is less susceptible to sticking to the light-exiting surface-side prism unit. In this manner, it is possible to mitigate the occurrence of uneven luminance for the light emitted by the illumination device.

(9) The bow-shaped portions are interposed between the first light-exiting surface-side prism units and the second light-exiting surface-side prism units in the second direction. In this manner, the light that has reached the light-exiting surface is totally reflected at the surface of the bow-shaped portions, enabling the totally reflected light to travel towards the first light-exiting surface-side prism units or the second light-exiting surface-side prism units, which are adjacent to each other in the second direction. Thus, compared to a case in which the first light-exiting surface-side prism units and the second light-exiting surface-side prism units are adjacent to each other in the second direction without the bow-shaped portions therebetween, the effect of mitigating uneven luminance by the bow-shaped portions can be more suitably achieved.

(10) The first light-exiting surface-side prism units and the second light-exiting surface-side prism units are arranged such that a proportion occupied by both in the light-exiting surface in the second direction gradually and continuously increases farther away from the light-receiving face in the first direction. In this manner, in portions towards the light-receiving face in the first direction where insufficient luminance is of concern, the light-exiting surface-side prism units can more suitably increase luminance.

(11) The light-exiting surface-side prism units and the bow-shaped portions both occupy, along an entire length of the light guide plate in the first direction, the same proportions in the light-exiting surface in the second direction. In this manner, the light-exiting surface-side prism units and the bow-shaped portions disposed in the light-exiting surface of the light guide plate have a simple structure, and thus, are easier to manufacture, and the shapes of the light-exiting surface-side prism units and the bow-shaped portions are easier to reproduce.

Next, in order to achieve the above-mentioned object, a display device of the present invention includes the above-mentioned illumination device and a display panel that performs display using light from the illumination device.

According to the display device configured in this manner, the front luminance of light emitted by the illumination device is high and unevenness in the luminance is unlikely, and thus, high display quality can be attained.

Examples of the display panel include a liquid crystal panel. Such a display device can be applied as a liquid crystal display device to various applications such as displays for smartphones and tablet PCs, for example.

Effects of the Invention

According to the present invention, it is possible to achieve a balance between improvement of luminance and mitigation of uneven luminance.

BRIEF DESCRIPTION OF THE DRAWINGS

FIG. 16 is a table of Comparison Experiment 1 showing photographs taken from the light-exiting surface of light guide plates of Comparison Example 1 and Working Example 1, and determination results for uneven luminance.

DETAILED DESCRIPTION OF EMBODIMENTS

Embodiment 1

Embodiment 1 of the present invention will be described with reference to FIGS. 1 to 10. In the present embodiment, a liquid crystal display device 10 will be described as an example. The drawings indicate an X axis, a Y axis, and a Z axis in a portion of the drawings, and each of the axes indicates the same direction for the respective drawings. The up-and-down direction is based on that of FIGS. 3 to 5, and the upper side thereof is the front side while the lower side thereof is the rear side.

Figure 1:
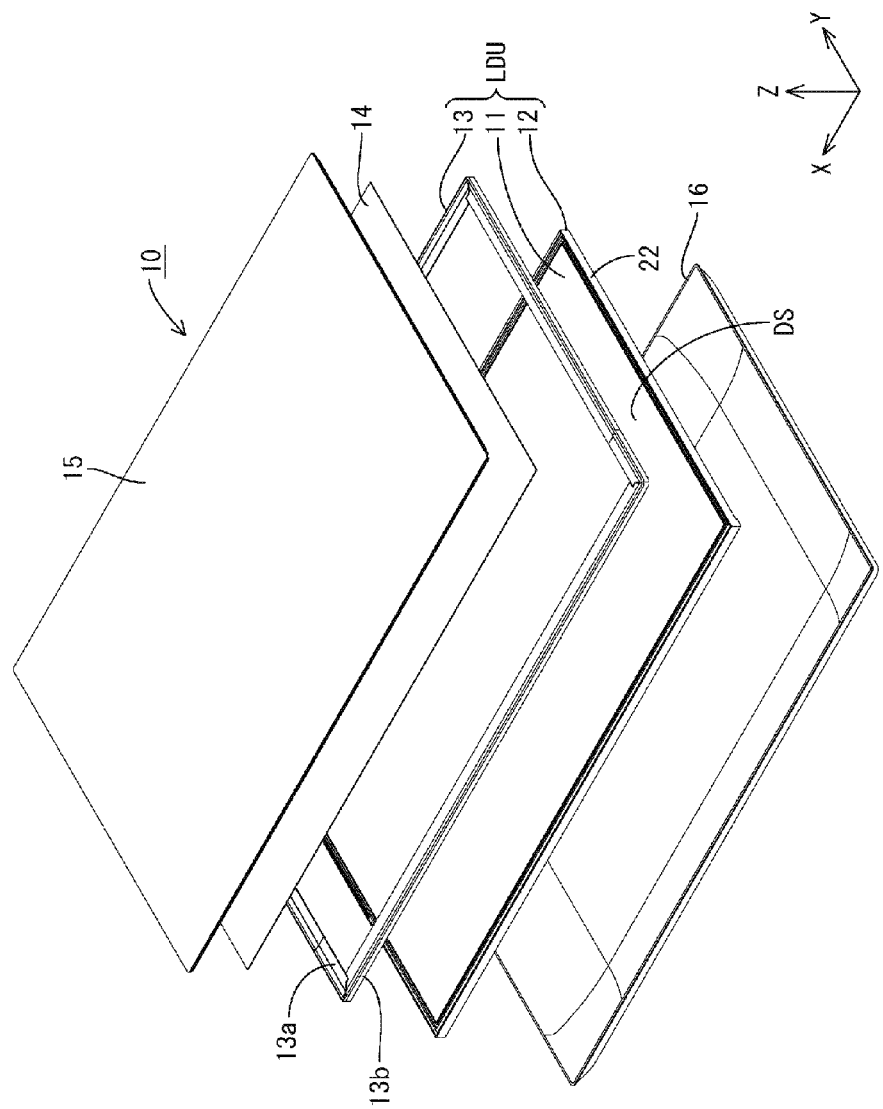
FIG. 1 is an exploded perspective view schematically showing a liquid crystal display device according to Embodiment 1 of the present invention.

As shown in FIG. 1, the liquid crystal display device 10 is formed in a rectangular shape overall in a plan view, and is made by assembling together parts such as a touch panel 14, a cover panel 15 (protective panel, cover glass), and a casing 16 onto a liquid crystal display unit LDU, which is the main part. The liquid crystal display unit LDU has a liquid crystal panel 11 (display panel) having a display surface DS on the front that displays images, a backlight device 12 (illumination device) that is disposed on the rear of the liquid crystal panel 11 and radiates light towards the liquid crystal panel 11, and a frame 13 (case member) that presses the liquid crystal panel 11 from the front, or in other words from the side opposite to the backlight device 12 (from the display panel DS side). The touch panel 14 and the cover panel 15 are housed within the frame 13 of the liquid crystal display unit LDU from the front, and the outer portions (including the outer edges) are received by the frame 13 from the rear. The touch panel 14 is disposed on the front of the liquid crystal panel 11 at a prescribed gap therefrom, and the rear surface (inner surface) thereof opposes the display surface DS. The cover panel 15 covers the touch panel 14 from the front, and the rear surface (inner surface) of the cover panel 15 opposes the front surface of the touch panel 14. An antireflective film AR is interposed between the touch panel 14 and the cover panel 15 (see FIG. 5). The casing 16 is assembled to the frame 13 to cover the liquid crystal display unit LDU from the rear. Of the components of the liquid crystal display device 10, a portion of the frame 13 (looped portion 13*b* described later), the cover panel 15, and the casing 16 constitute the outer appearance of the liquid crystal display device 10. The liquid crystal display device 10 of the present embodiment is used in electronic devices such as tablet PCs, for example, and the display size thereof is approximately 20 inches, for example.

Figure 3:
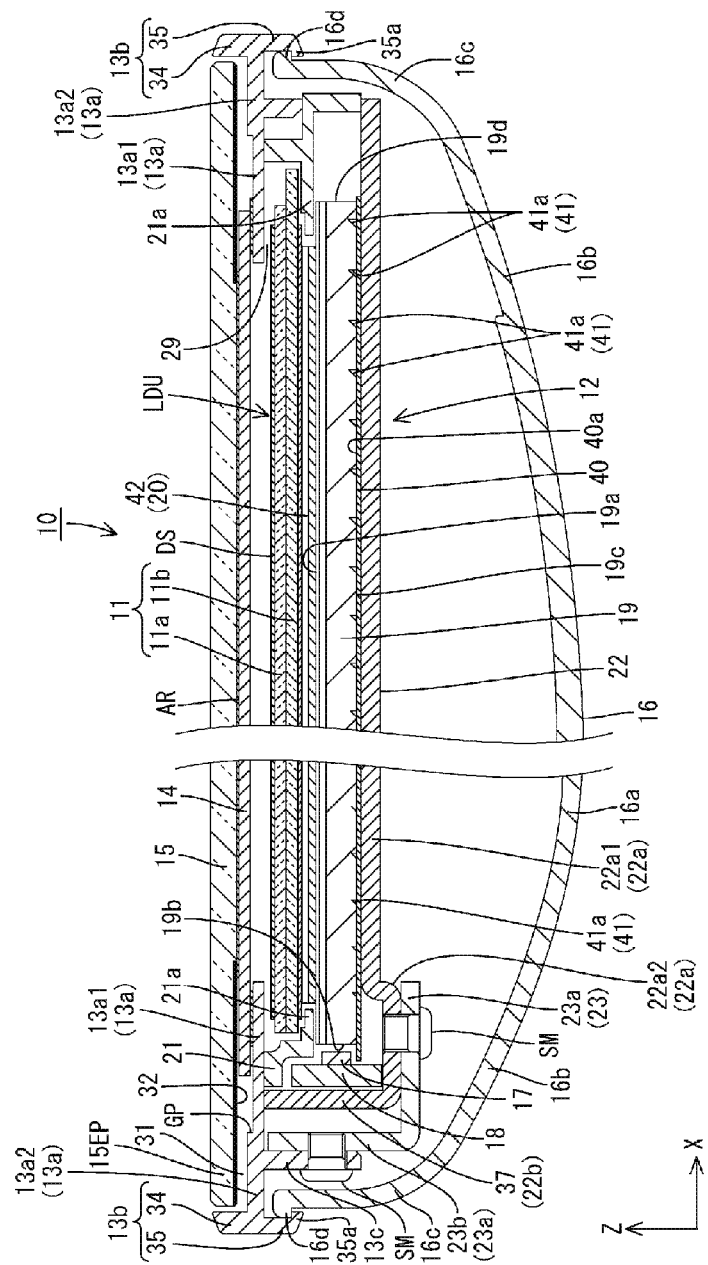
FIG. 3 is a cross-sectional view of a configuration of the liquid crystal display device along the longer side direction (first direction, X axis direction).
Figure 4:
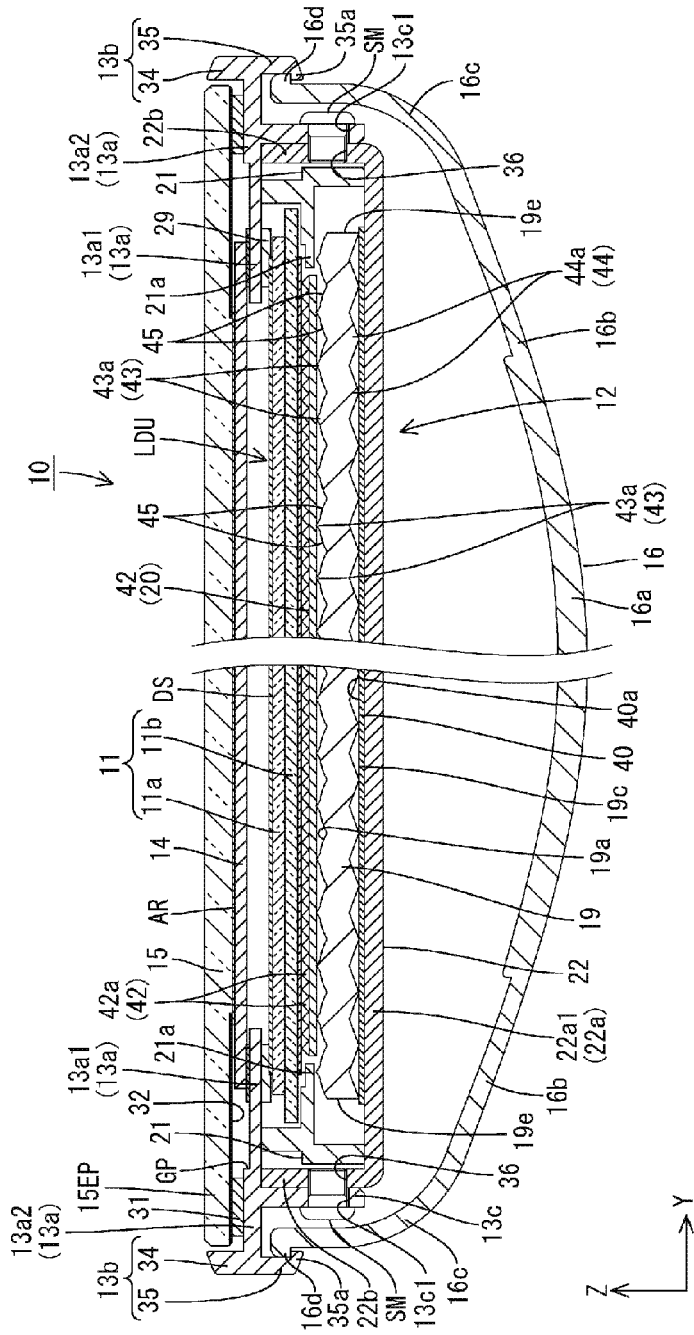
FIG. 4 is a cross-sectional view of a configuration of the liquid crystal display device along the shorter side direction (second direction, Y axis direction).

First, the liquid crystal panel 11 included in the liquid crystal display unit LDU will be described in detail. As shown in FIGS. 3 and 4, the liquid crystal panel 11 includes a pair of substantially transparent glass substrates 11*a* and 11*b* having excellent light-transmissive qualities and having a rectangular shape in a plan view, and a liquid crystal layer (not shown) including liquid crystal molecules, which are a substance that changes optical properties in response to an applied electric field, the liquid crystal layer being interposed between the substrates 11*a* and 11*b*, and the substrates 11*a* and 11*b* are bonded together by a sealing member (not shown) maintaining a gap at a width equal to the thickness of the liquid crystal layer. The liquid crystal panel 11 has a display region where images are displayed (central portion surrounded by a surface light-shielding layer 32) and a non-display region surrounding the display region in a frame shape where images are not displayed (outer periphery overlapping the surface light-shielding layer 32 to be described later). The longer side direction of the liquid crystal panel 11 matches the X axis direction, the shorter side direction thereof matches the Y axis direction, and the thickness direction thereof matches the Z axis direction.

Of the two substrates 11*a* and 11*b*, the one on the front side (front surface side) is the CF substrate 11*a*, and the other on the rear side (rear surface side) is the array substrate 11*b*. A plurality of TFTs (thin film transistors), which are switching elements, and a plurality of pixel electrodes are provided on the inner surface of the array substrate 11*b* (surface facing the liquid crystal layer and opposing the CF substrate 11*a*), and gate wiring lines and source wiring lines surround each of these TFTs and pixel electrodes to form a grid pattern. Each of the wiring lines is fed a prescribed image signal from control circuits, which are not shown. Each pixel electrode, which is disposed in a quadrilateral region surrounded by the gate wiring lines and source wiring lines, is a transparent electrode made of ITO (indium tin oxide) or ZnO (zinc oxide).

The CF substrate 11*a* has formed thereon a plurality of color filters in positions corresponding to the pixels. The color filters are arranged such that the three colors R, G, and B are alternately disposed. A light-shielding layer (black matrix) is formed between the color filters to prevent color mixing. An opposite electrode is provided on the surfaces of the color filters and the light-shielding layer so as to face the pixel electrodes on the array substrate 11*b*. The CF substrate 11*a* is formed to be slightly smaller than the array substrate 11*b*. Alignment films for aligning the liquid crystal molecules included in the liquid crystal layer are respectively formed on the inner surfaces of the substrates 11*a* and 11*b*. Polarizing plates 11*c* and 11*d* are respectively bonded to the outer surfaces of the substrates 11*a* and 11*b* (see FIG. 5).

Figure 2:
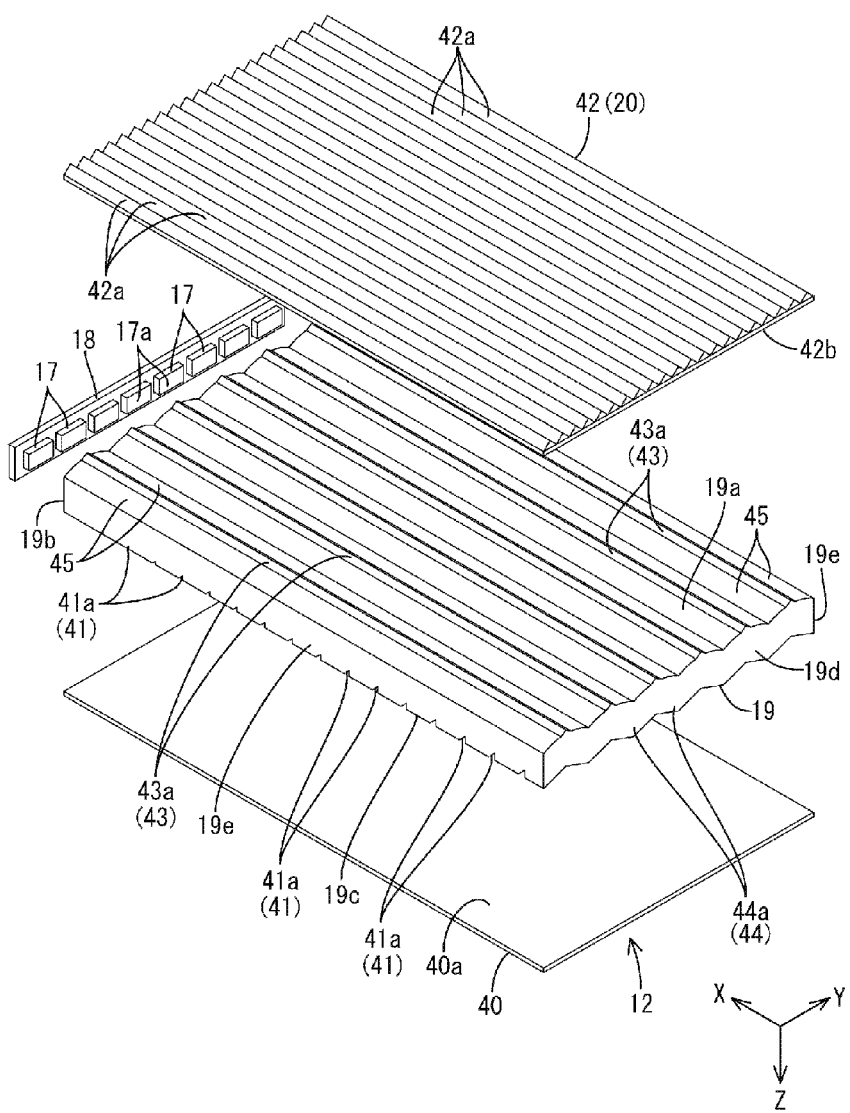
FIG. 2 is an exploded perspective view showing a schematic configuration of a backlight device of the liquid crystal display device.

Next, the backlight device 12 included in the liquid crystal display unit LDU will be described in detail. As shown in FIG. 1, the backlight device 12 overall has a substantially block shape that is rectangular in a plan view overall, in a manner similar to the liquid crystal panel 11. As shown in FIGS. 2 to 4, the backlight device 12 includes LEDs 17 (light-emitting diodes), which are light sources; an LED substrate 18 (light source substrate) on which the LEDs 17 are mounted; a light guide plate 19 that guides light from the LEDs 17; a reflective sheet 40 (reflective member) that reflects light from the light guide plate 19; an optical sheet 20 (optical member) stacked over the light guide plate 19; a light-shielding frame 21 that presses the light guide plate 19 from the front; a chassis 22 that houses the LED substrate 18, the light guide plate 19, the optical sheet 20, and the light-shielding frame 21; and a heat-dissipating member 23 attached so as to be in contact with the outer surface of the chassis 22. The backlight device 12 has LEDs 17 (LED substrate 18) disposed along one shorter side among the outer edges of the backlight device 12, and is of a single-side lit edge lit type (side lit type).

Figure 5:
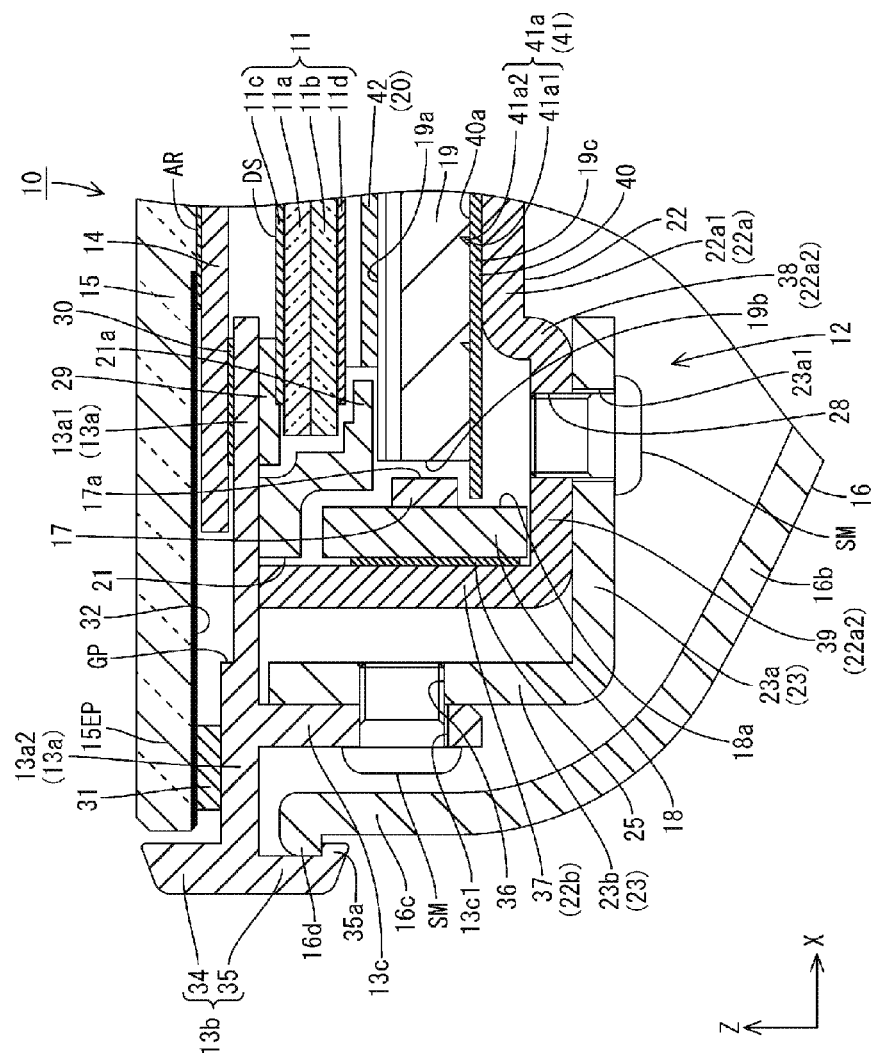
FIG. 5 is an enlarged cross-sectional view of a portion of FIG. 3 in the vicinity of an LED.

As shown in FIGS. 2, 3, and 5, each LED 17 has a configuration in which an LED chip is sealed by a resin material onto a portion of the LED substrate 18 where the LED 17 is to be bonded. The LED chip mounted on the portion of the substrate has one type of primary light emitting wavelength, and specifically, only emits blue light. On the other hand, the resin material that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. The LEDs 17 are of a so-called top-type in which the side opposite to that mounted onto the LED substrate 18 is a light-emitting surface 17a.

As shown in FIGS. 2, 3, and 5, the LED substrate 18 has a long plate shape that extends in the Y axis direction (shorter side direction of light guide plate 19 and chassis 22), and is housed in the chassis 22 such that the surface thereof is parallel to the Y axis direction and the Z axis direction, or in other words, perpendicular to the surfaces of the liquid crystal panel 11 and the light guide plate 19. In other words, the LED substrates 18 are disposed such that the long side direction of the plate surface thereof is the same as the Y axis direction, the short side direction of the plate surface thereof is the same as the Z axis direction, and the plate thickness direction perpendicular to the main surface is the same as the X axis direction. The LED substrate 18 is disposed such that the inner surface thereof (mounting surface 18a) faces one shorter side edge face (light-receiving face 19b, light source-opposing edge face) of the light guide plate 19 with a prescribed gap in the X axis direction therefrom. Therefore, the direction in which the LEDs 17, the LED substrate 18, and the light guide plate 19 are aligned substantially matches the X axis direction. The longer dimension of the LED substrate 18 substantially matches or is longer than the shorter dimension of the light guide plate 19, and the LED substrate 18 is attached to one shorter edge of the chassis 22 to be described later.

As shown in FIG. 5, the LEDs 17 having the configuration above are mounted on the inner surface of the LED substrate 18, or in other words, the surface facing the light guide plate 19 (surface opposing the light guide plate 19), and this surface is the mounting surface 18a. On the mounting surfaces 18a of the LED substrates 18, a plurality of LEDs 17 are arranged in a row (in a line) along the length direction (Y axis direction) at prescribed intervals. In other words, the plurality of LEDs 17 are arranged intermittently along the shorter side direction on one shorter side of the backlight device 12. The alignment interval (alignment pitch) between adjacent LEDs 17 is substantially the same. Also, the mounting surface 18a of the LED substrate 18 has formed thereon a wiring pattern (not shown) made of a metal film (copper foil or the like) that extends in the Y axis direction across the group of LEDs 17 so as to connect adjacent LEDs 17 in series. Terminal portions formed on either side of the wiring pattern are connected to an LED driver circuit such that driving power can be supplied to the respective LEDs 17. In addition, the base material of the LED substrate 18 is made of metal like the chassis 22, and the wiring pattern (not shown) is formed on the LED substrate 18 across an insulating layer. It is also possible to form the base material of the LED substrate 18 of an insulating material such as a ceramic.

Figure 6:
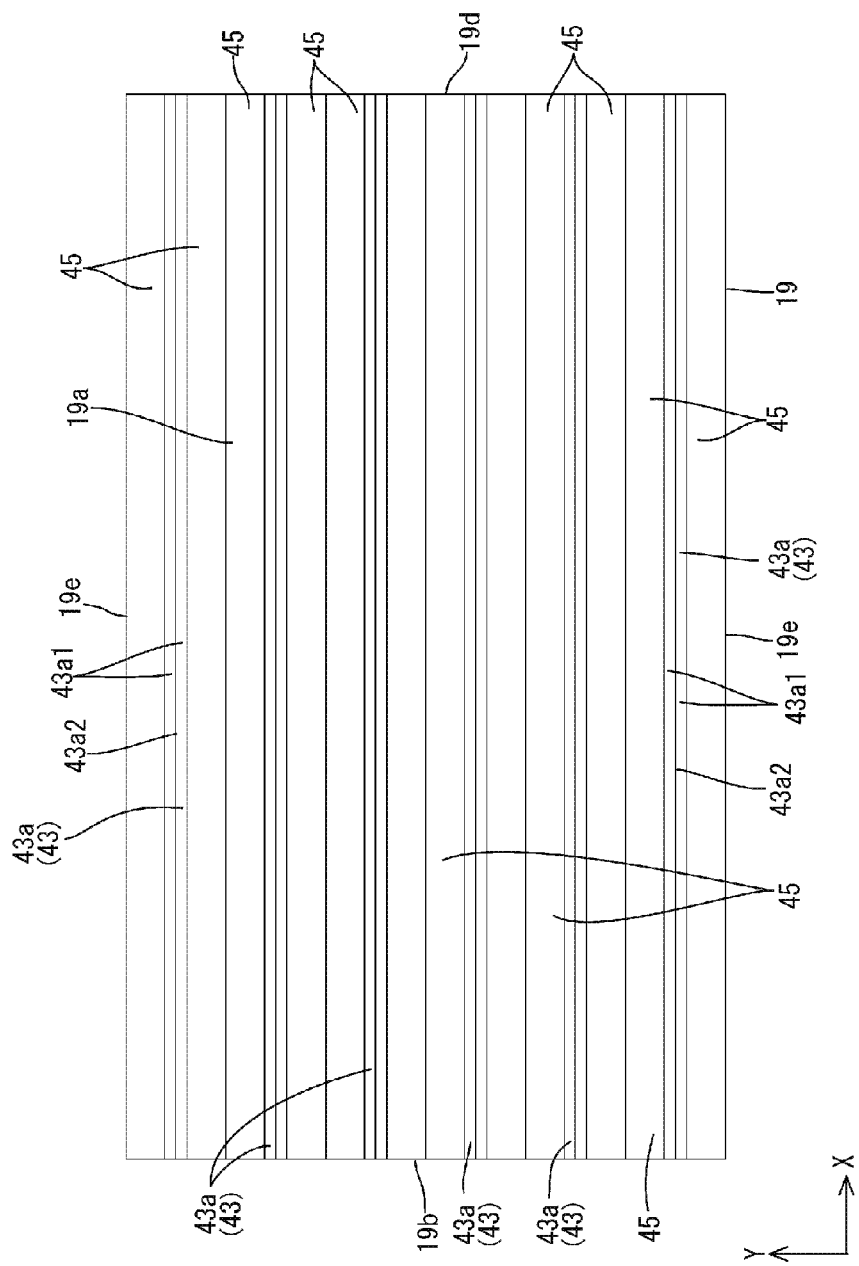
FIG. 6 is a plan view of a light guide plate.

The light guide plate 19 is made of a synthetic resin (an acrylic resin such as PMMA, for example) with a higher refractive index than air and almost completely transparent, having excellent light transmission. As shown in FIGS. 2 and 6, like the liquid crystal panel 11, the light guide plate 19 is formed as a substantially rectangular flat plate as seen in a plan view, and the surface of the light guide plate 19 is parallel to the surface of the liquid crystal panel 11 (display surface DS). The longer side direction of the surface of the light guide plate 19 matches the X axis direction and the shorter side direction thereof matches the Y axis direction, while the thickness direction perpendicular to the surface of the light guide plate 19 matches the Z axis direction. As shown in FIGS. 3 and 4, the light guide plate 19 is disposed in the chassis 22 directly below the liquid crystal panel 11 and the optical sheet 20, and one of the shorter sides of the outer edge faces opposes the LEDs 17 on the LED substrate 18 disposed on one of the shorter sides of the chassis 22. Thus, the LEDs 17 (LED substrate 18) and the light guide plate 19 are arranged in the X axis direction with respect to each other whereas the optical sheet 20 (liquid crystal panel 11) and the light guide plate 19 are arranged (stacked) in the Z axis direction with respect to each other, and the two directions are perpendicular to each other. The light guide plate 19 has the function of receiving light emitted by the LEDs 17 towards the light guide plate 19 in the X axis direction (direction in which the LEDs 17 are aligned with respect to the light guide plate 19) at the shorter side edge face thereof, and propagating this light therein and causing the light to be emitted upward from the surface thereof towards the optical sheet 20 (front, light-emission side).

Of the surfaces of the plate-shaped light guide plate 19, the surface facing the front (light emission side; surface facing the liquid crystal panel 11 and the optical sheet 20) is, as shown in FIGS. 3 and 4, the light-exiting surface 19a from which internal light is emitted towards the optical sheet 20 and the liquid crystal panel 11. Of the outer edge faces adjacent to the plate surface of the light guide plate 19, one of the pair of longer side edges faces (on the left side of FIG. 3) having an elongated shape in the X axis direction (direction in which the LEDs 17 are aligned; longer side direction of the LED substrate 18) faces the LEDs 17 (LED substrate 18) at a prescribed gap therefrom as shown in FIG. 5, and this is the light-receiving face 19b into which light emitted from the LEDs 17 enters. In other words, the light-receiving face 19b is the LED-opposing edge face (light source-opposing edge face) that opposes the LEDs 17. The light-receiving face 19b is on a plane parallel to that defined by the Y axis and the Z axis, and is substantially perpendicular to the light-exiting surface 19a. The direction along which the LEDs 17 and the light-receiving faces 19b (light guide plate 19) are aligned with respect to each other is the same as the X axis direction, and is parallel to the light-exiting surface 19a. Of the pair of shorter side edge faces among the outer edge faces of the light guide plate 19, the other edge face opposite to the light-receiving face 19b (edge face that is an opposite side to the light-receiving face 19b) is a non-light-receiving opposite face 19d into which light from the LEDs 17 does not enter. By contrast, the pair of longer side edge faces that are adjacent to both the light-receiving face 19b and the non-light-receiving opposite face 19d (pair of edge faces that form opposite sides and that do not include the light-receiving face 19b) are both non-light-receiving side faces 19e into which light from the LEDs 17 does not enter. The pair of non-light-receiving side faces 19e are surfaces parallel to the X axis direction (direction in which the LEDs 17 and light guide plate 19 are aligned with respect to each other) and the Z axis direction. Of the outer edge faces of the light guide plate 19, the three edge faces other than the light-receiving face 19b, or in other words, the non-light-receiving opposite face 19d and the pair of non-light-receiving side faces 19e are, as shown in FIGS. 3 and 4 non-LED-facing edge faces (non-light source-facing edge faces) that do not face the LEDs 17. Light from the LEDs 17 that has entered the light guide plate 19 through the light-receiving face 19b, which is an outer edge face of the light guide plate 19, is reflected by the reflective sheet 40 to be described next, and totally reflected by the light-exiting surface 19a, the opposite plate surface 19c, and other outer edge faces (non-light-receiving opposite face 19d and respective non-light-receiving side faces 19e), thereby being efficiently propagated inside the light guide plate 19. If the light guide plate 19 is made of an acrylic resin such as PMMA, then the index of refraction thereof is 1.585, and thus, the critical angle is approximately 39°, for example. Below, among the outer edge faces of the light guide plate 19, the direction (X axis direction) in which the pair of edge faces (longer side edge faces, non-light-receiving side faces 19e), which are opposing sides and do not include the light-receiving face 19b, are aligned is designated as the "first direction"; the direction (Y axis direction) in which the pair of edge faces (shorter side edge faces, light-receiving face 19b and non-light-receiving opposite face 19d), which are opposing sides and include the light-receiving face 19b, are aligned is designated as the "second direction"; and the direction normal to the surface of the light guide plate 19 (direction perpendicular to both the first direction and second direction) is designated as the "third direction."

Of the surfaces of the light guide plate 19, the surface (opposing the reflective sheet 40 and the bottom plate 22a of the chassis 22) facing the rear (opposite to the light-exiting side), that is, the surface opposite to the light-exiting surface 19a, is an opposite plate surface 19c as shown in FIGS. 3 and 4. On the opposite plate surface 19c, a reflective sheet 40 that can reflect light from the light guide plate 19 toward the front, or in other words toward the light-exiting surface 19a, is provided so as to cover the entire opposite plate surface 19c. In other words, the reflective sheet 40 is sandwiched between a bottom plate 22a of the chassis 22a and the light guide plate 19. The reflective sheet 40 has a reflective surface 40a that opposes the opposite plate surface 19c of the light guide plate 19 and reflects light, and the light reflected by the reflective surface 40a can be efficiently propagated inside the light guide plate 19. As shown in FIG. 5, the edge of the reflective sheet 40 at the light-receiving face 19b of the light guide plate 19 extends farther outward than the light-receiving face 19b, or in other words, towards the LEDs 17, and this extended portion reflects light from the LEDs 17, thereby enabling an improvement in the light-receiving efficiency of the light-receiving face 19b. As shown in FIGS. 3 and 5, the opposite plate surface 19c of the light guide plate 19 is provided with a light emission reflection portion 41 for encouraging light to be emitted from the light-exiting surface 19a by reflecting light that is being propagated inside the light guide plate 19. The light emission reflection portion 41 includes reflection units 41a (unit light emission reflection portions) that extend along the second direction (Y direction) on the opposite plate surface 19c of the light guide plate 19, and that are formed in grooves and have a substantially triangular (substantially V-shaped) cross-section, a plurality of the reflection units 41a being arranged with gaps therebetween (intermittent arrangement) along the first direction (X axis direction). The reflection units 41a have an inclined surface 41a1 that is inclined with respect to the third direction (Z axis direction) and the first direction (X axis direction), and a parallel surface 41a2 that is parallel to the third direction and the second direction. The inclined surface 41a1 is arranged towards the light-receiving face 19b in the first direction (left side of FIGS. 5 and 10), but the parallel surface 41a2 is arranged towards the non-light-receiving opposite face 19d in the first direction (right side of FIGS. 5 and 10). The reflection units 41a reflect light at the inclined surfaces 41a1 arranged towards the light-receiving face 19b in the first direction, thereby producing light incident on the light-exiting surface 19a that does not exceed the critical angle, and encouraging light to be emitted from the light-exiting surface 19a. The reflection units 41a are arranged so as to be taller in the height direction (third direction) with the areas of the inclined surfaces 41a1 and the parallel surfaces 41a2 (surface areas) becoming larger, the further way from the light-receiving face 19b (LEDs 17) the reflection units 41a are in the first direction. In this manner, the light emitted from the light-exiting surface 19a is controlled to have an even distribution along the surface of the light-exiting surface 19a. The reflection units 41a are arranged such that the alignment interval (alignment pitch) is substantially uniform in the first direction, that is, the reflection units 41a are arranged at even pitch.

As shown in FIGS. 2 to 4, the optical sheet 20 is rectangular in a plan view, similar to the liquid crystal panel 11 and the chassis 22. The optical sheet 20 is disposed on the front (light-exiting side) of the light-exiting surface 19a of the light guide plate 19 so as to overlap therewith. In other words, the optical sheet 20 is interposed between the liquid crystal panel 11 and the light guide plate 19, thus allowing light emitted from the light guide plate 19 therethrough while applying prescribed optical effects thereon, and emitting the light to the liquid crystal panel 11. The optical sheet 20 will be described in detail later.

As shown in FIGS. 3 and 4, a light-shielding frame 21 is formed in a substantially frame shape that extends along the outer edges of the light guide plate 19, and can press almost the entirety of the outer edges of the light guide plate 19 from the front. The light-shielding frame 21 is made of a synthetic resin, and by having the surface thereof colored black, for example, the light-shielding frame 21 has light-shielding properties. The light-shielding frame 21 has an inner edge 21a that is present in the entire area between the outer edge portion of the light guide plate 19 and the LEDs 17, and respective outer edge portions of the liquid crystal panel 11 and the optical sheet 20, thereby optically isolating them from each other. As a result, light that was emitted by the LEDs 17 but did not enter the light-receiving face 19b of the light guide plate 19 and light that has leaked from the non-light-receiving opposite face 19d and the non-light-receiving side face 19e can be prevented from directly entering the outer edge portions of the liquid crystal panel 11 and the optical sheet 20 (particularly the edge faces). The three sides of the light-shielding frame 21 that do not overlap the LEDs 17 and the LED substrate 18 in a plan view (pair of long sides and short side opposite to that facing the LED substrate 18) have a portion rising from the bottom plate 22a of the chassis 22 and a portion supporting the frame 13 from the rear, whereas the short side overlapping the LEDs 17 and the LED substrate 18 in a plan view covers the edge of the light guide plate 19 and the LED substrate 18 (LEDs 17) from the front while bridging the pair of long sides. The light-shielding frame 21 is fixed to the chassis 22 to be described next by a fixing member such as a screw member (not shown).

The chassis 22 is made of sheet metal having excellent thermal conductivity made of an aluminum plate, an electro galvanized steel sheet (SECC), or the like, and as shown in FIGS. 3 and 4, the chassis 22 has a bottom plate 22a having a rectangular shape in a plan view similar to the liquid crystal panel 11, and side plates 22b that rise towards the front from the respective outer edges (pair of long sides and pair of short sides) of the bottom plate 22a. In the chassis 22 (bottom plate 22a), the long side direction thereof matches the X axis direction, and the short side direction thereof matches the Y axis direction. A majority of the bottom plate 22a is a light guide plate supporting portion 22a1 that supports the light guide plate 19 from the rear (side opposite to the light-exiting surface 19a), whereas the edge thereof by the LED substrate 18 is a substrate housing portion 22a2 that protrudes in a step shape to the rear. As shown in FIG. 5, the substrate housing portion 22a2 has a substantially L shape in a cross-sectional view, and includes a rising portion 38 that bends from the edge of the light guide plate supporting portion 22a1 and extends to the rear, and a housing bottom portion 39 that is bent from the end of the rising portion 38 and protrudes towards a direction opposite to the light guide plate supporting portion 22a1. The portion of the rising portion 38 that bends from the edge of the light guide plate supporting portion 22a1 is located to a side of the light-receiving face 19b of the light guide plate 19 opposite to the LEDs 17 (towards center of the light guide plate supporting portion 22a1). A longer side plate 22b rises towards the front from a bend at the protruding tip of the housing bottom portion 39. The shorter side plate 22b connected to the substrate housing portion 22a2 has the LED substrate 18 attached thereto, and this side plate 22b is a substrate attaching portion 37. The substrate attaching portion 37 has a surface opposing the light-receiving face 19b of the light guide plate 19, and the LED substrate 18 is attached to this opposing surface. A surface of the LED substrate 18 opposite to the mounting surface 18a to which the LEDs 17 are mounted is fixed to the inner surface of the substrate attaching portion 37 by a substrate fixing member 25 such as double-sided tape. The attached LED substrate 18 is at a small gap from the inner surface of the housing bottom portion 39 of the substrate housing portion 22a2. The rear surface of the bottom plate 22a of the chassis 22 has attached thereto a liquid crystal panel driver circuit substrate (not shown) for controlling the driving of the liquid crystal panel 11, an LED driver circuit substrate (not shown) for supplying driving power to the LEDs 17, a touch panel driver circuit substrate (not shown) for controlling the driving of the touch panel 14, and the like.

The heat-dissipating member 23 is made of sheet metal having excellent thermal conductivity such as an aluminum plate, and as shown in FIG. 3, the heat-dissipating member 23 extends along one shorter side of the chassis 22, and specifically, along the substrate housing portion 22a2, which houses the LED substrate 18. As shown in FIG. 5, the heat-dissipating member has a substantially L shape in a cross-sectional view, and includes a first heat-dissipating portion 23a that is parallel to the outer surface of the substrate housing portion 22a2 and is in contact with this outer surface, and a second heat-dissipating portion 23b that is parallel to the outer surface of the side plate 22b (substrate attaching portion 37), which is connected to the substrate housing portion 22a2. The first heat-dissipating portion 23a has a narrow plate shape extending along the Y axis direction, and the surface thereof facing the front and parallel to the X axis direction and the Y axis direction abuts almost the entire length of the outer surface of the housing bottom portion 39 in the substrate housing portion 22a2. The first heat-dissipating portion 23a is screwed into the housing bottom portion 39 by a screw member SM, and has a screw insertion hole 23a1 for inserting the screw member SM. The housing bottom portion 39 has a screw hole 28 that is threaded to engage the screw member SM. As a result, heat emitted by the LEDs 17 is transmitted to the first heat-dissipating portion 23a through the LED substrate 18, the substrate attaching portion 37, and the substrate housing portion 22a2. A plurality of the screw members SM are attached to the first heat-dissipating portion 23a at a gap from each other along the extension direction thereof. The second heat-dissipating portion 23b has a narrow plate shape extending along the Y axis direction and the surface thereof facing the inside and parallel to the Y axis direction and the Z axis direction is arranged to oppose the substrate attaching portion 37 at a prescribed gap therefrom.

Next, the frame 13 included in the liquid crystal display unit LDU will be described. The frame 13 is made of a metal such as aluminum having excellent thermal conductivity, and as shown in FIG. 1 has an overall rectangular frame shape in a plan view along the outer edges of the liquid crystal panel 11, the touch panel 14, and the cover panel 15. The frame 13 is formed by press working or the like. As shown in FIGS. 3 and 4, the frame 13 presses the outer edges of the liquid crystal panel 11 from the front, and sandwiches the liquid crystal panel 11, the optical sheet 20, and the light guide plate 19, which are stacked one on top of the other, with the chassis 22 of the backlight device 12. On the other hand, the frame 13 receives the outer edges of the touch panel 14 and the cover panel 15 from the rear, and is interposed between the outer edges of the liquid crystal panel 11 and the touch panel 14. As a result, a prescribed gap is set between the liquid crystal panel 11 and the touch panel 14, and when an external force acts on the cover panel 15 causing the touch panel 14 to warp towards the liquid crystal panel 11, the warped touch panel 14 is unlikely to interfere with the liquid crystal panel 11.

As shown in FIGS. 3 and 4, the frame 13 has: a frame-shaped portion 13a (main frame portion) disposed along the outer edges of the liquid crystal panel 11, the touch panel 14, and the cover panel 15; a loop portion 13b (cylindrical portion) that is connected to the outer edge of the frame-shaped portion 13a and surrounds the touch panel 14, the cover panel 15, and the casing 16 from the outside; and an attaching plate portion 13c protruding towards the rear from the frame-shaped portion 13a, the attaching plate portion 13c being attached to the chassis 22 and the heat-dissipating member 23. The frame-shaped portion 13a has a substantially plate shape with a surface parallel to the respective surfaces of the liquid crystal panel 11, the touch panel 14, and the cover panel 15, the frame-shaped portion 13a having a rectangular frame shape in a plan view. In the frame-shaped portion 13a, the outer edge portion 13a2 has a greater thickness than the inner edge portion 13a1, and a step GP (gap) is formed at the boundary between the two. In the frame-shaped portion 13a, the inner edge portion 13a1 is disposed between the outer edge portion of the liquid crystal panel 11 and the outer edge portion of the touch panel 14, whereas the outer edge portion 13*a*2 receives the outer edge portion of the cover panel 15 from the rear. In this manner, almost the entire front surface of the frame-shaped portion 13*a* is covered by the cover panel 15, which means that almost none of the front surface is exposed. As a result, even if the temperature of the frame 13 increases due to heat from the LEDs 17 or the like, the user of the liquid crystal display device 10 is unlikely to directly touch the exposed portions of the frame 13, which is excellent for safety. As shown in FIG. 5, the rear surface of the inner edge portion 13*a*1 of the frame-shaped portion 13*a* has fixed thereto a cushioning material 29 for pressing the liquid crystal panel 11 while cushioning it, whereas the front surface of the inner edge portion 13*a*1 has fixed thereto a first fixing member 30 for cushioning and fixing in place the outer edge portion of the touch panel 14. The cushioning material 29 and the first fixing member 30 are disposed on overlap each other in a plan view at the inner edge portion 13*a*1. The front surface of the outer edge portion 13*a*2 of the frame-shaped portion 13*a* has fixed thereto a second fixing member 31 for fixing in place the cover panel 15 while cushioning it. The cushioning material 29 and the fixing members 30 and 31 extend along the sides of the frame-shaped portion 13*a* excluding the four corners thereof. The fixing members 30 and 31 are double-sided tapes having a base member with cushioning properties, for example.

As shown in FIGS. 3 and 4, the loop portion 13*b* overall has a short rectangular tube shape that is rectangular in a plan view, and includes a first loop portion 34 that protrudes towards the front from the outer edge of the outer edge portion 13*a*2 of the frame-shaped portion 13*a*, and a second loop portion 35 that protrudes towards the rear from the outer edge of the outer edge portion 13*a*2 of the frame-shaped portion 13*a*. In other words, the inner surface of the short rectangular tube shaped loop portion 13*b* substantially towards the center in the axis direction thereof (Z axis direction) has connected thereto the outer edge of the frame-shaped portion 13*a* along the entire length of the inner surface. The first loop portion 34 is disposed so as to surround the entire outer edge face of the touch panel 14 and the cover panel 15 disposed on the front of the frame-shaped portion 13*a*. The inner surface of the first loop portion 34 faces the outer edge faces of the touch panel 14 and the cover panel 15, whereas the outer surface thereof is exposed on the outside of the liquid crystal display device 10, and constitutes the outer appearance of the side face of the liquid crystal display device 10. On the other hand, the second loop portion 35 surrounds from the outside the front edge (attaching portion 16*c*) of the casing 16 disposed on the rear of the frame-shaped portion 13*a*. The inner surface of the second loop portion 35 faces the attaching portion 16*c* of the casing 16 to be described later, whereas the outer surface thereof is exposed on the outside of the liquid crystal display device 10, and constitutes the outer appearance of the side face of the liquid crystal display device 10. The protruding tip of the second loop portion 35 has a frame fixing tab 35*a* having a hook shape in a cross-sectional view, and by fixing the casing 16 to the frame fixing tab 35*a*, the casing 16 can be securely attached.

As shown in FIGS. 3 and 4, the attaching plate portion 13*c* protrudes from the rear of the outer edge portion 13*a*2 of the frame-shaped portion 13*a*, and has a plate shape extending along the respective sides of the frame-shaped portion 13*a*, the surface of the attaching plate portion 13*c* being substantially perpendicular to the surface of the frame-shaped portion 13*a*. The attaching plate portion 13*c* is individually provided on each side of the frame-shaped portion 13*a*. The attaching plate portion 13*c* disposed on the short side of the frame-shaped portion 13*a* facing the LED substrate 18 has an inner surface to which the outer surface of the second heat-dissipating portion 23*b* of the heat-dissipating portion 23 is attached. The attaching plate portion 13*c* is screwed onto the second heat-dissipating portion 23*b* by screw members SM, and has screw insertion holes 13*c*1 through which the screw members SM are inserted. The second heat-dissipating portion 23*b* has screw holes 36 that are threaded to engage the screw members SM. As a result, heat from the LEDs 17 transmitted from the first heat-dissipating portion 23*a* to the second heat-dissipating portion 23*b* is transmitted to the attaching plate portion 13*c* and then to the entire frame 13, thereby efficiently dissipating heat. The attaching plate portion 13*c* can be said to be fixed indirectly to the chassis 22 through the heat-dissipating portion 23. On the other hand, the attaching plate portions 13*c* respectively disposed on the pair of long sides and the short side opposite to that facing the LED substrate 18 are respectively screwed in by the screw members SM such that the inner surface of the attaching plate portions 13*c* are in contact with the outer surfaces of the side plates 22*b* of the chassis 22. The attaching plate portions 13*c* have formed therein screw insertion holes 13*c*1 for inserting the screw members SM therein, whereas the side plates 22*b* have screw holes 36 that are threaded to engage the screw members SM. A plurality of the screw members SM are attached to the attaching plate portion 13*c* along the extension direction thereof at a gap therebetween.

Next, the touch panel 14 attached to the frame 13 will be described. As shown in FIGS. 1, 3, and 4, the touch panel 14 is a position input device for use by the user to input position information within the display surface DS of the liquid crystal panel 11, and the touch panel 14 has formed thereon a prescribed touch panel pattern (not shown) on a glass substrate having a rectangular shape and being almost transparent with excellent light transmittance. Specifically, the touch panel 14 has a glass substrate having a rectangular shape in a manner similar to the liquid crystal panel 11, and has formed thereon transparent electrodes (not shown) for the touch panel constituting a so-called projection-type capacitive touch panel pattern on the front surface thereof. A plurality of the transparent electrodes for the touch panel are arranged in a matrix on the surface of the substrate. A terminal portion (not shown) to which wiring lines drawn from the transparent electrodes for the touch panel constituting the touch panel pattern are connected is formed on one short side of the touch panel 14, and by connecting a flexible substrate (not shown) to the terminal portion, it is possible to supply a potential from the touch panel driver circuit substrate to the transparent electrodes for the touch panel constituting the touch panel pattern. As shown in FIG. 5, the outer edge portion of the interior surface of the touch panel 14 is fixed to the inner edge portion 13*a*1 of the frame-shaped portion 13*a* of the frame 13 by the first fixing member 30 described above.

Next, the cover panel 15 attached to the frame 13 will be described. As shown in FIGS. 1, 3, and 4, the cover panel 15 is disposed on cover almost the entire touch panel 14 from the front, thereby protecting the touch panel 14 and the liquid crystal panel 11. The cover panel 15 covers the entire frame-shaped portion 13*a* of the frame 13 from the front and constitutes the front outer appearance of the liquid crystal display device 10. The cover panel 15 is made of a glass plate base member that has a rectangular shape and is almost transparent with excellent light transmittance, and it is preferable that the cover panel 15 be made of tempered glass. It is preferable that the tempered glass used for the cover panel 15 be a chemically strengthened glass including a chemically strengthened layer on the surface by applying a chemical strengthening treatment on the surface of a plate-shaped glass base, for example. This chemical strengthening treatment uses ion exchange to strengthen the plate-shaped glass base by substituting an alkali metal ion contained in the glass material with an alkali metal ion that has a larger ion radius. The chemically strengthened layer resulting from this treatment is a compressive strength layer (ion exchange layer) that has residual compressive stress. As a result, the cover panel 15 has a high mechanical strength and shock resistance, thereby more reliably preventing damage or scratches on the touch panel 14 and the liquid crystal panel 11 provided to the rear thereof.

As shown in FIGS. 3 and 4, the cover panel 15 has a rectangular shape in a plan view, like the liquid crystal panel 11 and the touch panel 14, and the plan view size thereof is slightly larger than that of the liquid crystal panel 11 and the touch panel 14. Therefore, the cover panel 15 has a protruding portion 15EP that protrudes outward in an eve shape beyond the entire outer edge of the liquid crystal panel 11 and the touch panel 14. The protruding portion 15EP has a rectangular substantially frame shape surrounding the liquid crystal panel 11 and the touch panel 14, and as shown in FIG. 5, the interior surface thereof is fixed to the outer edge portion 13a2 of the frame-shaped portion 13a of the frame 13 by the second fixing member 31. On the other hand, the central portion of the cover panel 15 facing the touch panel 14 is stacked onto the front of the touch panel 14 across an antireflective film AR.

As shown in FIGS. 3 and 4, a surface light-shielding layer 32 (light-shielding layer; surface light-shielding portion) is formed on the interior (rear) surface (surface facing the touch panel 14) in the outer edge portion of the cover panel 15 including the protruding portion 15EP. The surface light-shielding layer 32 is made of a light-shielding material such as a black coating, for example, and this light-shielding material is printed onto the interior surface of the cover panel 15, and is thus integrally formed with this surface. When providing the surface light-shielding layer 32, it is possible to use printing methods such as screen printing or inkjet printing, for example. The surface light-shielding layer 32 is formed on portions overlapping the outer edge portions of the touch panel 14 and the liquid crystal panel 11 in a plan view in areas further inside the protruding portion 15EP in addition to the entire protruding portion 15EP of the cover panel 15. Thus, the surface light-shielding layer 32 is disposed on surround the display region of the liquid crystal panel 11, which allows light outside the display region to be blocked, thereby allowing for a high display quality for images displayed in the display region.

Next, the casing 16 attached to the frame 13 will be described. The casing 16 is made of a synthetic resin or a metal, and as shown in FIGS. 1, 3, and 4, has a substantially bowl shape open towards the front, covers members such as the frame-shaped portion 13a of the frame 13, the attaching plate portion 13c, the chassis 22, and the heat-dissipating portion 23, and constitutes the rear outer appearance of the liquid crystal display device 10. The casing 16 has a relatively flat bottom portion 16a, a curved portion 16b that rises from the outer edges of the bottom portion 16a while having a curved shape in a cross-sectional view, and an attaching portion 16c that rises substantially vertically from the outer edge of the curved portion 16b towards the front. The attaching portion 16c has a casing fixing tab 16d having a hook shape in a cross-sectional view, and the casing fixing tab 16d engages the frame fixing tab 35a of the frame 13, thereby securely attaching the casing 16 to the frame 13.

The backlight device 12 of the present embodiment is provided with a configuration for focusing light emitted therefrom in the second direction (Y axis direction), and the reasons and configurations therefor will be described below. As shown in FIGS. 3 and 5, light that is propagated inside the light guide plate 19 is reflected at the inclined surfaces 41a1 of the reflection units 41a constituting the light emission reflection portions 41 and brought towards the front, and emitted at an angle of incidence of less than or equal to the critical angle with respect to the light-exiting surface 19a. In this manner, light traveling in the first direction (X axis direction) is reflected by the reflection units 41a to the front, thereby enabling light to be focused towards the front, that is, from the light-exiting surface 19a towards the front in the direction normal to the light-exiting surface 19a. However, while the light emission reflection portion 41 has the effect of focusing reflected light in the first direction, it does not have much of a light focusing effect on reflected light in the second direction, and thus, there is the possibility of anisotropy in luminance of light emitted from the light-exiting surface 19a. In the present embodiment, light is focused in the second direction by the following configuration. That is, as shown in FIG. 2, the optical sheet 20 is constituted of one prism sheet (emission side anisotropic light focusing portion) 42 having light focusing anisotropy, which selectively applies a light focusing effect on light transmitted in the second direction, whereas the light-exiting surface 19a of the light guide plate 19 is provided with a light-exiting surface-side prism portion 43 (light-exiting surface side anisotropic light focusing prism portion) having light focusing anisotropy, which selectively applies a light focusing effect on light emitted in the second direction. Furthermore, the opposite plate surface 19c of the light guide plate 19 is provided with an opposite plate surface-side prism portion 44 (opposite plate surface-side anisotropic light focusing portions) having light focusing anisotropy, which selectively applies a light focusing effect in the second direction on light that is being propagated through the light guide plate 19. Next, the prism sheet 42, the light-exiting surface-side prism portion 43, and the opposite plate surface-side prism portion 44 will be described in detail.

Figure 9:
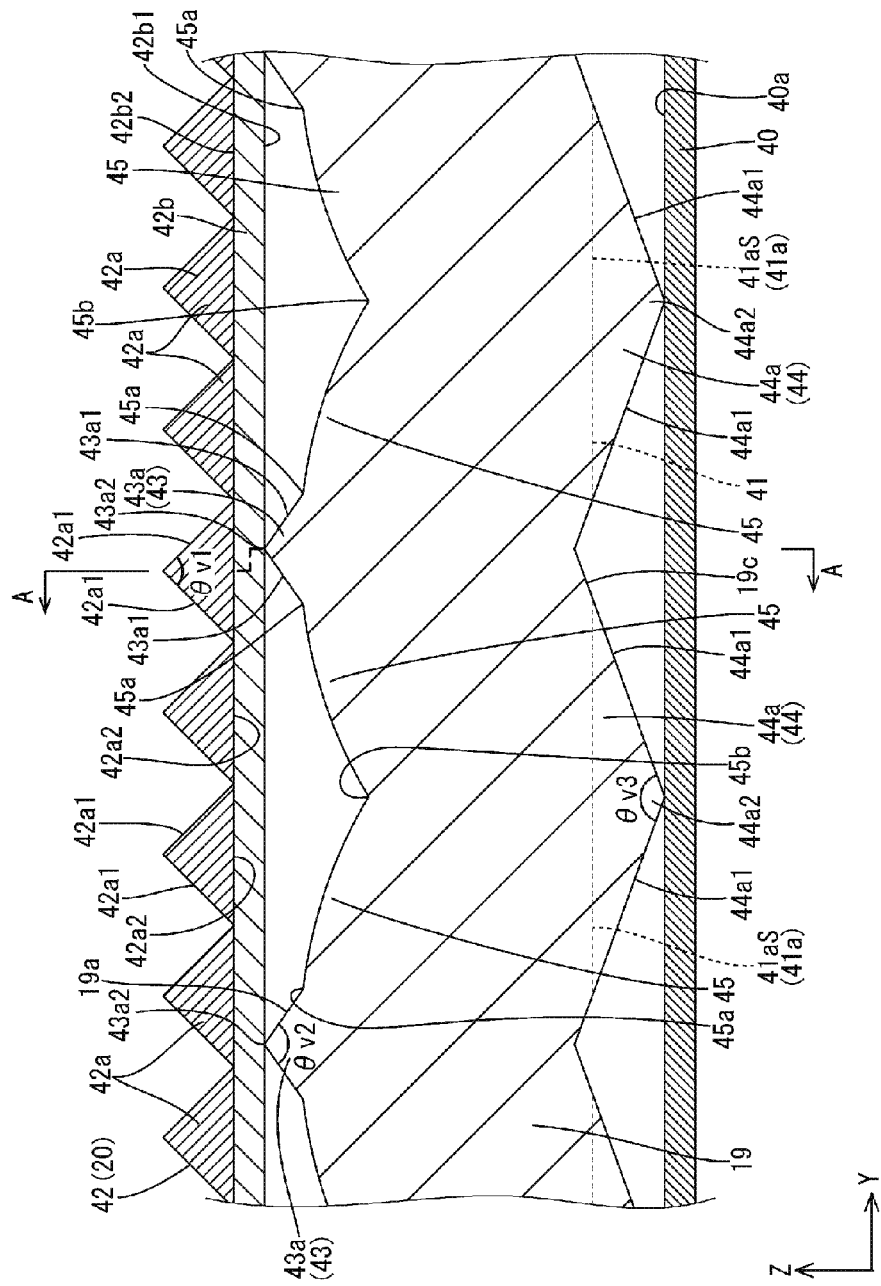
FIG. 9 is a cross-sectional view of a configuration of the backlight device of the liquid crystal display device along the shorter side direction (second direction, Y axis direction).

As shown in FIGS. 2 and 9, the prism sheet 42 includes a sheet base member 42b having a sheet shape of a prescribed thickness, and light-exiting side unit prisms 42a (light-exiting side unit light focusing units) having light focusing anisotropy, the light-exiting side unit prisms 42a being formed on the light-exiting plate surface 42b2 of the sheet base member 42b, which is opposite to the light-receiving plate surface 42b1 (on the light-exiting side) into which emitted light is radiated from the light guide plate 19. The sheet base member 42b is made of a substantially transparent synthetic resin, and is specifically made of a thermoplastic resin such as PET, for example, with an index of refraction of approximately 1.667, for example. The light-exiting side unit prisms 42a are formed integrally with the light-exiting plate surface 42b2, which is the front plate surface (light-emission side) of the sheet base member 42b. The light-exiting side unit prisms 42a are made of a transparent ultraviolet curable resin, which is a type of photocurable resin, and when manufacturing the prism sheet 42, a not yet cured ultraviolet curable resin is filled into a mold and the sheet base member 42b is placed on the opening of that mold, thereby placing the ultraviolet curable resin, which has not yet been cured, in contact with the light-exiting plate surface 42b2, and the ultraviolet curable resin is irradiated with ultraviolet light through the sheet base member 42b in this state to cure the ultraviolet curable resin and provide the light-exiting side unit prisms 42a integrally with the sheet base member 42b. The ultraviolet curable resin from which the light-exiting side unit prisms 42a is made is an acrylic resin such as PMMA, for example, and has an index of refraction of approximately 1.59. The light-exiting side unit prisms 42a are provided so as to protrude towards the front (light emission side) along the third direction (Z axis direction) from the light-exiting plate surface 42b2 of the sheet base member 42b. The light-exiting side unit prisms 42a extend in a line along the first direction (X axis direction) while forming a substantially triangular (mountain) shape in a cross-sectional view along the second direction (Y axis direction), and a plurality of these light-exiting side unit prisms 42a are arranged in the second direction on the light-exiting plate surface 42b2. The light-exiting side unit prisms 42a have a uniform width (dimension in the second direction) along the entire length thereof in the first direction. Each light-exiting side unit prism 42a has a substantially isosceles triangular shape in a cross-sectional view, has a pair of inclined surfaces 42a1, and the vertex angle θv1 is substantially a right angle (90°). The plurality of light-exiting side unit prisms 42a arranged in the second direction all have substantially the same vertex angle θv1, and width and height dimensions of the bottom surface 42a2 and gaps between adjacent light-exiting side unit prisms 42a are also substantially the same, and thus, the light-exiting side unit prisms 42a are disposed at an even interval.

As shown in FIG. 9, when light enters the prism sheet 42 having such a configuration from the light guide plate 19, the light enters the light-receiving plate surface 42b1 of the sheet base member 42b from an air layer present between the light-exiting surface 19a of the light guide plate 19 and the sheet base member 42b of the prism sheet 42, and thus, the light refracts at that interface according to the incident angle. Additionally, when the light transmitted through the sheet base member 42b enters the light-exiting side unit prism 42a from the light-exiting plate surface 42b2 of the sheet base member 42b, the light also refracts at that interface according to the incident angle. When the light transmitted through the light-exiting side unit prism 42a has reached the inclined surface 42a1 of the light-exiting side unit prism 42a, if the incident angle exceeds the critical angle, then the light is totally reflected and returns back to the sheet base member 42b (retroreflected), whereas, if the incident angle does not exceed the critical angle, then the light is refracted and emitted through the interface. Of the light emitted from the inclined surface 42a1 of the light-exiting side unit prism 42a, light moving towards an adjacent light-exiting side unit prism 42a enters that adjacent light-exiting side unit prism 42a and returns back to the sheet base member 42b. In this manner, the direction of the light emitted from the light-exiting side unit prism 42a is regulated so as to become closer to the frontal direction, and light concentration is selectively applied in the second direction.

Next, the light-exiting surface-side prism portion 43 disposed in the light-exiting surface 19a of the light guide plate 19 will be described. The light-exiting surface-side prism portion 43 is formed integrally with the light guide plate 19. In order to form the light-exiting surface-side prism portion 43 integrally with the light guide plate 19, the light guide plate 19 is formed by injection molding, for example, and a transfer shape to be transferred as the light-exiting surface-side prism portion 43 is formed in advance in the mold surface of the mold. As shown in FIGS. 2, 6, and 9, the light-exiting surface-side prism portion 43 is arranged such that a plurality of light-exiting surface-side prism units 43a extending in the first direction (X axis direction) are arranged in the second direction (Y axis direction) on the light-exiting surface 19a. The light-exiting surface-side prism units 43a are provided so as to protrude towards the front (light emission side) along the third direction (Z axis direction) from the light-exiting surface 19a. The light-exiting surface-side prism units 43a extend in a line along the first direction (X axis direction) while forming a substantially triangular (mountain) shape in a cross-sectional view along the second direction. The light-exiting surface-side prism units 43a have a uniform width (dimension in the second direction), that is, the proportion of the light-exiting surface 19a occupied in the second direction, along the entire length thereof in the first direction. Each light-exiting surface-side prism unit 43a has a substantially isosceles triangular shape in a cross-sectional view and has a pair of inclined surfaces 43a1, and it is preferable that the vertex angle θv2 thereof be an obtuse angle (greater than 90°), more preferable that the vertex angle fall within the range of 100° to 150°, and even more preferable that the angle be approximately 110°. In other words, the vertex angle θv2 of the light-exiting surface-side prism unit 43a is greater than the vertex angle θv1 of the light-exiting side unit prism 42a. The plurality of light-exiting surface-side prism units 43a arranged in the second direction all have substantially the same vertex angle θv2, and width and height dimensions of the bottom surface, and gaps between adjacent light-exiting surface-side prism units 43a are also substantially the same, and thus, the light-exiting surface-side prism units 43a are disposed at an even interval.

As shown in FIG. 9, the light-exiting surface-side prism portion 43 having such a configuration applies an anisotropic light focusing effect on the light that has been propagated through the light guide plate 19 and reached the light-exiting surface 19a, in the following manner. If the light that has reached the light-exiting surface 19a is at an incident angle at or below the critical angle with respect to the inclined surface 43a1 of the light-exiting surface-side prism unit 43a, then this light is refracted and emitted from the inclined surface 43a1, thereby selectively focusing the light in the second direction. On the other hand, if the light that has reached the light-exiting surface 19a is at an incident angle that exceeds the critical angle with respect to the inclined surface 43a1 of the light-exiting surface-side prism unit 43a, then this light is totally reflected at the inclined surface 43a1, thereby being returned to the opposite plate surface 19c (retroreflected). In this manner, the direction of the light emitted from the light-exiting surface 19a is regulated so as to become closer to the frontal direction, and light concentration is selectively applied in the second direction.

Figure 7:
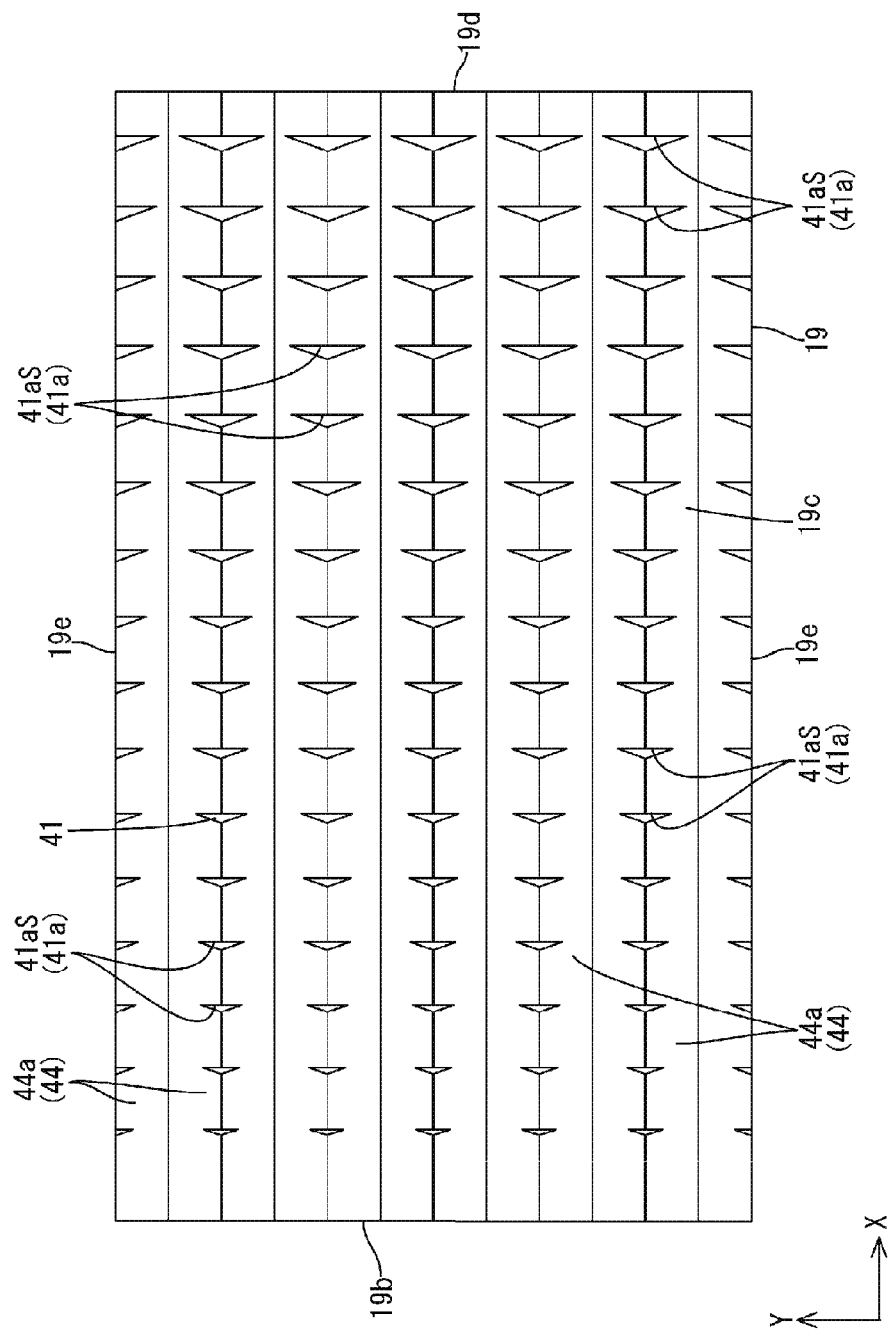
FIG. 7 is a bottom view of a light guide plate.

Next, the opposite plate surface-side prism portion 44 disposed in the opposite plate surface 19c of the light guide plate 19 will be described. The opposite plate surface-side prism portion 44 is formed integrally with the light guide plate 19. In order to form the opposite plate surface-side prism portion 44 integrally with the light guide plate 19, the light guide plate 19 is formed by injection molding, for example, and a transfer shape to be transferred as the opposite plate surface-side prism portion 44 is formed in advance in the mold surface of the mold. As shown in FIGS. 2, 7, and 9, the opposite plate surface-side prism portion 44 is arranged such that a plurality of opposite plate surface-side unit prisms 44a (opposite plate surface-side unit light focusing units) extending in the first direction (X axis direction) are arranged in the second direction (Y axis direction) on the opposite plate surface 19c. The opposite plate surface-side unit prisms 44a are provided so as to protrude towards the rear (opposite to the light emission side) along the third direction (Z axis direction) from the opposite plate surface 19c. The opposite plate surface-side unit prisms 44a extend in a line along the first direction (X axis direction) while forming a substantially triangular (mountain) shape in a cross-sectional view along the second direction. The opposite plate surface-side unit prisms 44a have a uniform width (dimension in the second direction) along the entire length thereof in the first direction. Each opposite plate surface-side unit prism 44a (excluding those disposed on either end in the second direction) has a substantially isosceles triangular shape in a cross-sectional view and has a pair of inclined surfaces 44a1, and it is preferable that the vertex angle θv3 thereof be an obtuse angle (greater than or equal to 90°), more preferable that the vertex angle fall within the range of 100° to 150°, and even more preferable that the angle be approximately 140°. In other words, the vertex angle θv3 of the opposite plate surface-side unit prism 44a is greater than the vertex angle θv1 of the light-exiting side unit prism 42a. Also, the vertex angle θv3 of the opposite plate surface-side unit prism 44a is greater than the vertex angle θv2 of the light-exiting surface-side prism unit 43a. The plurality of opposite plate surface-side unit prisms 44a arranged in the second direction all have substantially the same vertex angle θv3 and width and height dimensions of the bottom surface, and gaps between adjacent opposite plate surface-side unit prisms 44a are also substantially the same, and thus, the opposite plate surface-side unit prisms 44a are disposed at an even interval. As shown in FIG. 2, the two opposite plate surface-side unit prisms 44a on both ends in the second direction of the opposite plate surface 19c of the light guide plate 19 have a substantially right triangular shape in a cross-sectional view and have only one inclined surface 44a1, and the vertex angle is approximately half the vertex angle θv3 of the opposite plate surface-side unit prisms 44a towards the center. In other words, the two opposite plate surface-side unit prisms 44a disposed in either end in the second direction have a shape in which the central opposite plate surface-side unit prisms 44a are split in half at the vertex portion along the first direction and the third direction.

Figure 10:
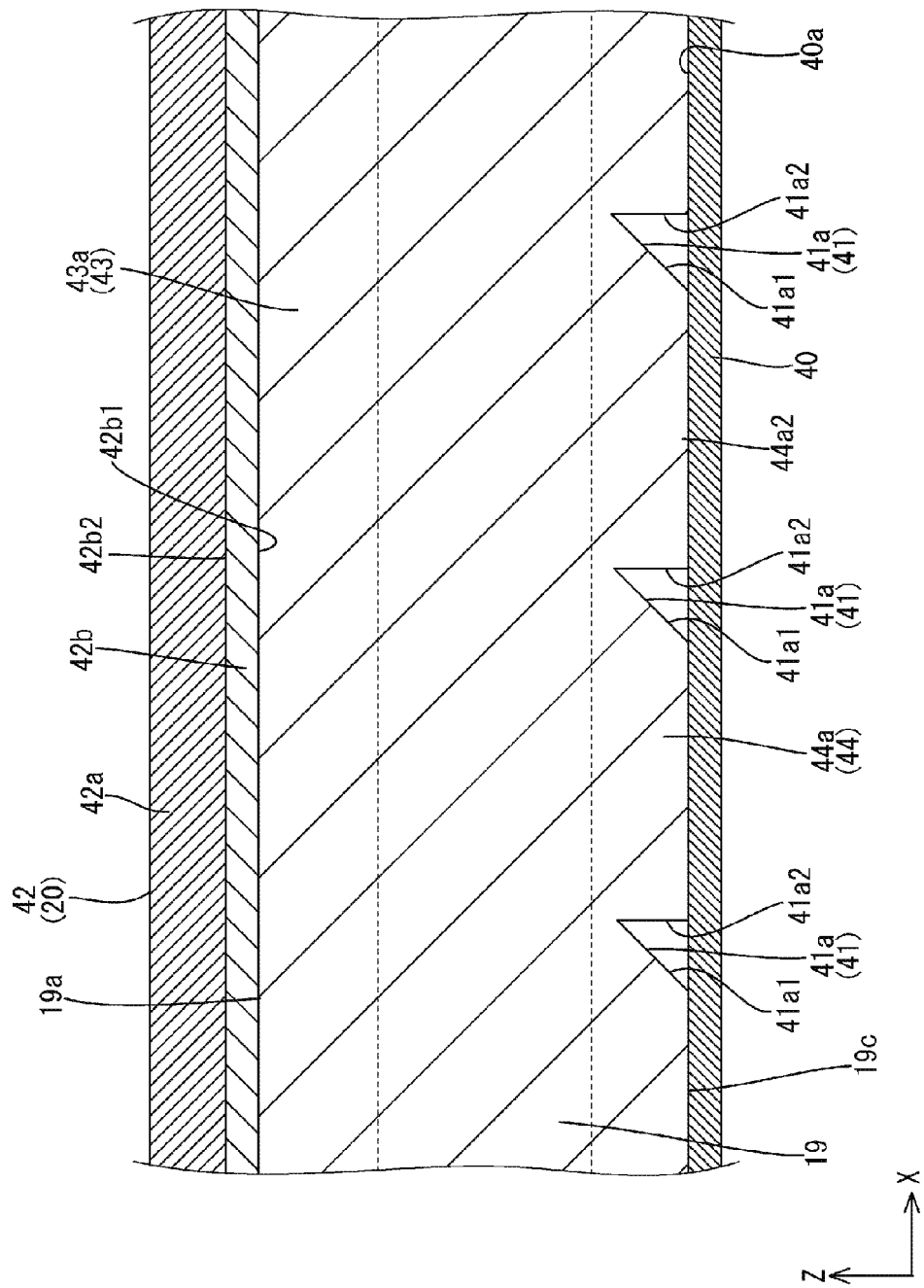
FIG. 10 is a cross-sectional view along the line A-A of FIG. 9.

As shown in FIG. 9, the opposite plate surface-side unit prism 44a having such a configuration applies an anisotropic light focusing effect on the light that has been propagated through the light guide plate 19 and reached the opposite plate surface 19c, in the following manner. If the light that has reached the opposite plate surface 19c is at an incident angle that exceeds the critical angle with respect to the inclined surface 44a1 of the opposite plate surface-side unit prism 44a, then this light totally reflected at the inclined surface 44a1, thereby being refracted so as to travel towards the front in the second direction. In this manner, the light that has been refracted by the opposite plate surface-side unit prisms 44a so as to travel towards the front is reflected at the light emission reflection portion 41 as shown in FIG. 10, thereby traveling upward towards the light-exiting surface 19a. On the other hand, if the light that has reached the light-exiting surface 19a is at an incident angle at or below the critical angle with respect to the inclined surface 44a1 of the opposite plate surface-side unit prism 44a, then, as shown in FIG. 9, this light is refracted at the inclined surface 43a1 and emitted towards the reflective sheet 40. After the light emitted towards the reflective sheet 40 is reflected by the reflective surface 40a of the reflective sheet 40 and travels back towards the opposite plate surface 19c, it enters the inclined surfaces 44a1 of the opposite plate surface-side unit prisms 44a, and then is refracted so as to travel again towards the front in the second direction. When the light that was reflected by the light emission reflection portion 41 and traveling towards the light-exiting surface 19a is retroreflected by the light-exiting surface-side prism portion 43 at the light-exiting surface 19a, the light once again travels towards the opposite plate surface 19c on which the opposite plate surface-side unit prisms 44a are disposed. In this manner, the direction of the light that has been propagated in the light guide plate 19 and has reached the opposite plate surface 19c is regulated so as to become closer to the frontal direction, and light concentration is selectively applied in the second direction as the light travels upward towards the light-exiting surface 19a.

As described above, as shown in FIGS. 9 and 10, light emitted by the LEDs 17 that has entered the light guide plate 19 is selectively focused in the second direction by the opposite plate surface-side prism portion 44 disposed in the opposite plate surface 19c in the process of being propagated in the light guide plate 19, and as a result of being reflected by the light emission reflection portion 41, the light travels upward towards the light-exiting surface 19a. The light that has reached the light-exiting surface 19a is selectively focused in the second direction by the light-exiting surface-side prism portion 43 and emitted. The light emitted from the light-exiting surface 19a is selectively focused even further in the second direction by the light-exiting side unit prisms 42a in the process of passing through the prism sheet 42. In this manner, it is possible to include, in the light that was emitted from the light-exiting surface 19a towards the prism sheet 42, a large portion of light that would be emitted by the light-exiting side unit prisms 42a without being retroreflected. In this manner, the usage rate of light can be sufficiently increased, and it is possible to increase the luminance of light emitted by the backlight device 12. Furthermore, as a result of the opposite plate surface-side prism portion 44 being disposed in the opposite plate surface 19c of the light guide plate 19, it is possible to decrease the number of parts required and to contribute to the thinning of the backlight device 12, compared to an arrangement whereby an anisotropic light focusing portion is added to the light-emitting side of the light guide plate 19. Additionally, the light being propagated through the light guide plate 19 is more susceptible to multiple reflection between the light-exiting surface-side prism portion 43 and the opposite plate surface-side prism portion 44, and thus, the light can be suitably diffused in the first direction inside the light guide plate 19. In this manner, the light guide plate 19 is less susceptible to bright and dark portions forming in portions of the light-exiting surface 19a towards the light-receiving face 19b close to the LEDs 17, and the emitted light is less susceptible to uneven luminance.

As shown in FIG. 9, in the prism sheet 42, the vertex angle θv1 of the light-exiting side unit prisms 42a is less than both vertex angles θv2 and θv3 of the light-exiting surface-side prism units 43a and the opposite plate surface-side unit prisms 44a as previously described, and thus, compared to the light-exiting surface-side prism portion 43 and the opposite plate surface-side prism portion 44, the light-exiting-side unit prisms 42a cause more light to be retroreflected, and the emission angle of the light is more tightly regulated, thereby providing a stronger light focusing effect. By contrast, light supplied to the prism sheet 42 is anisotropically focused by the opposite plate surface-side prism portion 44 at the opposite plate surface 19c of the light guide plate 19, and then anisotropically focused by the light-exiting surface-side prism portion 43 at the light-exiting surface 19a. Thus, the proportion of light retroreflected at the light-exiting side unit prisms 42a of the prism sheet 42 is low, and as a result, the light is efficiently emitted by the light-exiting side unit prisms 42a. In this manner, the usage rate of light can be sufficiently increased, and it is possible to improve the luminance of light emitted by the backlight device 12.

Figure 8:
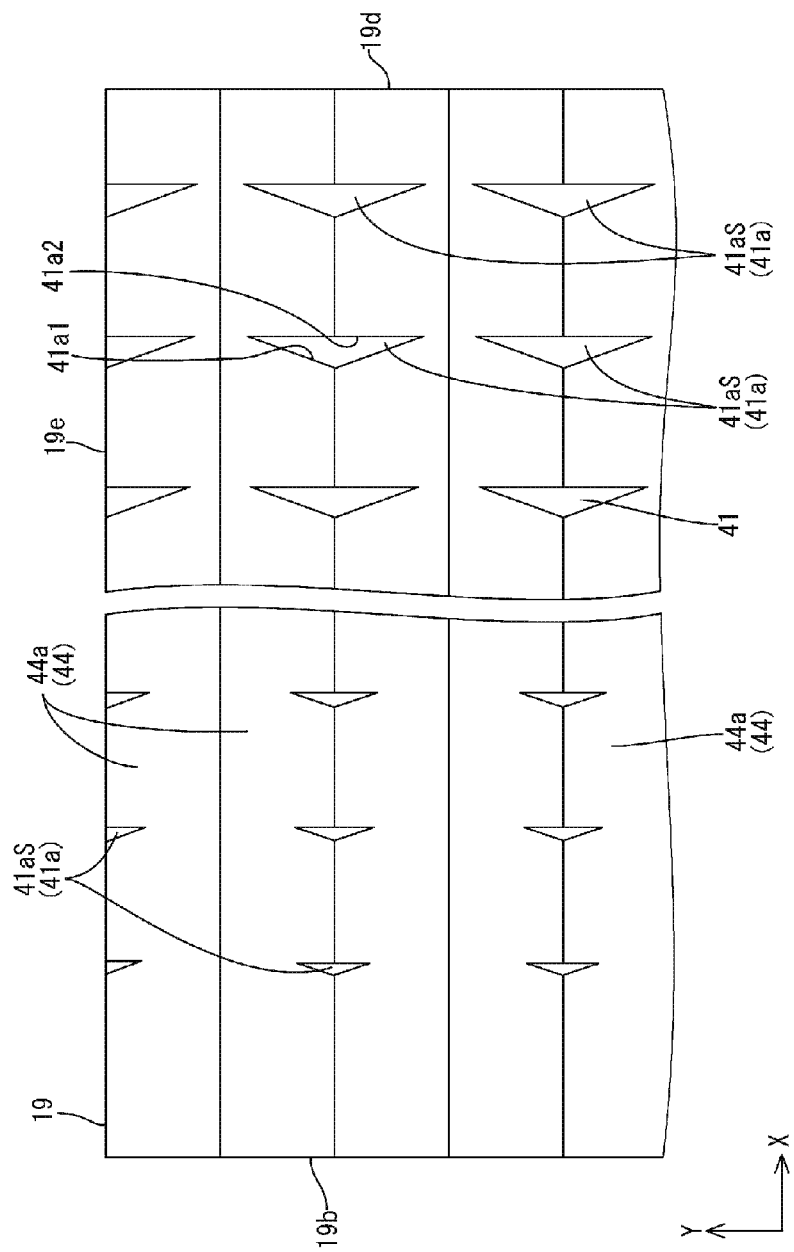
FIG. 8 is a bottom view of a portion of the light guide plate in the vicinity of the edge thereof towards the light-receiving face and in the vicinity of the edge thereof towards the opposite edge face.

Here, the relationship between the light emission reflection portion 41 and the opposite plate surface-side prism portion 44 disposed in the opposite plate surface 19c of the light guide plate 19 will be described in detail. As shown in FIGS. 8 and 9, the reflection units 41a of the light emission reflection portion 41 are formed by partially cutting the vertex portions 44a2 of the opposite plate surface-side unit prisms 44a of the opposite plate surface-side prism portion 44. Thus, the bottom side portions, which are opposite to the vertex portions 44a2 of the opposite plate surface-side unit prisms 44a, do not have the reflection units 41a formed therethrough. The height dimension (dimension in the third direction) of the reflection unit 41a is less than the height dimension of the opposite plate surface-side unit prism 44a. By such a configuration, as shown in FIG. 7, the reflection units 41a extend along the second direction but are not continuous over the entire length of the light guide plate 19 in the second direction, with a plurality of interruptions therebetween. In other words, the reflection units 41a can be said to be constituted of a plurality of split reflection units 41aS that are arranged discontinuously along the second direction with gaps therebetween. Furthermore, the reflection units 41a are formed by partially cutting the vertex portions 44a2 of the opposite plate surface-side unit prisms 44a, thereby forming openings to the side along the second direction. The number of such split reflection units 41aS of the reflection units 41a is the same as the total number of opposite plate surface-side unit prisms 44a of the opposite plate surface-side prism portion 44. Also, the central position of the reflection units 41a in the second direction substantially coincides with the second direction arrangement of the vertex portions 44a2 of the opposite plate surface-side unit prisms 44a. The reflection units 41a, which are aligned in the first direction, are arranged so as to be gradually larger in the height direction (depth direction), the farther way from the light-receiving face 19b (LEDs 17) the reflection units 41a are in the first direction (see FIG. 3), and thus, the farther away the reflection units 41a are from the light-receiving face 19b in the first direction, the larger the width dimension is (range in second direction over which the reflection units 41a are formed). Thus, as shown in FIG. 8, the reflection units 41a disposed in the light-receiving face 19b in the first direction have a relatively smaller width and a relatively smaller surface area, whereas the reflection units 41a disposed in the non-light-receiving opposite face 19d in the first direction have a relatively larger width and a relatively larger surface area. Each split reflection unit 41aS has an isosceles triangular shape in a plan view.

In the reflection unit 41a, the amount of light reflected tends to be proportional to the surface area thereof, and thus, in order to attain the necessary amount of light reflection, the surface area must be set accordingly. This similarly applies to the light emission reflection portions 41, and in order to attain the necessary amount of light reflection by the light emission reflection portions 41, the total surface area of the light emission reflection portions 41 (total combined surface area of the reflection units 41a) must also be set accordingly. Here, if the reflection unit were to be formed so as to extend along the entire length of the light guide plate 19 in the second direction, the third direction dimension of the reflection unit would need to be formed at or above a certain size in order to attain the above-mentioned surface area of the reflection unit. By contrast, if the reflection units 41a are constituted of a plurality of split reflection units 41aS that are arranged discontinuously with gaps therebetween in the second direction, it is possible to set the third direction dimensions of the reflection units 41a to be relatively larger when setting the above-mentioned surface area of the reflection units 41a. Therefore, when manufacturing the light guide plate 19 by resin molding and integrally forming the light emission reflection portions 41 on the opposite plate surface 19c, it is easier to form the split reflection units 41aS of the reflection units 41a as designed on the opposite plate surface 19c, resulting in excellent reproducibility of shape. In this manner, it is possible for the light emission reflection portions 41 to appropriately exhibit optical properties. If the reflection units are formed so as to extend along the entire length of the light guide plate 19 in the second direction, then by reducing the number of reflection units arranged in the first direction it is possible to adjust the total of the surface areas of the reflection units, but this would result in a larger gap between reflection units in the first direction, which presents the risk of uneven luminance occurring. By the reflection units 41a being constituted of the plurality of split reflection units 41aS arranged in a discontinuous manner with gaps therebetween, there is no need to modify the number of and gap between the reflection units 41a in the first direction, and thus, there is little risk of uneven luminance in the light emitted by the backlight device 12. Furthermore, the reflection units 41a are formed by partially cutting the vertex portions 44a2 of the opposite plate surface-side unit prisms 44a, thereby forming openings along the second direction, which allows for excellent light focusing performance by the opposite plate surface-side prism portion 44. Specifically, if the reflection units have a side face along the first direction without any openings in the second direction, the light is refracted or reflected by the side face along the first direction, which presents the risk of decreased light focusing performance by the opposite plate surface-side prism portion. The reflection units 41a are formed by partially cutting the vertex portions 44a2 of the opposite plate surface-side unit prisms 44a, thereby forming openings along the second direction, which allows for excellent light focusing performance by the opposite plate surface-side prism portion 44, and enables the luminance of the light emitted by the backlight device 12 to be further increased.

As described above, in the present embodiment, the light-exiting surface-side prism portion 43 and the opposite plate surface-side prism portion 44 are provided, respectively, on the light-exiting surface 19a and the opposite plate surface 19c of the light guide plate 19, such that the emitted light is efficiently focused in the second direction and a high luminance is attained. However, depending on conditions such as distribution density of the LEDs 17 in the second direction, there are some cases where the light focusing effect exhibited by the prism sheet 42, the light-exiting surface-side prism portion 43, and the opposite plate surface-side prism portion 44 is excessive, and in such cases, there is a risk of uneven luminance in light emitted especially from areas of the light guide plate 19 towards the light-receiving face 19b in the first direction. However, as shown in FIGS. 2, 6, and 9, in the present embodiment, in addition to the light-exiting surface-side prism portion 43, bow-shaped portions 45 that extend in the first direction and have a bow-shaped cross-section in the second direction (cross-section taken along the second direction) are formed in the light-exiting surface 19a of the light guide plate 19. The bow-shaped portions 45 have curved surfaces, and the cross-sectional shape thereof in the second direction (cross-section taken along the second direction) is curved. Below, the bow-shaped portions 45 will be explained in detail.

As shown in FIGS. 2, 6, and 9, the bow-shaped portions 45 are disposed so as to be adjacent to either or both sides of the light-exiting surface-side prism units 43a in the second direction. The width dimension (dimension in the second direction) of the bow-shaped portions 45 is approximately half the gap between adjacent light-exiting surface-side prism units 43a in the second direction with two bow-shaped portions 45 being interposed between the light-exiting surface-side prism units 43a that are adjacent to each other in the second direction. In other words, a plurality of light-exiting surface-side prism units 43a are disposed intermittently along the second direction with gaps therebetween equal to the width of two bow-shaped portions 45. Two bow-shaped portions 45 are provided so as to be interposed between the vertex portions 43a2 of the light-exiting surface-side prism units 43a in the second direction. The two bow-shaped portions 45, which are between the light-exiting surface-side prism units 43a adjacent to each other in the second direction, are adjacent to each other in the second direction and have cross-sectional shapes that are symmetrical to each other. One edge 45a of the bow-shaped portions 45 in the second direction is continuous with the inclined surface 43a1 of the light-exiting surface-side prism unit 43, whereas the other edge 45b in the second direction is at a lower position than the one edge. In other words, the one edge 45a of the bow-shaped portions 45 that is continuous with the inclined surface 43a1 of the light-exiting surface-side prism unit 43 is at a higher position than the other edge 45b, which is not continuous with the inclined surface 43a1 of the light-exiting surface-side prism unit 43. The other edges 45b of the two bow-shaped portions 45, which are between the light-exiting surface-side prism units 43a adjacent to each other in the second direction, coincide in position. The one edge 45a of the bow-shaped portion 45 coincides in position with the edge of the light-exiting surface-side prism unit 43a, which is farthest from the vertex portion 43a2. The bow-shaped portions 45 have a belt shape in a plan view, and, similar to the light-exiting surface-side prism unit 43a, are provided so as to extend along the entire length of the light guide plate 19 in the first direction. The bow-shaped portions 45 have a uniform width, that is, the proportion of the light-exiting surface 19a occupied in the second direction, along the entire length thereof in the first direction. The width dimension of the bow-shaped portions 45 is set such that the proportion of the light-exiting surface 19a occupied by the bow-shaped portions 45 in the second direction is greater than or equal to the same proportion of the light-exiting surface-side prism units 43a. In FIGS. 2, 6, and 9, the proportion of the light-exiting surface 19a occupied by the bow-shaped portions 45 in the second direction is depicted to be approximately 70-80%. In addition, the light-exiting surface-side prism units 43a are disposed in both edges of the light guide plate 19 in the second direction, and if the number of light-exiting surface-side prism units 43a is "n," the number of bow-shaped portions 45 is 2×(n−1).

Next, the effects of the bow-shaped portions 45 will be described. Light that has entered the light guide plate 19 from the LEDs 17 is propagated inside the light guide plates 19 and reaches the light-exiting surface 19a. The light that has reached the light-exiting surface 19a at least includes components that are anisotropically focused by the light-exiting surface-side prism units 43a and emitted, components that are totally reflected by the light-exiting surface-side prism units 43a and returned towards the opposite plate surface 19c, and components that are totally reflected by the arc-shaped curved surface of the bow-shaped portions 45 and returned to the opposite plate surface 19c. Among these, the light that is totally reflected by the surface of the bow-shaped portions 45 and returned to the opposite plate surface 19c is scattered over a wider range in the second direction as it is propagated in the light guide plate 19 compared to the light that was totally reflected by the light-exiting surface-side prism units 43a and returned to the opposite plate surface 19c. Thus, light that is being propagated in the light guide plate 19 is appropriately scattered in the second direction, is anisotropically focused by the light-exiting surface-side prism units 43a, and then emitted, and thus, the emitted light is not susceptible to uneven luminance. As described above, the prism sheet 42, the light-exiting surface-side prism portion 43, and the opposite plate surface-side prism portion 44 improve the luminance of the emitted light, and the uneven luminance of the emitted light is mitigated by the bow-shaped portions 45, which allows for a balance between improved luminance and mitigation of uneven luminance. Furthermore, one edge 45a of the bow-shaped portions 45 in the second direction is continuous with the inclined surface 43a1 of the light-exiting surface-side prism unit 43 and is disposed in a higher position than the other edge 45b, whereas the other edge 45b in the second direction is at a lower position than the one edge 45a. Thus, compared to a case in which both edges of the bow-shaped portion in the second direction were disposed at the same height as the other edge 45b, the surface area of the light-exiting surface-side prism units 43a1 is reduced. In this manner, the light focusing effect on light by the light-exiting surface-side prism portion 43 is mitigated, enabling a relative reduction in uneven luminance by the bow-shaped portions 45. Also, compared to a case in which both edges of the bow-shaped portion in the second direction were disposed at the same height as the one edge 45a, the surface area of the bow-shaped portions 45 is increased, and thus, uneven luminance is mitigated to a greater degree by the bow-shaped portions 45. As a result, it is possible to suitably mitigate uneven luminance.

The backlight device 12 (illumination device) of the present embodiment, as described above, includes: LEDs 17 (light sources); a light guide plate 19 having a rectangular plate shape, at least one of a pair of edge faces forming opposing sides of outer edge faces of the light guide plate being a light-receiving face 19b into which light emitted by the LEDs 17 is radiated, one plate surface of the light guide plate 19 being a light-exiting surface 19a from which light exits, another plate surface thereof being an opposite plate surface 19c; a prism sheet 42 (light-exiting side anisotropic light focusing member) that is disposed on a light-exiting side of the light guide plate 19, the prism sheet 42 being formed by arranging, in a second direction along a pair of edge faces 19b and 19d of the outer edge faces of the light guide plate 19 including the light-receiving face 19b, a plurality of light-exiting side unit prisms 42a (light-exiting side unit light focusing units) that extend along a first direction along non-light-receiving side faces 19e, which are a pair of edge faces that form opposing sides of the outer edge faces of the light guide plate 19 and do not include the light-receiving face 19b; a light-exiting surface-side prism portion 43 (light-exiting surface-side anisotropic light focusing prism portion) that is disposed in the light-exiting surface 19a of the light guide plate 19, and that is formed by arranging a plurality of light-exiting surface-side prism units 43a, extending in the first direction, in the second direction; a light emission reflection portion 41 that is disposed in the opposite plate surface 19c of the light guide plate 19 and that is formed by arranging a plurality of reflection units 41a, extending in the second direction, along the first direction with gaps therebetween; an opposite plate surface-side prism portion 44 (opposite plate surface-side anisotropic light focusing prism portion) that is disposed in the opposite plate surface 19c of the light guide plate 19, and that is formed by arranging a plurality of opposite plate surface-side unit prisms 44a (opposite plate surface-side unit light focusing units) extending in the first direction, in the second direction; and bow-shaped portions 45 that are arranged adjacent in the second direction to the light-exiting surface-side prism units 43a on the light-exiting surface 19a of the light guide plate 19, and that extend in the first direction and have a bow shaped cross-section in the second direction.

In this manner, light emitted from the LEDs 17 enters the light-receiving face 19b of the light guide plate 19, is propagated inside the light guide plate 19, and in the process is reflected by the light emission reflection portions 41 disposed in the opposite plate surface 19c of the light guide plate 19. The light emission reflection portions 41 formed by arranging a plurality of reflection units 41a, extending in the second direction, along the first direction with gaps therebetween, and thus, by reflecting light traveling in the light guide plate 19 along the first direction off of the plurality of reflection units 41a, the light can be caused to travel upward towards the light-exiting surface 19a. In this manner, it is possible to cause the light to be emitted from the light-exiting surface 19a.

The light that has reached the light-exiting surface 19a of the light guide plate 19 is anisotropically focused by the light-exiting surface-side prism portion 43 disposed in the light-exiting surface 19a of the light guide plate 19. In other words, the light-exiting surface-side prism portion 43 has a configuration in which a plurality of light-exiting surface-side prism units 43a, extending along the first direction, are arranged in the second direction, and thus, the light emitted from the light-exiting surface-side prism units 43a is selectively focused in the second direction, which is the direction along which the light-exiting surface-side prism units 43a are aligned. The light emitted from the light-exiting surface 19a is further anisotropically focused by the prism sheet 42 disposed on the light-exiting side of the light guide plate 19. In other words, the prism sheet 42 has a configuration in which a plurality of light-exiting side unit prisms 42a, extending along the first direction, are arranged in the second direction, and thus, the light emitted from the light-exiting side unit prisms 42a is selectively focused in the second direction, which is the direction along which the light-exiting side unit prisms 42a are aligned.

In this manner, the light emitted from the backlight device 12 is first selectively focused in the second direction by the light-exiting surface-side prism portion 43, and then selectively focused in the second direction by the prism sheet 42, causing the light to travel towards the front in an excellent manner. However, when the light that has been anisotropically focused by the light-exiting surface-side prism portion 43 has entered the prism sheet 42, there is still a lot of light that is retroreflected by the light-exiting side unit prisms 42a, which means that the usage rate of light is not sufficiently high, which has meant that there is room for improvement in the luminance of light emitted by the backlight device 12.

However, the opposite plate surface-side prism portion 44 is disposed in the opposite plate surface 19c of the light guide plate 19, and the opposite plate surface-side prism portion 44 has a configuration in which a plurality of opposite plate surface-side unit prisms 44a, extending along the first direction, are arranged in the second direction, and thus, the light that was propagated in the light guide plate 19 and has reached the opposite plate surface 19c is selectively focused in the second direction, which is the direction along which the opposite plate surface-side unit prisms 44a are aligned. The light that has been anisotropically focused at the opposite plate surface 19c is caused to travel upward towards the light-exiting surface 19a by the light emission reflection portions 41 and then further selectively focused in the second direction by the light-exiting surface-side prism portion 43 at the light-exiting surface 19a. In this manner, it is possible to include, in the light that was emitted from the light-exiting surface 19a towards the prism sheet 42, a large portion of light that would be emitted by the light-exiting side unit prisms 42a without being retroreflected. In this manner, the usage rate of light can be sufficiently increased, and it is possible to increase the luminance of light emitted by the backlight device 12. Furthermore, as a result of the opposite plate surface-side prism portion 44 being disposed in the opposite plate surface 19c of the light guide plate 19, it is possible to decrease the number of parts required and to contribute to the thinning of the backlight device 12, compared to an arrangement whereby an anisotropic light focusing portion is added to the light-emitting side of the light guide plate 19.

Additionally, bow-shaped portions 45 that are arranged adjacent in the second direction to the light-exiting surface-side prism units 43a on the light-exiting surface 19a of the light guide plate 19, and that extend in the first direction and have a bow shaped cross-section in the second direction are provided, and thus, the light that was propagated inside the light guide plate 19 and that has reached the light-exiting surface 19a includes components that are totally reflected off of the surface of the bow-shaped portions 45, which are arc-shaped in a cross-sectional view, and returned to the opposite plate surface 19c. The light that is returned to the opposite plate surface 19c by the surface of the bow-shaped portions 45 is scattered to a greater degree in the second direction and propagated in the light guide plate 19 compared to the light that was totally reflected by the light-exiting surface-side prism units 43a and returned to the opposite plate surface 19c. Thus, the light emitted by the backlight device 12 is less susceptible to uneven luminance. In this manner, it is possible to achieve a balance between improvement of luminance and mitigation of uneven luminance for the light emitted by the backlight device 12.

Also, one edge 45a of the bow-shaped portions 45 in the second direction is continuous with the inclined surface 43a1 of the light-exiting surface-side prism unit 43a, whereas the other edge 45b in the second direction is at a lower position than the one edge 45a. In this manner, compared to a case in which both edges of the bow-shaped portion in the second direction were disposed at the same height as the other edge 45b, the surface area of the light-exiting surface-side prism units 43a becomes smaller in proportion to the degree to which the one edge 45a in the second direction of the bow-shaped portion 45 is continuous with the inclined surface 43a1 of the light-exiting surface-side prism unit 43a and higher than the other edge 45b. In this manner, the light focusing effect on light by the light-exiting surface-side prism portion 43 is mitigated, enabling a relative reduction in uneven luminance by the bow-shaped portions 45. Also, compared to a case in which both edges of the bow-shaped portion in the second direction were disposed at the same height as the one edge 45a, the surface area of the bow-shaped portions 45 is increased, and thus, uneven luminance is mitigated to a greater degree by the bow-shaped portions 45. As a result, it is possible to suitably mitigate uneven luminance.

Also, the light-exiting surface-side prism units 43a and the bow-shaped portions 45 occupy the same proportion of the light-exiting surface 19a in the second direction along the entire length of the light guide plate 19 in the first direction. In this manner, the light-exiting surface-side prism units 43a and the bow-shaped portions 45 disposed in the light-exiting surface 19a of the light guide plate 19 have a simple structure, and thus, are easier to manufacture, and the shapes of the light-exiting surface-side prism units 43a and the bow-shaped portions 45 are easier to reproduce.

Also, the liquid crystal display device 10 (display device) of the present embodiment includes the backlight device 12 and the liquid crystal panel 11 (display panel), which performs display using light from the backlight device 12. According to the liquid crystal display device 10 configured in this manner, excellent display quality can be attained because the light emitted from the backlight device 12 has a high front luminance with uneven luminance unlikely to occur.

The display panel is a liquid crystal panel 11 having liquid crystal sealed between a pair of substrates 11a and 11b. Such a display device can be applied as a liquid crystal display device 10 to various applications such as displays for smartphones and tablet PCs, for example.

Embodiment 2

Embodiment 2 of the present invention will be described with reference to FIGS. 11 to 19. In Embodiment 2, the form of light-exiting surface-side prism units 143a and bow-shaped portions 145 has been changed. Descriptions of structures, operations, and effects similar to those of Embodiment 1 will be omitted.

Figure 11:
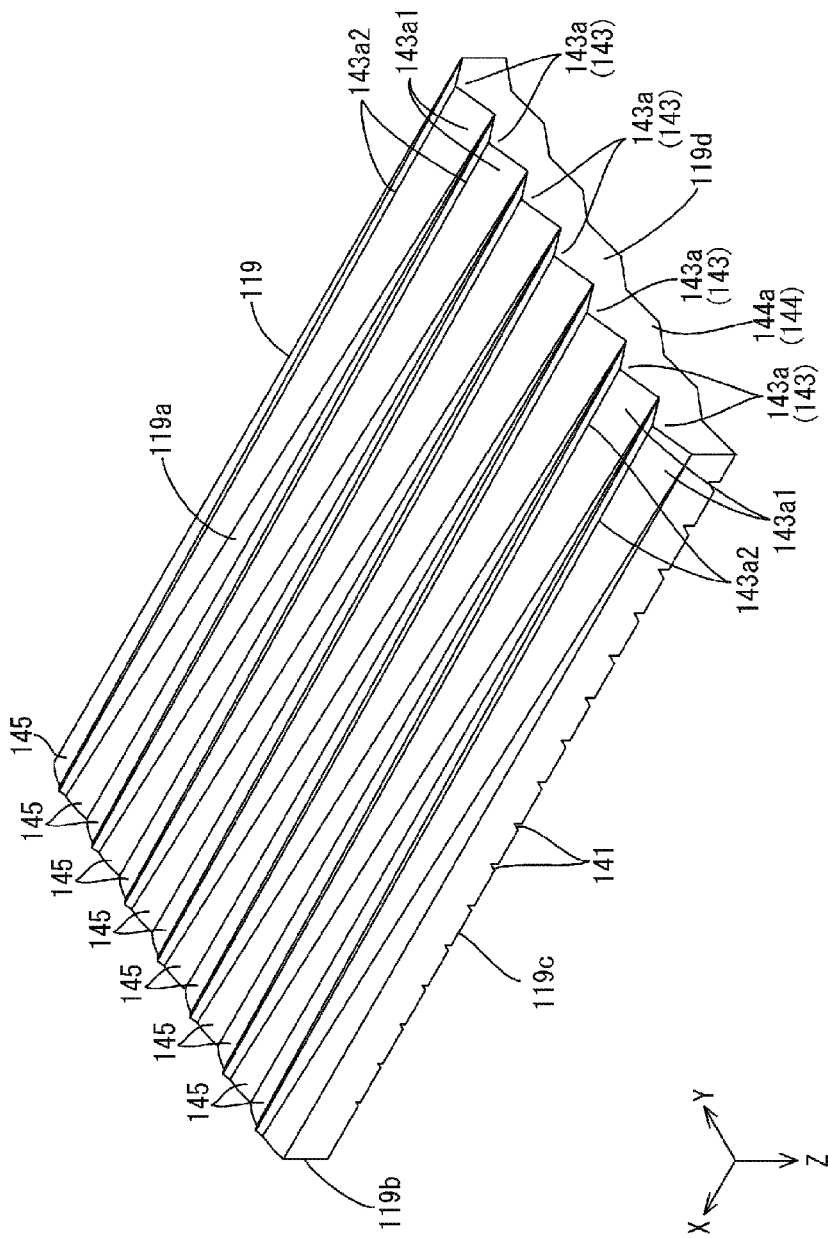
FIG. 11 is a perspective view of a light guide plate according to Embodiment 2 of the present invention.
Figure 12:
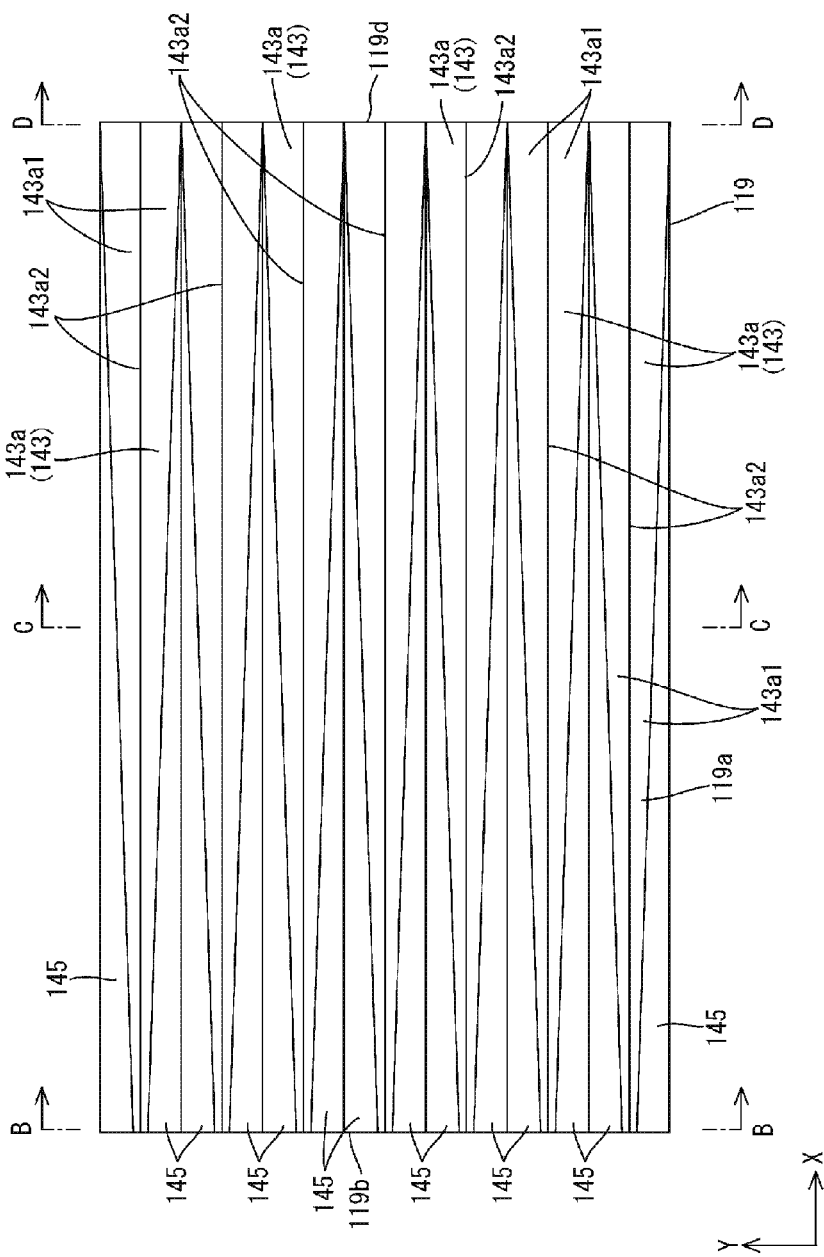
FIG. 12 is a plan view of a light guide plate.

As shown in FIGS. 11 and 12, the light-exiting surface-side prism units 143a and bow-shaped portions 145 constituting the light-exiting surface-side prism portion 143 of the present embodiment are provided so as to occupy different proportions (widths) in the second direction (Y axis direction) of the light-exiting surface 119a between a side close to the light-receiving face 119b in the first direction (X axis direction) (side far from the non-light-receiving opposite face 119d), and a side far from the light-receiving face 119b in the first direction (side close to the non-light-receiving opposite face 119d). In other words, the light-exiting surface-side prism units 143a occupy a low proportion of the light-exiting surface 119a in portions close to the light-receiving face 119b in the first direction but occupy a high proportion of the light-exiting surface 119a in portions far from the light-receiving face 119b in the first direction, whereas the bow-shaped portions 145 occupy a high proportion of the light-exiting surface 119a in areas close to the light-receiving face 119b in the first direction but occupy a low proportion of the light-exiting surface 119a in areas far from the light-receiving face 119b in the first direction.

Figure 13:
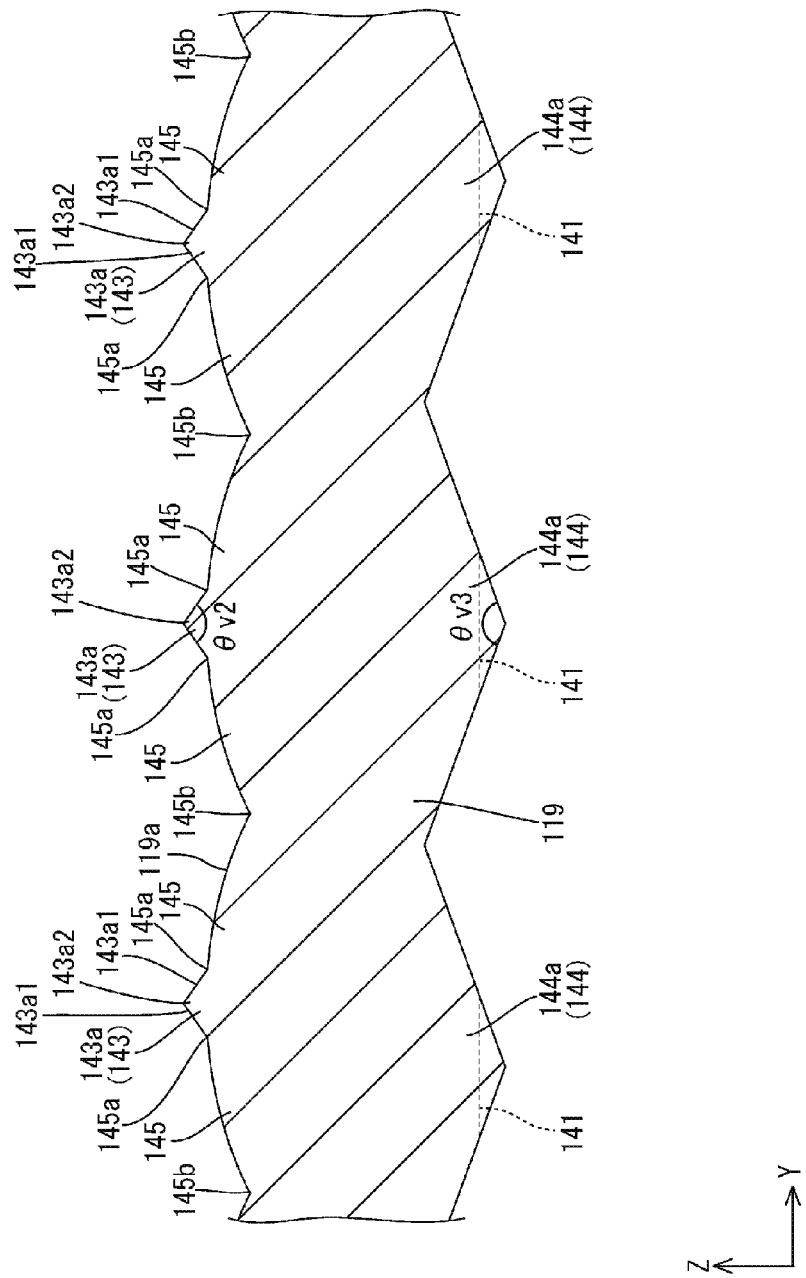
FIG. 13 is a cross-sectional view along the line B-B of FIG. 12.
Figure 15:
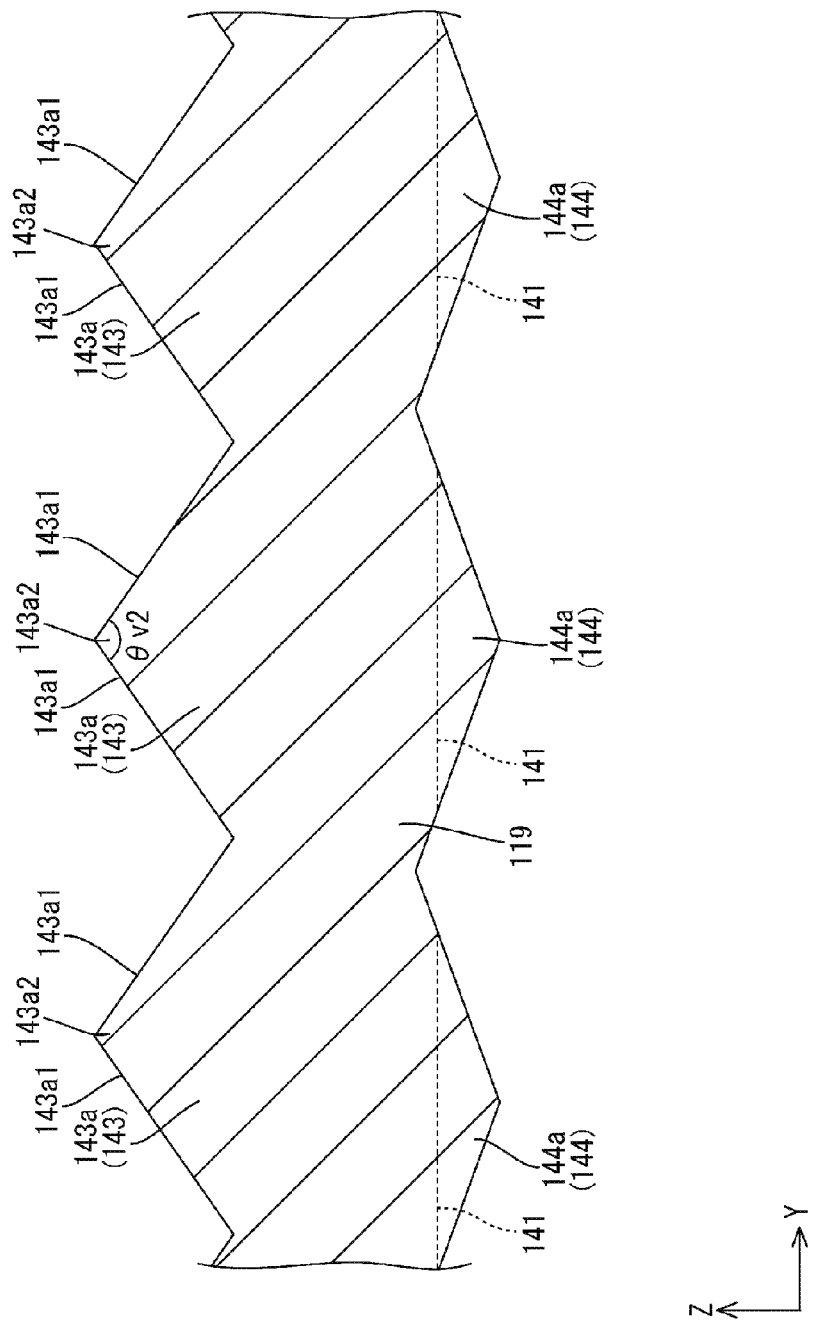
FIG. 15 is a cross-sectional view along the line D-D of FIG. 12.

Specifically, as shown in FIGS. 11 and 12, the light-exiting surface-side prism units 143a gradually and continuously increase in the proportion (width) of the light-exiting surface 119a occupied in the second direction from the light-receiving face 119b towards the non-light-receiving opposite face 119d in the first direction, whereas the proportion of the light-exiting surface 119a occupied by the light-exiting surface-side prism units 143a gradually and continuously decreases from the non-light-receiving opposite face 119d towards the light-receiving face 119b in the first direction. As shown in FIGS. 12 and 13, the light-exiting surface-side prism units 143a occupy a minimum of approximately 20-30% of the light-exiting surface 119a at the edge (edge position) towards the light-receiving face 119b in the first direction of the light guide plate 119, whereas as shown in FIGS. 12 and 15, the proportion occupied at the edge towards the non-light-receiving opposite face 119d is at a maximum of approximately 100%, for example. Thus, at the edge towards the non-light-receiving opposite face 119d, the width of the light-exiting surface-side prism unit 143a is substantially equal to the gap between the light-exiting surface-side prism units 143a aligned in the second direction (distance between vertices of the light-exiting surface-side prism units 143a in the second direction). By contrast, the bow-shaped portions 145 gradually and continuously decrease in the proportion of the light-exiting surface 119a occupied from the light-receiving face 119b towards the non-light-receiving opposite face 119d in the first direction, whereas the proportion of the light-exiting surface 119a occupied by the bow-shaped portions 145 gradually and continuously increases from the non-light-receiving opposite face 119d towards the light-receiving face 119b in the first direction. As shown in FIGS. 12 and 13, the bow-shaped portions 145 occupy a maximum of approximately 70-80% of the light-exiting surface 119a at the edge towards the light-receiving face 119b in the first direction of the light guide plate 119, whereas as shown in FIGS. 12 and 15, the proportion occupied at the edge towards the non-light-receiving opposite face 119d is at a minimum of approximately 0%, for example. In other words, at the edge of the light-exiting surface 119a towards the non-light-receiving opposite face 119d, no bow-shaped portion 145 is present between the light-exiting surface-side prism units 143a in the second direction, and the plurality of light-exiting surface-side prism units 143a are directly adjacent to each other. The rate of change in the proportion occupied by the light-exiting surface-side prism units 143a and the bow-shaped portions 145 is the same between both.

In this manner, the light-exiting surface-side prism units 143a, and the two bow-shaped portions 145 present between the light-exiting surface-side prism units 143a that are adjacent to each other in the second direction are, as shown in FIGS. 13 and 15, approximately the same width at the edge of the light guide plate 119 towards the light-receiving face 119b in the first direction, whereas at the edge towards the non-light-receiving opposite face 119d, no bow-shaped portion 145 is present and only the light-exiting surface-side prism units 143a are present. As shown in FIG. 12, both edges (from vertex portion 143a2 to the furthest edge) that define the width of the light-exiting surface-side prism units 143a are inclined with respect to both the first direction and the second direction in a plan view, whereas the vertex portions 143a2 are all straight lines parallel to each other in the first direction along the entire length thereof. One edge 145a of the bow-shaped portion 145 is inclined with respect to both the first direction and the second direction in a plan view, whereas the other edges 145b are all straight lines parallel to each other in the first direction along the entire length thereof. In other words, the bow-shaped portions 145 have an arrangement by which, at the edge towards the light-receiving face 119*b* in the first direction, the one edge 145*a* and the other edge 145*b* are farthest away from each other in the second direction, and moving towards the non-light-receiving opposite face 119*d* in the first direction, the one edge 145*a* becomes gradually closer to the other edge 145*b*, and at the edge towards the non-light-receiving opposite face 119*d* in the first direction, the one edge 145*a* merges (coincides in position) with the other edge 145*b*. In addition, the light-exiting surface-side prism units 143*a* have a narrow isosceles triangular shape in a plan view. The bow-shaped portions 145 have a narrow right triangular shape in a plan view.

The edge of the light guide plate 119 towards the light-receiving face 119*b* in the first direction (close to the light-receiving face 119*b*) is more susceptible to uneven luminance in light emitted from the light-exiting surface 119*a*, whereas the edge towards the non-light-receiving opposite face 119*d* in the first direction (far from the light-receiving face 119*b*) is more susceptible to insufficient luminance in light emitted from the light-exiting surface 119*a*. However, whereas the proportion of the light-exiting surface 119*a* occupied in the second direction by the light-exiting surface-side prism units 143*a* gradually and continuously increases from the light-receiving face 119*b* towards the non-light-receiving opposite face 119*d* in the first direction, the same proportion occupied by the bow-shaped portions 145 gradually and continuously decreases from the light-receiving face 119*b* towards the non-light-receiving opposite face 119*d*, and thus, at the edge of the light guide plate 119 towards the light-receiving face 119*b* in the first direction, uneven luminance is more suitably mitigated, and at the edge towards the non-light-receiving opposite face 119*d* in the first direction, luminance is more suitably increased. In this manner, it is possible to more suitably achieve a balance between improvement of luminance and mitigation of uneven luminance for the light emitted by the backlight device. By contrast, as described above, the proportion of the light-exiting surface 119*a* occupied in the second direction is lowest for the light-exiting surface-side prism units 143*a* and highest for the bow-shaped portions 145 at the edge towards the light-receiving face 119*b* in the first direction, and thus, at the edge towards the light-receiving face 119*b* in the first direction where uneven luminance is of greatest concern, uneven luminance is more suitably mitigated by the bow-shaped portions 145. Additionally, the proportion of the light-exiting surface 119*a* occupied in the second direction is highest for the light-exiting surface-side prism units 143*a* and lowest for the bow-shaped portions 145 at the edge towards the non-light-receiving opposite face 119*d* in the first direction, and thus, at the edge towards the non-light-receiving opposite face 119*d* in the first direction where insufficient luminance is of greatest concern, luminance is more suitably improved by the light-exiting surface-side prism units 143*a*. The proportion of the light-exiting surface 119*a* occupied by the light-exiting surface-side prism units 143*a* and the bow-shaped portions 145 gradually and continuously change, and thus, compared to a case in which this proportion changed in a stepwise fashion, it is possible to more suitably mitigate uneven luminance along the entire length of the light guide plate 119 in the first direction and to suitably improve luminance. In this manner, it is possible to more suitably achieve a balance between improvement of luminance and mitigation of uneven luminance for the light emitted by the backlight device.

Figure 14:
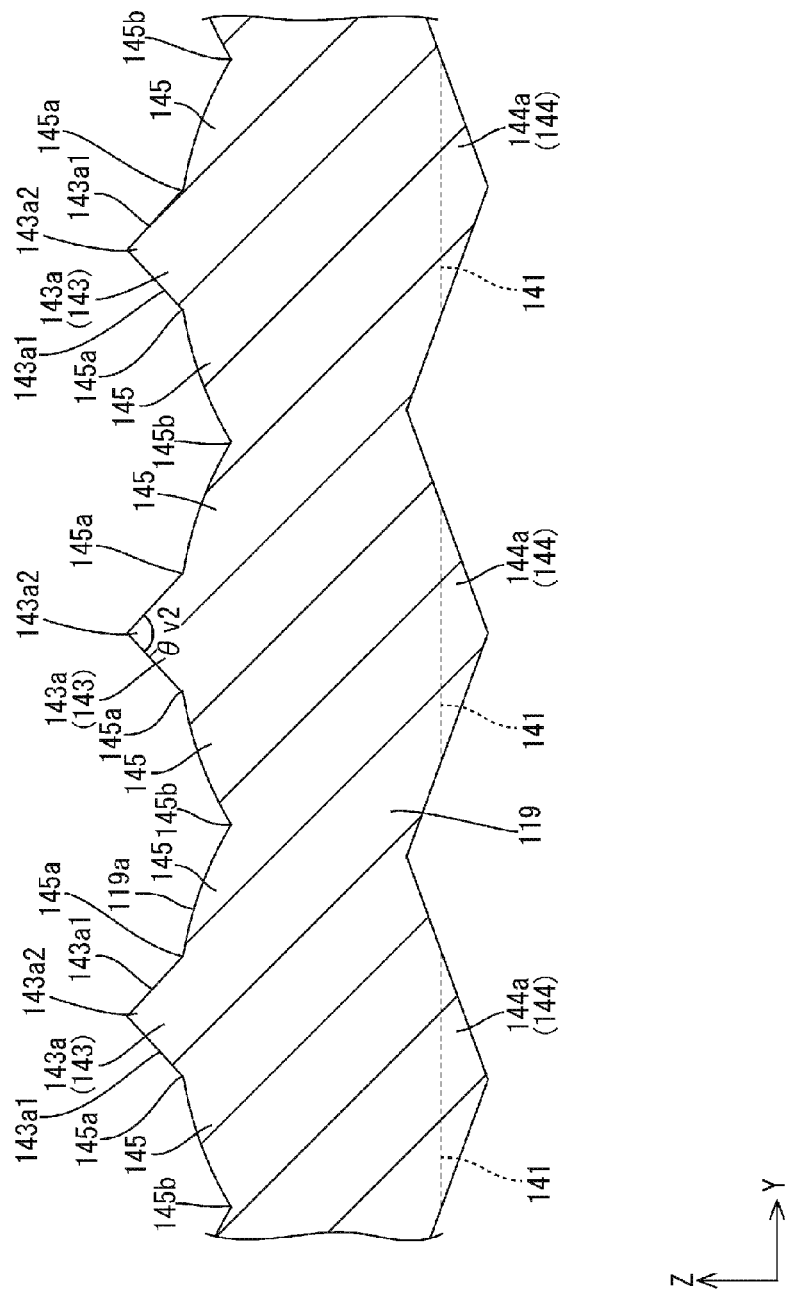
FIG. 14 is a cross-sectional view along the line C-C of FIG. 12.

As shown in FIGS. 13 to 15, the light-exiting surface-side prism units 143*a* are provided so as to gradually and continuously increase in width (dimension in the second direction) and height (dimension in the third direction) from the light-receiving face 119*b* towards the non-light-receiving opposite face 119*d* in the first direction. The light-exiting surface-side prism units 143*a* have a uniform vertex angle θv2 (approximately 110°, for example) along the entire length thereof in the first direction. The optical characteristics, that is, the light focusing characteristics of the light-exiting surface-side prism units 143*a* having a substantially triangular cross-section depend greatly on the vertex angle θv2, and thus, by maintaining the same vertex angle θv2 as described above, it is possible to similarly maintain unit light focusing characteristics throughout the entire length thereof in the first direction. Thus, regardless of the position on the light-exiting surface 119*a* in the first direction, the light emitted from the light-exiting surface-side prism units 143*a* is at the same angle, and thus, it is possible to maintain high luminance while more suitably mitigating uneven luminance. By contrast, the bow-shaped portions 145 have a substantially uniform height along the entire length thereof in the first direction. Thus, the height (position in third direction) of one edge 145*a* of the bow-shaped portions 145 with respect to the inclined surface 143*a*1 of the light-exiting surface-side prism unit 143*a* and the height of the other edge 145*b* are substantially the same throughout the entire length thereof in the first direction. Thus, the distance in the third direction between the vertex portion 143*a*2 of the light-exiting surface-side prism unit 143*a* and the one edge 145*a* of the bow-shaped portion 145, which is continuous with the inclined surface 143*a*1, gradually and continuously increases from the light-receiving face 119*b* towards the non-light-receiving opposite face 119*d* in the first direction. In other words, the distance between the vertex portion 143*a*2 to the edge (one edge 145*a* of the bow-shaped portion 145) on the inclined surface 143*a*1 of the light-exiting surface-side prism unit 143*a* gradually and continuously increases from the light-receiving face 119*b* towards the non-light-receiving opposite face 119*d* in the first direction. In this manner, the surface area of the light-exiting surface-side prism unit 143*a* gradually and continuously increases from the light-receiving face 119*b* towards the non-light-receiving opposite face 119*d* in the first direction, and thus, it is possible to focus to a greater degree light that is being propagated inside the light guide plate 119, towards the non-light-receiving opposite face 119*d* in the first direction. In this manner, it is possible to attain increased luminance for emitted light in the portion of the light guide plate 119 towards the non-light-receiving opposite face 119*d* in the first direction.

Next, Comparison Experiment 1 was performed in order to ascertain whether or not the degree of unevenness in luminance changes depending on the presence or absence of the bow-shaped portions 145. In Comparison Experiment 1, a light guide plate that does not have bow-shaped portions 145 is used as Comparison Example 1, and the light guide plate 119 having the bow-shaped portions 145 is used as Working Example 1. Specifically, the light guide plate according to Comparison Example 1 is provided with a light emission reflection portion and an opposite plate surface-side prism portion constituted of a plurality of opposite plate surface-side unit prisms having a vertex angle of 140° on the opposite plate surface, as well as being provided with a light-exiting surface-side prism portion constituted of a plurality of light-exiting surface-side prism units having a vertex angle of 110° on the light-exiting surface. In the light-exiting surface-side prism portion provided on the light guide plate of Comparison Example 1, the proportion of the light-exiting surface occupied by the light-exiting surface-side prism unit in the second direction gradually and continuously increases from the light-receiving face towards the non-light-receiving opposite face in the first direction. The portion of the light-exiting surface of the light guide plate of Comparison Example 1 where the light-exiting surface-side prism units are not formed is a flat surface. The light guide plate 119 according to Working Example 1 is provided with light emission reflection portions 141 and an opposite plate surface-side prism portion 144 constituted of a plurality of opposite plate surface-side unit prisms 144a having a vertex angle θv3 of 140° on the opposite plate surface 119c, is provided with a light-exiting surface-side prism portion 143 constituted of a plurality of light-exiting surface-side prism units 143a having a vertex angle θv2 of 110° on the light-exiting surface 119a, and additionally is provided with bow-shaped portions 145 on the light-exiting surface 119a. In the light guide plate 119 of Working Example 1, whereas the proportion of the light-exiting surface 119a occupied in the second direction by the light-exiting surface-side prism units 143a gradually and continuously increases from the light-receiving face 119b towards the non-light-receiving opposite face 119d in the first direction, the same proportion occupied by the bow-shaped portions 145 gradually and continuously decreases from the light-receiving face 119b towards the non-light-receiving opposite face 119d in the first direction. In the light guide plates of Comparison Example 1 and Working Example 1, the light-exiting surface-side prism units occupy the same proportion of the light-exiting surface in the second direction both at the edge towards the light-receiving face and the edge towards the non-light-receiving opposite face in the first direction, and the rate of change in this proportion is also the same. The light guide plate 119 of Working Example 1 has the same configuration as the light guide plate 119 described in the paragraphs prior to the description of Comparison Experiment 1.

In Comparison Experiment 1, the presence or absence of uneven luminance was determined for the light guide plates of Comparison Experiment 1 and Working Example 1 on the basis of photographs taken from the light-exiting surface side in a state where light from LEDs is radiated into the light-receiving face and light is being emitted from the light-exiting surface, and results of this experiment are shown in the table of FIG. 16. FIG. 16 shows photographs taken from the light-exiting surface side of the light guide plates of Comparison Example 1 and Working Example 1 with light being radiated from the light-exiting surfaces, and determination results for uneven luminance on the basis of these photographs. The photographs shown in FIG. 16 show, in particular, the portion of the light-exiting surfaces of the light guide plates towards the light-receiving faces, and LEDs, which are not shown, are disposed directly below the photographs.

The results of Comparison Experiment 1 will be described below. As seen from FIG. 16, when the light guide plate 119 of Working Example 1 is used, it can be seen that unevenness in luminance is not readily seen compared to the light guide plate of Comparison Example 1. In the light guide plate of Comparison Example 1, light that was propagated through the light guide plate and that has reached the light-exiting surface is totally reflected by the flat surface formed where the light-exiting surface-side prism units are not formed, and thus, while the light is scattered to a certain degree in the second direction in this light guide plate, the scattering effect is weaker compared to the light guide plate 119 of Working Example 1. By contrast, in the light guide plate 119 of Working Example 1, the light that was propagated through the light guide plate 119 and that has reached the light-exiting surface 119a is totally reflected by the surface of the bow-shaped portions 145 having an arc-shaped cross-section, resulting in the light being suitably scattered in the second direction when returning towards the opposite plate surface 119c, and thus, the scattering effect is stronger in this light guide plate than for the light guide plate according to Comparison Example 1. In this manner, the light guide plate 119 of Working Example 1 can attain the effect of scattering and reflecting light by the bow-shaped portions 145, thereby suitably mitigating uneven luminance. Also, as seen in FIG. 16, the light guide plate 119 of Working Example 1 is brighter than the light guide plate of Comparison Example 1, which means a greater luminance can be attained.

Figure 17:
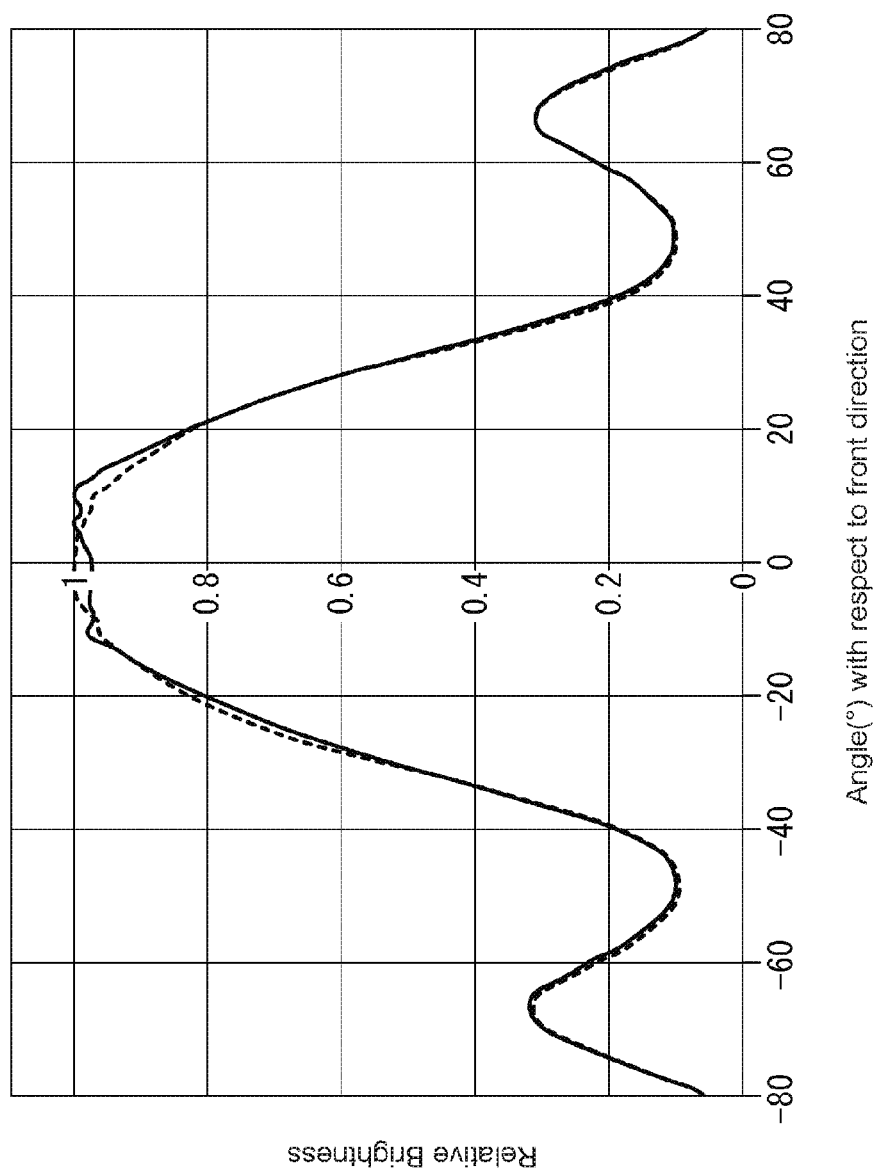
FIG. 17 is a graph of Comparison Experiment 2 showing luminance angular distributions in a second direction in a first position of emitted light obtained by passing light emitted by the light guide plates of Comparison Example 2 and Working Example 1 through a prism sheet.
Figure 18:
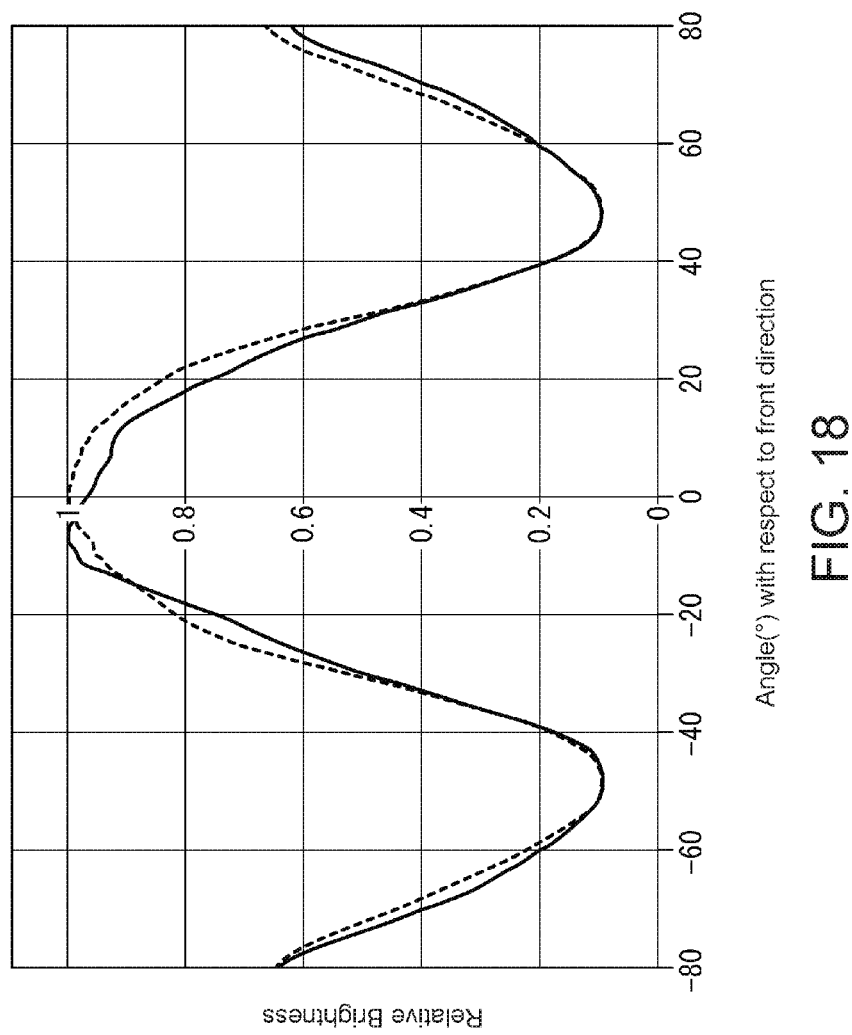
FIG. 18 is a graph of Comparison Experiment 2 showing luminance angular distributions in a second direction in a second position of emitted light obtained by passing light emitted by the light guide plates of Comparison Example 2 and Working Example 1 through a prism sheet.
Figure 19:
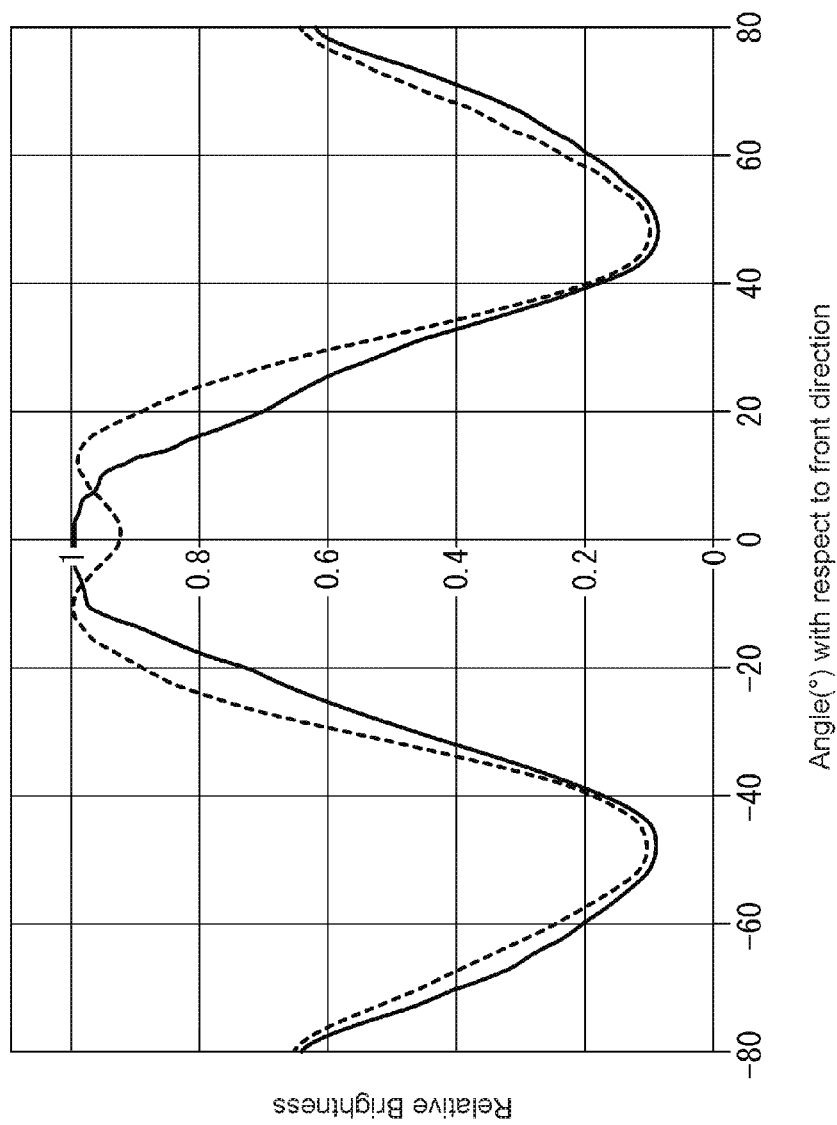
FIG. 19 is a graph of Comparison Experiment 2 showing luminance angular distributions in a second direction in a third position of emitted light obtained by passing light emitted by the light guide plates of Comparison Example 2 and Working Example 1 through a prism sheet.

Next, Comparison Experiment 2 was performed in order to ascertain to what degree the luminance changes depending on the presence or absence of a configuration whereby the total proportion of the light-exiting surface occupied in the second direction by the light-exiting surface-side prism units and the bow-shaped portions changes depending on the position in the first direction. In Comparison Experiment 2, the same light guide plate 119 as in Working Example 1 of Comparison Experiment 1 was used, and for Comparison Example 2, a light guide plate that does not have bow-shaped portions 145 was used. Specifically, the light guide plate of Comparison Example 2 has a configuration in which a lenticular lens portion formed by arranging a plurality of cylindrical lenses extending along the first direction are arranged in the second direction on the light-exiting surface. The configuration of the opposite plate surface of the light guide plate of Comparison Example 2 is similar to the light guide plate of Comparison Example 1 of Comparison Experiment 1. In Comparison Experiment 2, a prism sheet (see FIG. 9) was layered onto the light-exiting side of each light guide plate of Comparison Experiment 2 and Working Example 1, and the luminance of the light exiting through the prism sheet was measured. To specifically describe the measurement of the luminance, of each light guide plate of Comparison Example 2 and Working Example 1, luminance of emitted light was measured in the following three positions: a position towards the light-receiving face in the first direction (hereinafter, the "first position"), a central position in the first direction (hereinafter, the "second position"), and a position towards the non-light-receiving opposite face in the first direction (hereinafter, the "third position"), and the results thereof are shown in FIGS. 17 to 19. FIG. 17 shows a luminance distribution of light emitted from the first position of the light guide plates of Comparison Example 2 and Working Example 1. FIG. 18 shows a luminance distribution of light emitted from the second position of the light guide plates of Comparison Example 2 and Working Example 1. FIG. 19 shows a luminance distribution of light emitted from the third position of the light guide plates of Comparison Example 2 and Working Example 1. FIGS. 17 to 19 indicate the relative luminance (no unit) of light emitted from the prism sheet on the vertical axis, and indicate the angle (the unit is "°") of the light with respect to the frontal direction in the second direction on the horizontal axis. The relative luminance on the vertical axis of FIGS. 17 to 19 is a value relative to a reference luminance (1.0) measured for a case in which the measurement is made from the frontal direction (angle of 0°) for light emitted from the first position of the light guide plate according to Comparison Example 2. In FIGS. 17 to 19, the broken line curve represents Comparison Example 2, and the solid line curve represents Working Example 1.

The results of Comparison Experiment 2 will be described below. Based on FIG. 17, it can be seen the luminance distribution at the first position is equal between the light guide plate of Comparison Example 1 and the light guide plate 119 of Working Example 1. Based on FIG. 18, it can be seen the luminance distribution at the second position differs between the light guide plate of Comparison Example 1 and the light guide plate 119 of Working Example 1, with the light guide plate 119 of Working Example 1 attaining a greater light focusing performance in the angular range of ±30°. Based on FIG. 19, it can be seen the luminance distribution at the third position differs between the light guide plate of Comparison Example 1 and the light guide plate 119 of Working Example 1, with the light guide plate 119 of Working Example 1 attaining an even greater light focusing performance than the second position in the angular range of ±30°. This indicates that in the light guide plate 119 of Working Example 1, a greater frontal luminance is attained towards the non-light-receiving opposite face 119d because the proportion occupied in the second direction and the surface area of the light-exiting surface-side prism units 143a are both greater towards the non-light-receiving opposite face 119d, and the proportion occupied in the second direction and the surface area of the bow-shaped portions 145 are both less towards the non-light-receiving opposite face 119d. When the average luminance of light emitted from the light guide plate of Comparison Example 2 was set as 100%, the average luminance of light emitted from the light guide plate 119 of Working Example 1 was 106.8%. As described above, the light guide plates 119 of Working Example 1 have the effect of attaining a higher luminance than the light guide plate of Comparison Example 2.

As described above, according to the present embodiment, the light-exiting surface-side prism units 143a occupy a lower proportion of the light-exiting surface 119a in the second direction in areas close to the light-receiving face 119b in the first direction while the proportion occupied by the bow-shaped portions 145 is greater, whereas the light-exiting surface-side prism units 143a occupy a greater proportion in areas far from the light-receiving face 119b in the first direction while the proportion occupied by the bow-shaped portions 145 is less. Areas of the light guide plate 119 close the light-receiving face 119b in the first direction are more susceptible to uneven luminance in light emitted from the light-exiting surface 119a compared to areas far from the light-receiving face 119b, whereas areas far from the light-receiving face 119b in the first direction are more susceptible to insufficient luminance in light emitted from the light-exiting surface 119a compared to areas close to the light-receiving face 119b. By contrast, the proportion of the light-exiting surface 119a occupied in the second direction is lowest for the light-exiting surface-side prism units 143a and highest for the bow-shaped portions 145 in areas close to the light-receiving face 119b in the first direction, and thus, in areas close to the light-receiving face 119b in the first direction where uneven luminance is of concern, uneven luminance is more suitably mitigated by the bow-shaped portions 145. Additionally, the proportion of the light-exiting surface 119a occupied in the second direction is highest for the light-exiting surface-side prism units 143a and lowest for the bow-shaped portions 145 in areas far from the light-receiving face 119b in the first direction, and thus, in areas far from the light-receiving face 119b in the first direction where insufficient luminance is of concern, luminance is more suitably improved by the light-exiting sur-face-side prism units 143a. In this manner, it is possible to more suitably achieve a balance between improvement of luminance and mitigation of uneven luminance for the light emitted by the backlight device.

Also, the proportion of the light-exiting surface occupied by the light-exiting surface-side prism units 143a gradually and continuously increases and the same proportion for the bow-shaped portions 145 gradually and continuously decreases in portions farther away from the light-receiving face 119b in the first direction. In this manner, compared to a case in which the proportion of the light-exiting surface occupied by the light-exiting surface-side prism units and the bow-shaped portions were changed in a stepwise fashion, it is possible to more suitably mitigate uneven luminance and to suitably improve luminance.

Also, in the light guide plate 119, one of the edge faces constituting a pair of sides of the outer edge faces is designated as the light-receiving face 119b and the other edge face into which light from the LEDs (not shown) does not enter is designated as the non-light-receiving opposite face 119d, and the proportion of the light-exiting surface occupied by the light-exiting surface-side prism units 143a gradually and continuously increases and the same proportion for the bow-shaped portions 145 gradually and continuously decreases, from the light-receiving face 119b towards the non-light-receiving opposite face 119d in the first direction. In this manner, the edge of the light guide plate 119 towards the light-receiving face 119b in the first direction is more susceptible to uneven luminance in light emitted from the light-exiting surface 119a, whereas the edge towards the non-light-receiving opposite face 119d in the first direction is more susceptible to insufficient luminance in light emitted from the light-exiting surface 119a. However, whereas the proportion of the light-exiting surface 119a occupied in the second direction by the light-exiting surface-side prism units 143a gradually and continuously increases from the light-receiving face 119b towards the non-light-receiving opposite face 119d in the first direction, the same proportion occupied by the bow-shaped portions 145 gradually and continuously decreases from the light-receiving face 119b towards the non-light-receiving opposite face 119d, and thus, at the edge of the light guide plate 119 towards the light-receiving face 119b in the first direction, uneven luminance is more suitably mitigated, and at the edge towards the non-light-receiving opposite face 119d in the first direction, luminance is more suitably increased. In this manner, it is possible to more suitably achieve a balance between improvement of luminance and mitigation of uneven luminance for the light emitted by the backlight device.

Also, the light-exiting surface-side prism units 143a occupy 100% of the light-exiting surface in portions farthest from the light-receiving face 119b in the first direction. In this manner, compared to a case in which the bow-shaped portions 145 were provided in portions farthest from the light-receiving face 119b in the first direction, it is possible to more suitably mitigate uneven luminance and increase luminance. In portions farthest from the light-receiving face 119b in the first direction, it is typically difficult to see uneven luminance, and thus, the effect of mitigating uneven luminance by the bow-shaped portions 145 need not be attained.

Also, the width and height of the light-exiting surface-side prism units 143a gradually and continuously increase in portions farther away from the light-receiving face 119b in the first direction, but the vertex angle thereof remains the same. By the width of the light-exiting surface-side prism units 143a gradually and continuously increasing farther away from the light-receiving face 119b in the first direction, the proportion of the light-exiting surface 119a occupied by the light-exiting surface-side prism units 143a in the second direction similarly gradually and continuously increases. The optical characteristics, that is, the light focusing characteristics of the light-exiting surface-side prism units 143a change depending on the vertex angle. Also, by the height of the light-exiting surface-side prism units 143a gradually and continuously increasing in portions farther away from the light-receiving face 119b in the first direction, the vertex angle thereof remains the same, and thus, the optical characteristics are not susceptible to changing along the first direction. As a result, it is possible to suitably mitigate uneven luminance.

Embodiment 3

Embodiment 3 of the present invention will be described with reference to FIGS. 20 and 21. In Embodiment 3, flat portions 46 are provided between bow-shaped portions 245 disclosed in Embodiment 1 above. Descriptions of structures, operations, and effects similar to those of Embodiment 1 will be omitted.

Figure 20:
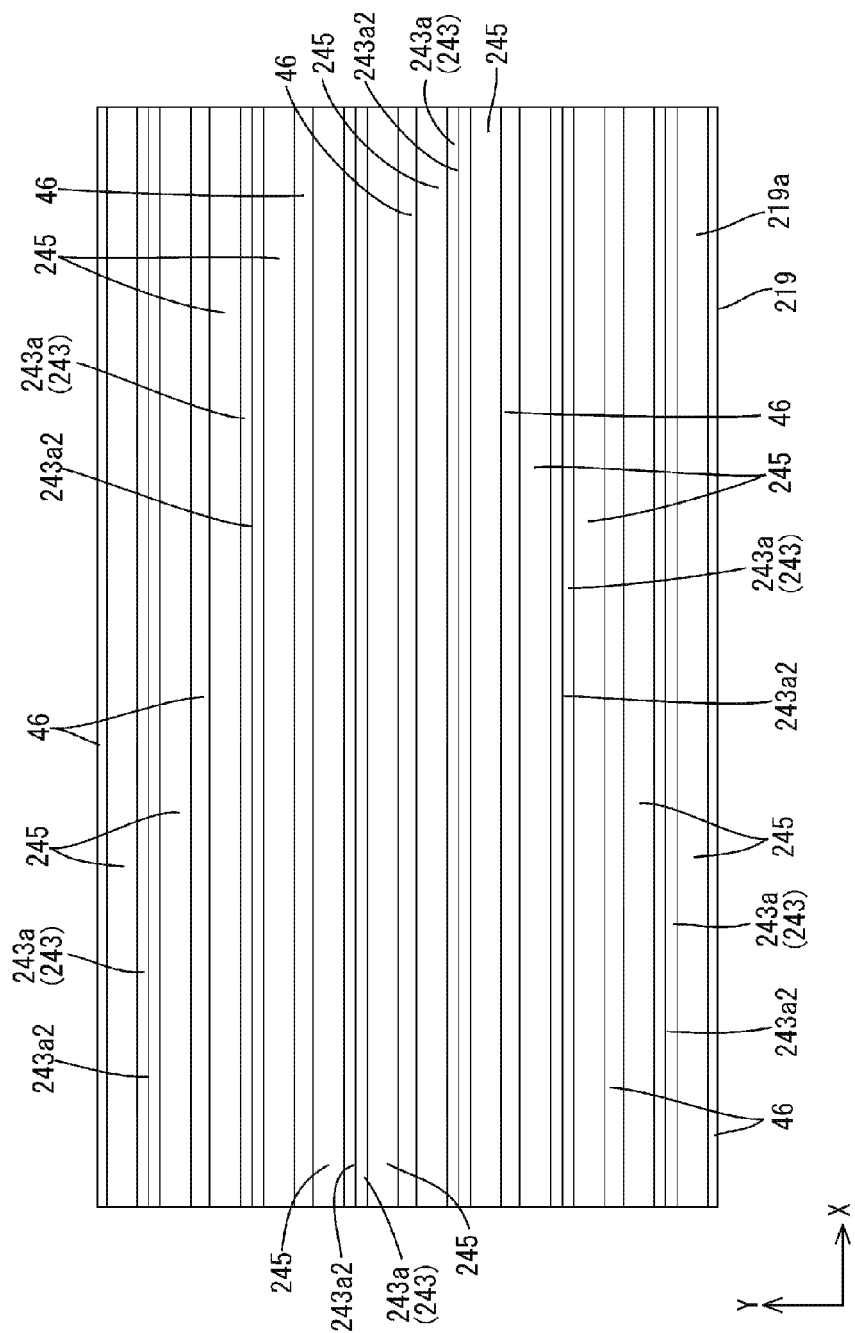
FIG. 20 is a plan view of a light guide plate according to Embodiment 3 of the present invention.
Figure 21:
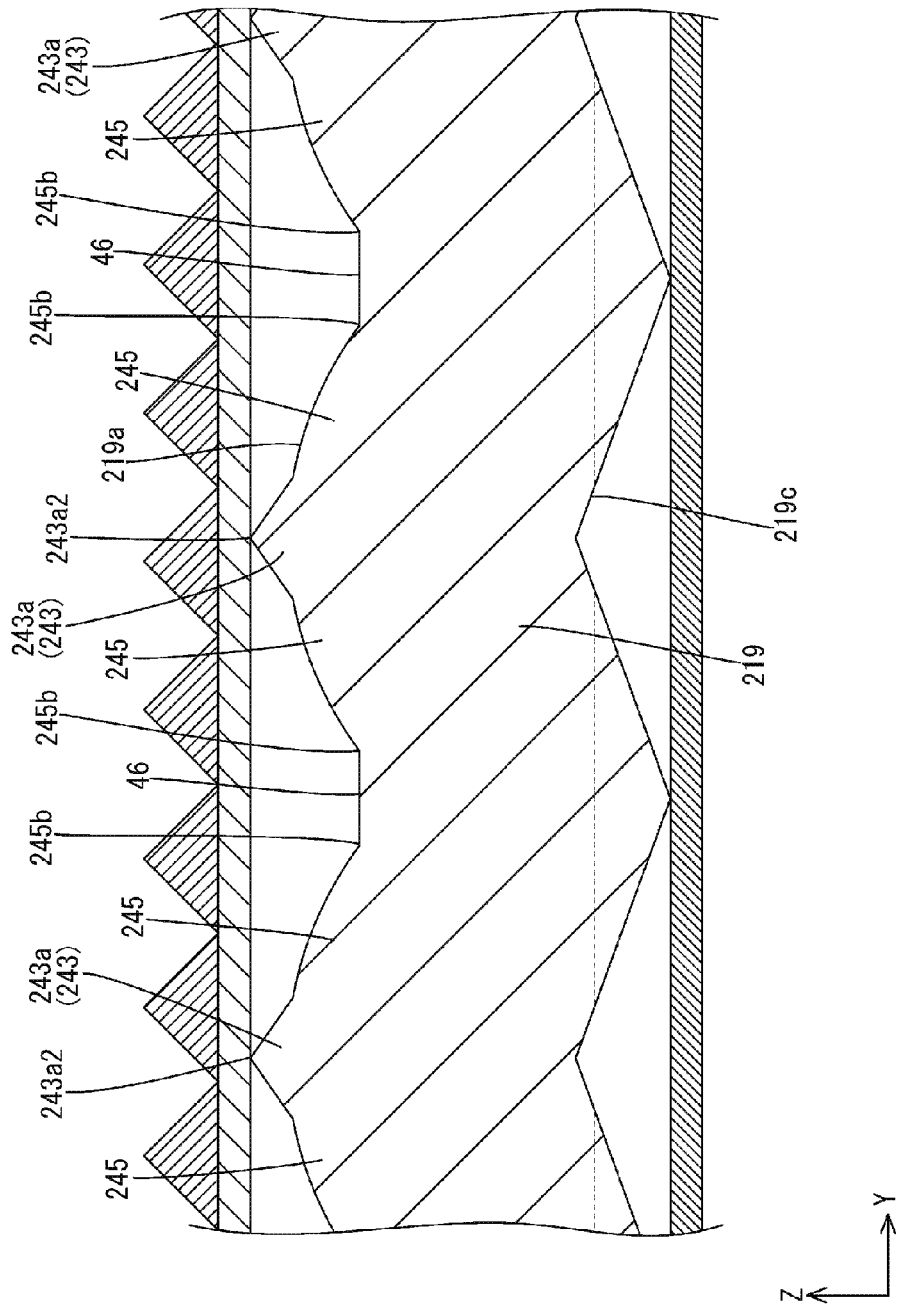
FIG. 21 is an expanded cross-sectional view showing a cross-sectional configuration of the backlight device of the liquid crystal display device along the shorter side direction (second direction, Y axis direction).
Figure 22:
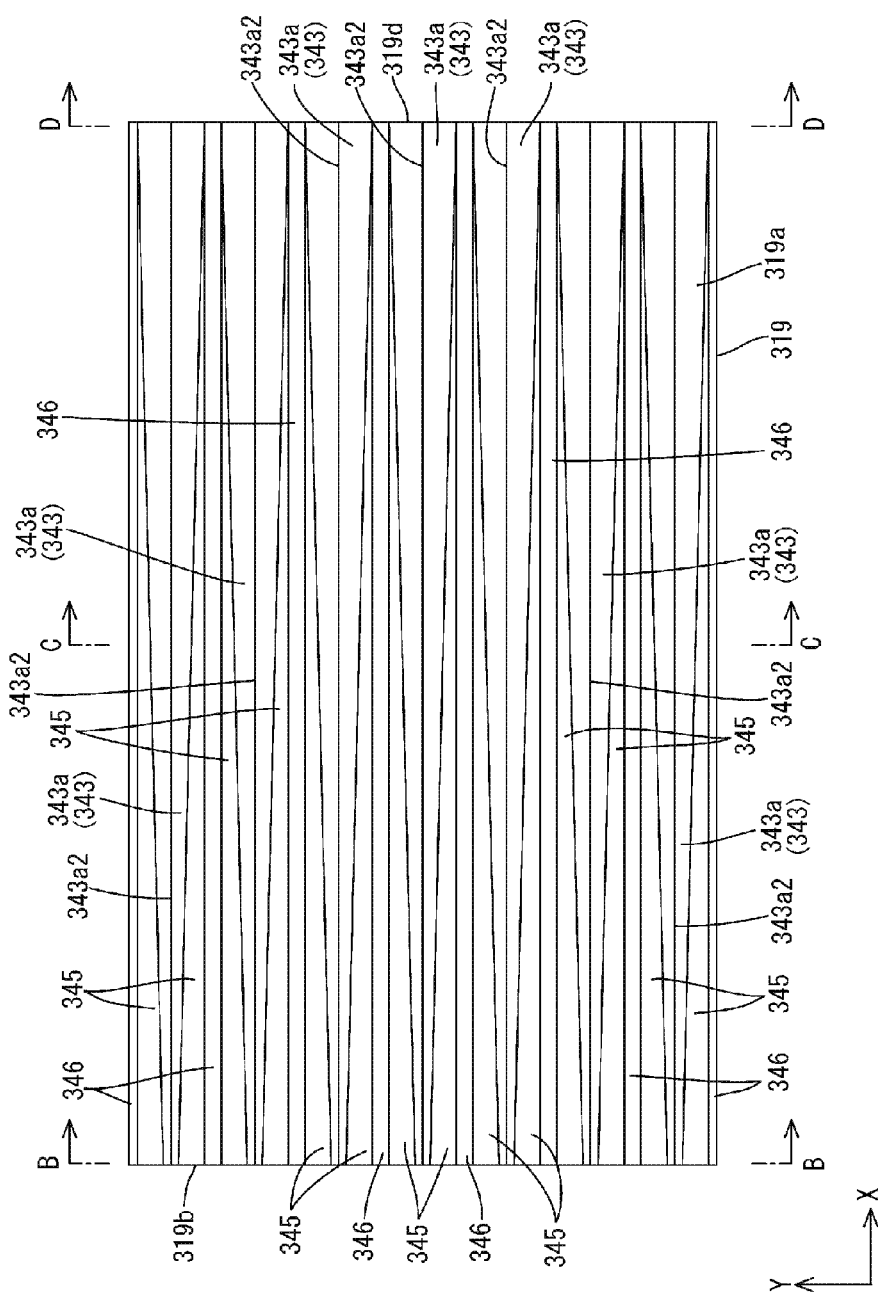
FIG. 22 is a plan view of a light guide plate according to Embodiment 4 of the present invention.
Figure 23:
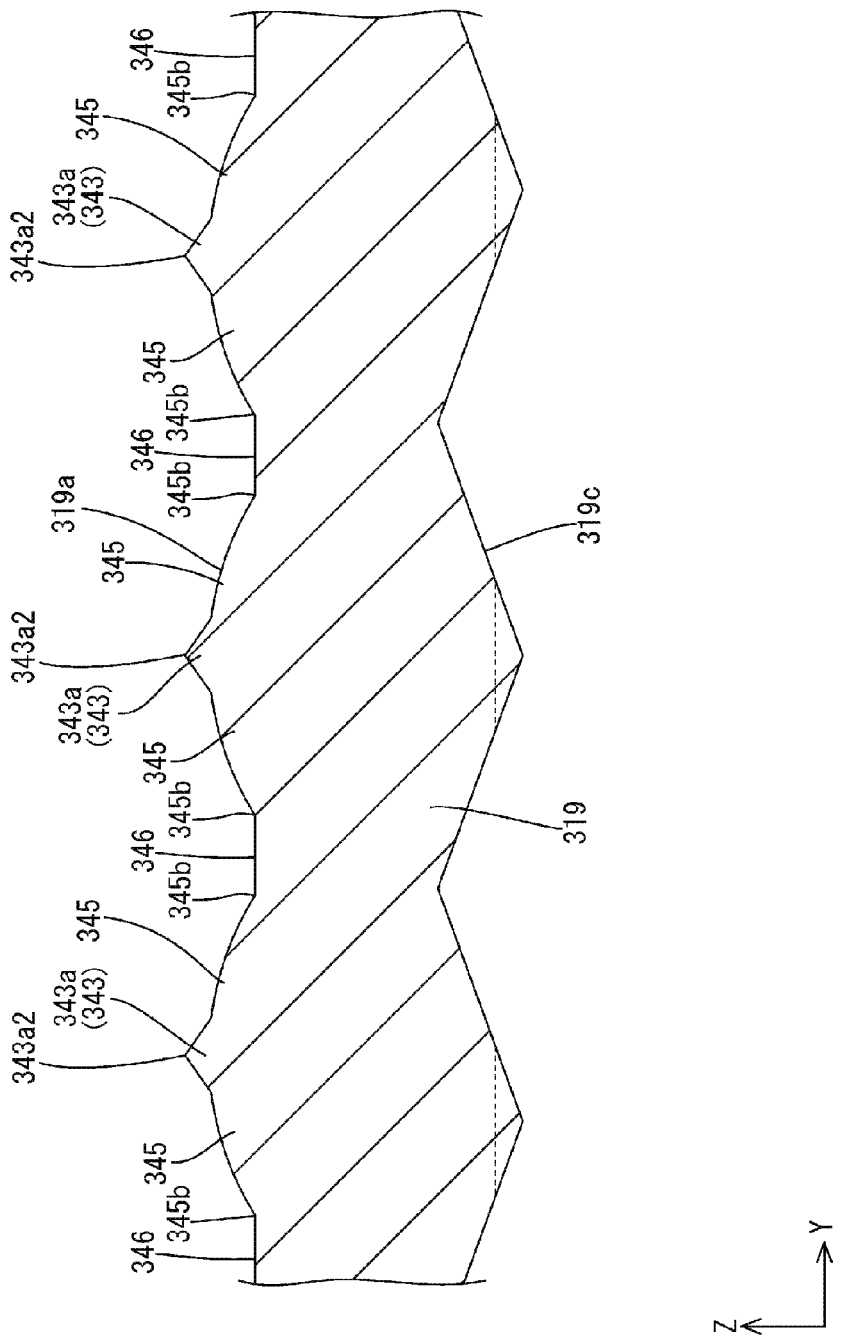
FIG. 23 is a cross-sectional view along the line B-B of FIG. 22.
Figure 24:
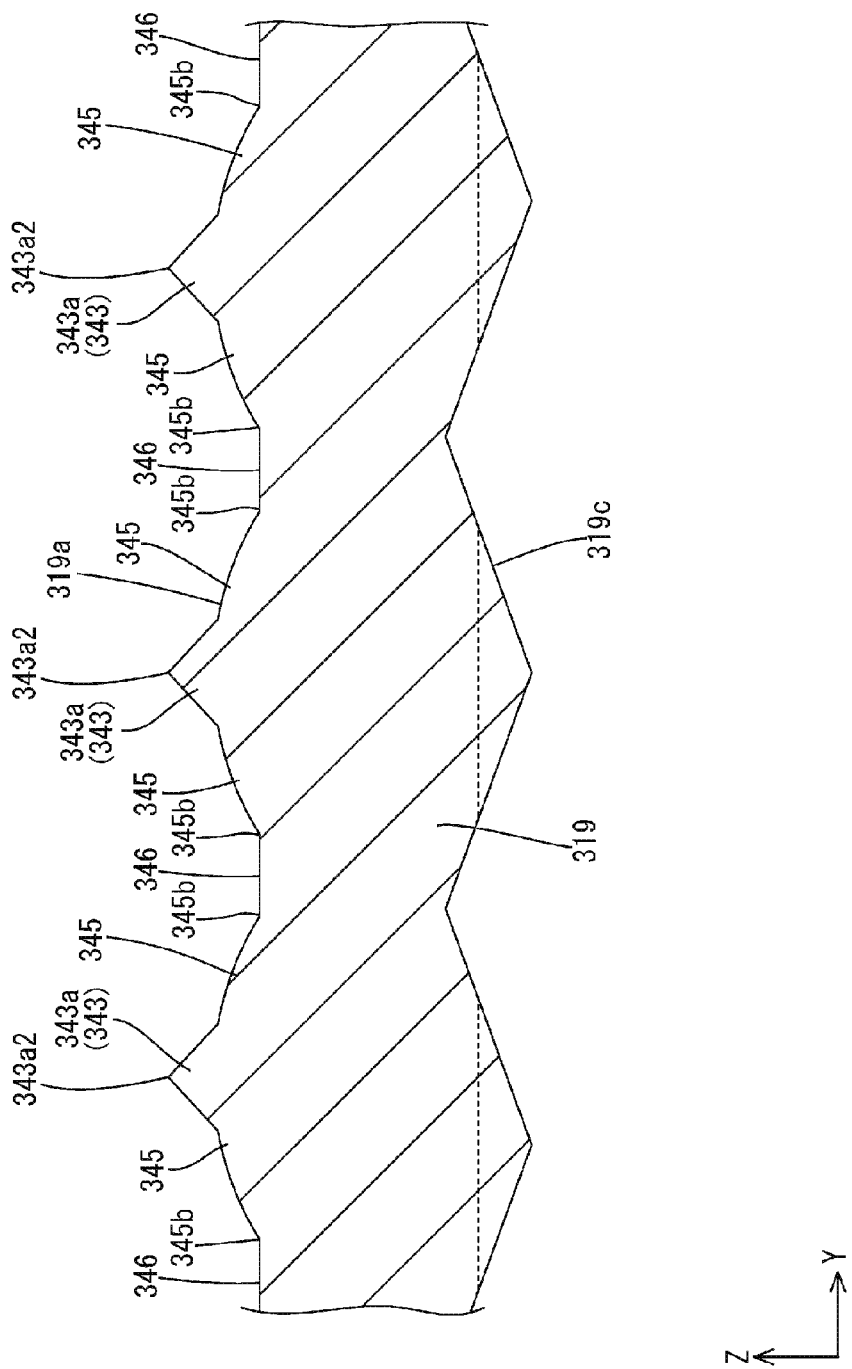
FIG. 24 is a cross-sectional view along the line C-C of FIG. 22.
Figure 25:
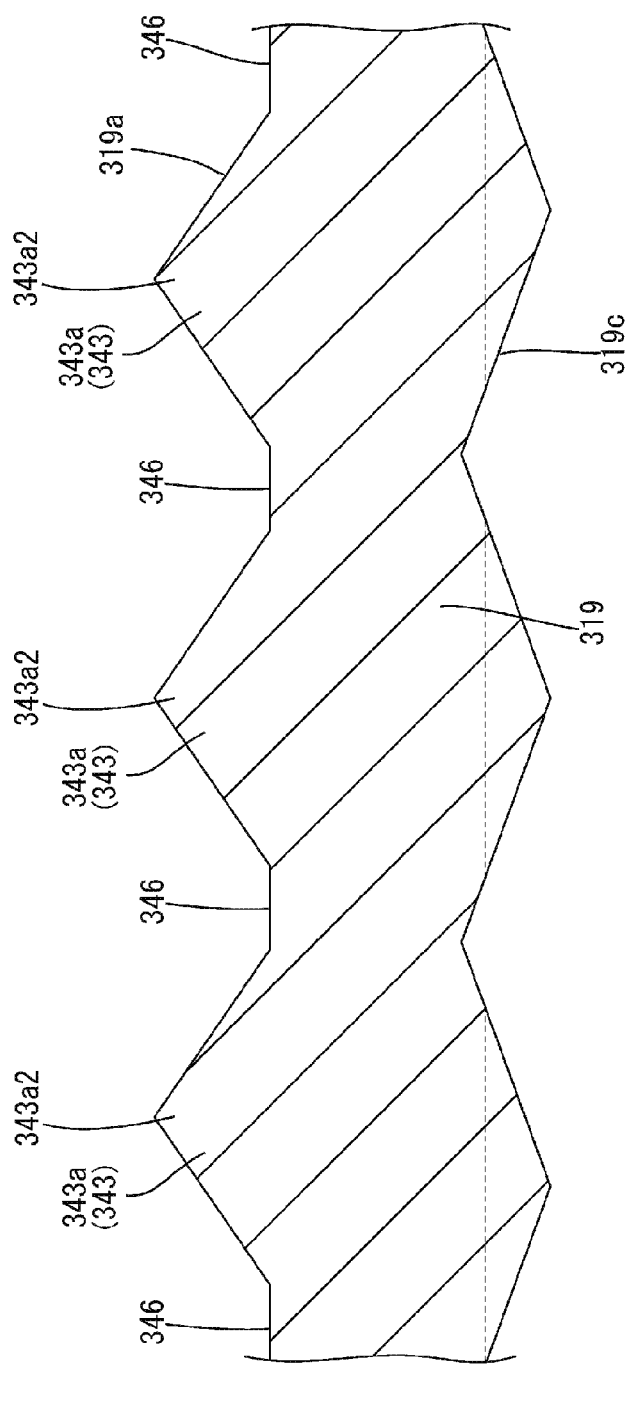
FIG. 25 is a cross-sectional view along the line D-D of FIG. 22.

As shown in FIGS. 20 and 21, a light-exiting surface 219a of a light guide plate 219 of the present embodiment, in addition to the light-exiting surface-side prism units 243a constituting the light-exiting surface-side prism portion 243 and the bow-shaped portions 245, is provided with flat portions 46 that are flat along the first direction (X axis direction) and the second direction (Y axis direction). Specifically, the light-exiting surface 219a of the light guide plate 219 is provided with a plurality of light-exiting surface-side prism units 243a that are arranged in the second direction with a prescribed gap therebetween, and two bow-shaped portions 245 each that sandwich the vertex portion 243a2 of each light-exiting surface-side prism unit 243a, and is also provided with the flat portions 46 that are each interposed between bow-shaped portions 245 that are adjacent to each other in the second direction (two bow-shaped portions 245 that are interposed between light-exiting surface-side prism units 243a that are adjacent to each other in the second direction). Both edges of the flat portions 46 in the second direction coincide with the other edges 245b of the bow-shaped portions 245 that are adjacent to each other in the second direction. The flat portions 46 are provided so as to extend along the entire length of the light guide plate 219 in the first direction and the width thereof (in the second direction) is substantially uniform throughout the entire length thereof.

Next, the effects of the flat portions 46 will be described. Light that has entered the light guide plate 219 from the LEDs is propagated inside the light guide plates 219 and reaches the light-exiting surface 219a. The light that has reached the light-exiting surface 219a at least includes components that are anisotropically focused by the light-exiting surface-side prism units 243a and emitted, components that are totally reflected by the light-exiting surface-side prism units 243a and returned towards the opposite plate surface 219c, components that are anisotropically focused and emitted by the bow-shaped portions 245, components that are totally reflected by the surface of the bow-shaped portions 245 and returned to the opposite plate surface 219c, and components that are totally reflected by the flat portions 46 and returned towards the opposite plate surface 219c. Among these, the light that is returned to the opposite plate surface 219c by the flat portions 46 spreads over a wider range in the second direction as it is propagated in the light guide plate 219 compared to the light that was totally reflected by the light-exiting surface-side prism units 243a and returned to the opposite plate surface 219c. Furthermore, the direction of travel of the light returning towards the opposite plate surface 219c as a result of the flat portions 46 differs from the direction of travel of the light that was totally reflected at the surface of the bow-shaped portions 245 and returned towards the opposite plate surface 219c. Thus, light that is being propagated in the light guide plate 219 is scattered in various directions along the second direction, and thus, the emitted light is less susceptible to uneven luminance.

As described above, according to the present embodiment, flat portions 46 that are flat along the first direction and the second direction are provided on the light-exiting surface 219a of the light guide plate 219 so as to be adjacent to the bow-shaped portions 245 in the second direction. In this manner, some of the light that was propagated in the light guide plate 219 and that has reached the light-exiting surface 219a is totally reflected by the bow-shaped portions 245 and returned back to the opposite plate surface 219c, and some of the light is totally reflected by the flat portions 46 and returned back to the opposite plate surface. The light that is returned to the opposite plate surface 219c by the flat portions 46 spreads in the second direction and is propagated in the light guide plate 219 compared to the light that was totally reflected by the light-exiting surface-side prism units 243a and returned to the opposite plate surface 219c, but the direction of travel of the light differs from that of the light returning towards the opposite plate surface 219c as a result of the bow-shaped portions 245. In this manner, light that is being propagated in the light guide plate 219 is scattered in various directions along the second direction, and thus, uneven luminance can be mitigated in a more suitable manner.

Embodiment 4

Embodiment 4 of the present invention will be described with reference to FIGS. 22 to 25. In Embodiment 4, flat portions 346 similar to those of Embodiment 3 are provided between bow-shaped portions 345 disclosed in Embodiment 2 above. Descriptions of structures, operations, and effects similar to those of Embodiments 2 and 3 will be omitted.

As shown in FIGS. 22 to 25, a light-exiting surface 319a of a light guide plate 319 of the present embodiment, in addition to the light-exiting surface-side prism units 343a constituting the light-exiting surface-side prism portion 343 and the bow-shaped portions 345, is provided with flat portions 346 that are flat along the first direction (X axis direction) and the second direction (Y axis direction). Specifically, the light-exiting surface 319a of the light guide plate 319 is provided with a plurality of light-exiting surface-side prism units 343a that are arranged in the second direction with a prescribed gap therebetween, and two bow-shaped portions 345 each that sandwich the vertex portion 343a2 of each light-exiting surface-side prism unit 343a, and is also provided with the flat portions 346 that are each interposed between bow-shaped portions 345 that are adjacent to each other in the second direction (two bow-shaped portions 345 that are interposed between light-exiting surface-side prism units 343a that are adjacent to each other in the second direction). Both edges of the flat portions 346 in the second direction coincide with the other edges 345b of the bow-shaped portions 345 that are adjacent to each other in the second direction. Whereas the width of the light-exiting surface-side prism units 343a gradually and continuously increases from the light-receiving face 319b towards the non-light-receiving opposite face 319d in the first direction, the width of the bow-shaped portions 345 gradually and continuously decreases from the light-receiving face 319b towards the non-light-receiving opposite face 319d in the first direction. By contrast, the flat portions 346 are provided so as to extend along the entire length of the light guide plate 319 in the first direction and the width thereof (in the second direction) is substantially uniform throughout the entire length thereof. The action and effects of the flat portions 346 are similar to those of Embodiment 3, and thus, detailed descriptions thereof are omitted.

Embodiment 5

Embodiment 5 of the present invention will be described with reference to FIGS. 26 to 28. Embodiment 5 shows a case in which the form of the bow-shaped portions 445 differs from that of Embodiment 2. Descriptions of structures, operations, and effects similar to those of Embodiment 2 will be omitted.

Figure 26:
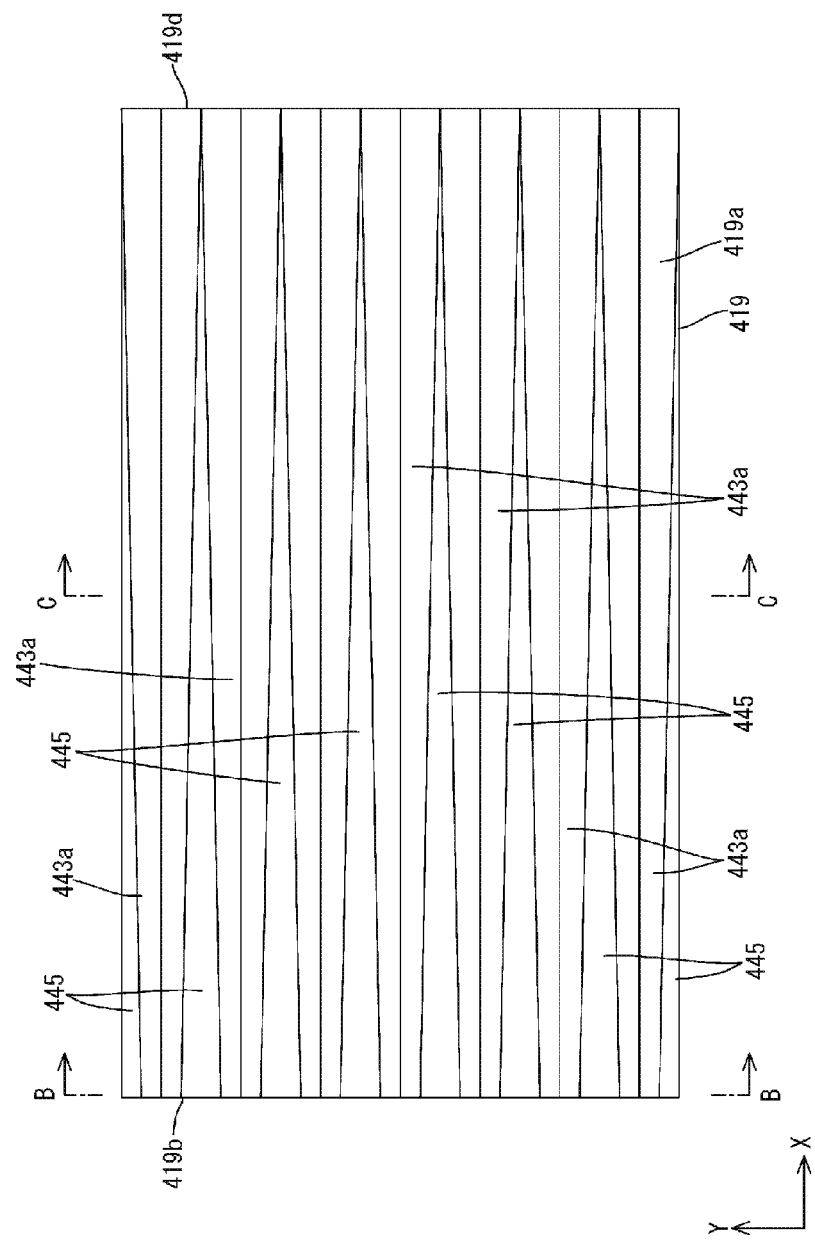
FIG. 26 is a plan view of a light guide plate according to Embodiment 5 of the present invention.
Figure 27:
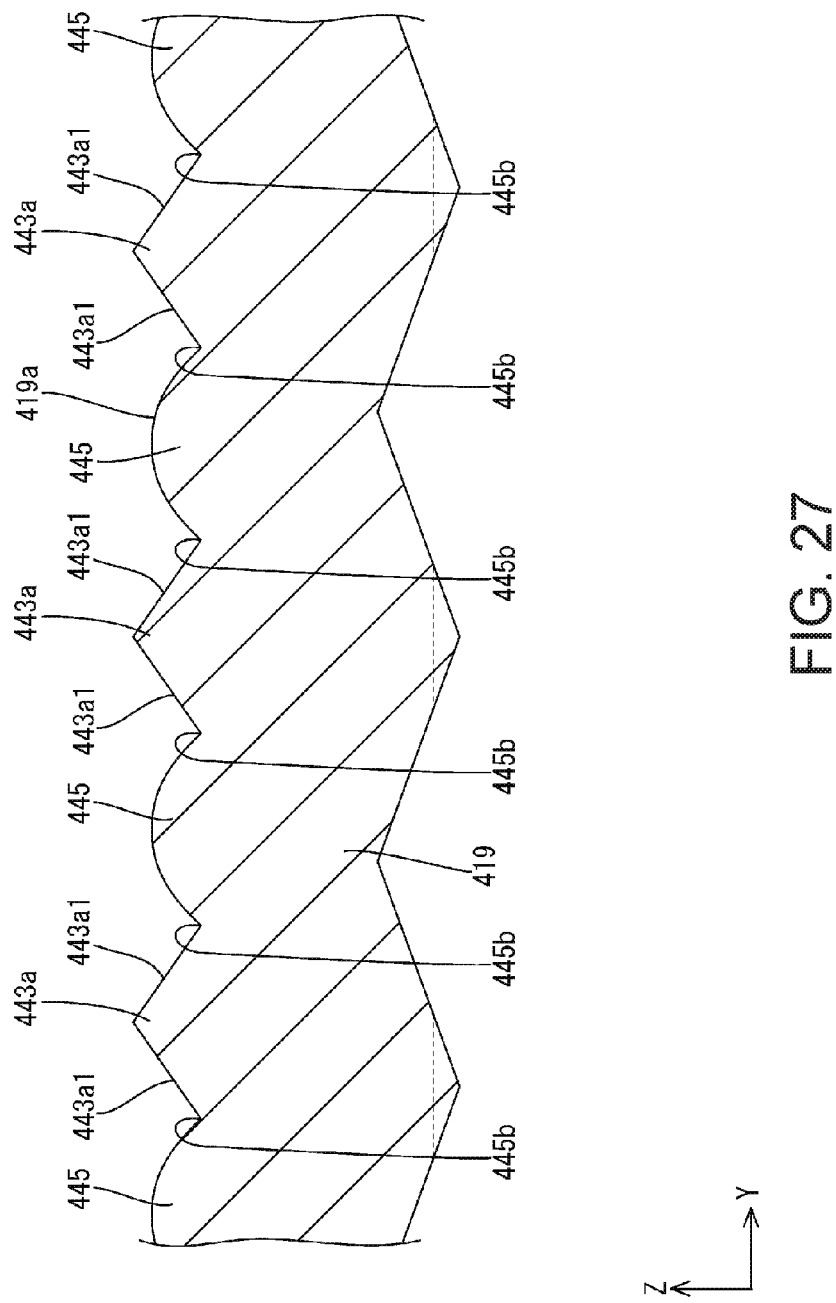
FIG. 27 is a cross-sectional view along the line B-B of FIG. 26.
Figure 28:
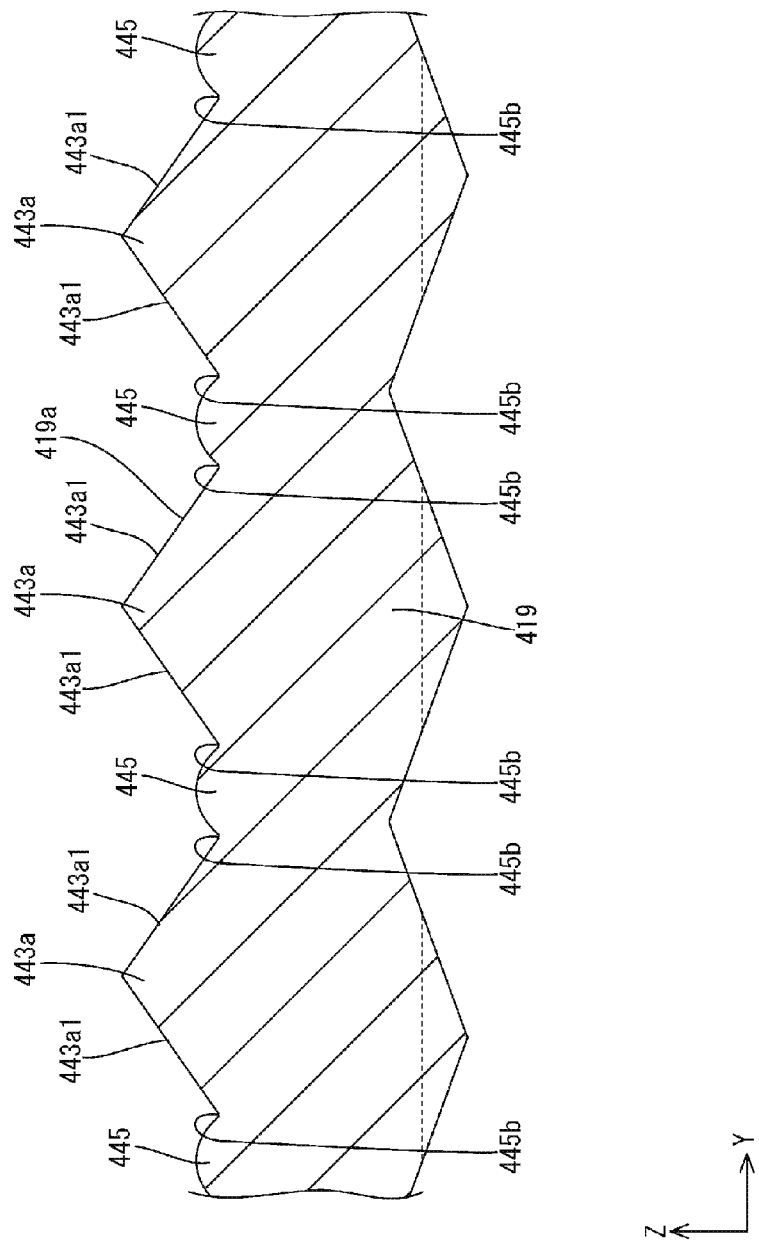
FIG. 28 is a cross-sectional view along the line C-C of FIG. 26.

As shown in FIGS. 26 to 28, the bow-shaped portions 445 of the present embodiment have an arrangement in which one bow-shaped portion 445 each is interposed between the light-exiting surface-side prism units 443a adjacent to each other in the second direction. The bow-shaped portions 445 have a substantially semicircular shape in a cross-sectional view along the second direction (Y axis direction), and have a cross-sectional configuration similar to a so-called cylindrical lens. The bow-shaped portions 445 and the light-exiting surface-side prism units 443a are arranged alternately and repeatedly in the second direction. One edge 445a of the bow-shaped portions 445 is continuous with the inclined surface 443a1 of the light-exiting surface-side prism unit 443a adjacent on one side in the second direction to the bow-shaped portion 445, whereas the other edge 445b is continuous with the inclined surface 443a1 of the light-exiting surface-side prism unit 443a adjacent on the other side in the second direction to the bow-shaped portion 445. Both edges 445a and 445b, which define the width of the bow-shaped portion 445, are inclined with respect to both the first direction and the second direction in a plan view. However, regarding the pair of bow-shaped portions 445 on both edges in the second direction of the light guide plate 419, only one edge 445a (445b) has an inclined shape. In addition, the bow-shaped portions 445 (excluding the bow-shaped portions 445 on either end) have a narrow isosceles triangular shape in a plan view. The bow-shaped portions 445 gradually and continuously decrease in the proportion of the light-exiting surface 419a occupied from the light-receiving face 419b towards the non-light-receiving opposite face 419d in the first direction, whereas the proportion of the light-exiting surface 419a occupied by the bow-shaped portions 445 gradually and continuously increases from the non-light-receiving opposite face 419d towards the light-receiving face 419b in the first direction. The rate of change in the proportion occupied by the bow-shaped portions 445 is the same as the same proportion for the light-exiting surface-side prism units 443a. In such a configuration, the surface of the bow-shaped portions 445 has a substantially semicircular shape in a cross-sectional view along the second direction, and thus, by the surface of the bow-shaped portions 445 totally reflecting light that was propagated through the light guide plate 419 and that has reached the light-exiting surface 419a, the reflected light can be scattered over a wide range in the second direction, and as a result, it is possible to suitably mitigate uneven luminance.

Embodiment 6

Embodiment 6 of the present invention will be described with reference to FIGS. 29 and 32. In Embodiment 6, flat portions 546 similar to those of Embodiments 3 and 4 are provided between light-exiting surface-side prism units 543a and bow-shaped portions 545 disclosed in Embodiment 5 above. Descriptions of structures, operations, and effects similar to those of Embodiments 3 to 5 will be omitted.

Figure 29:
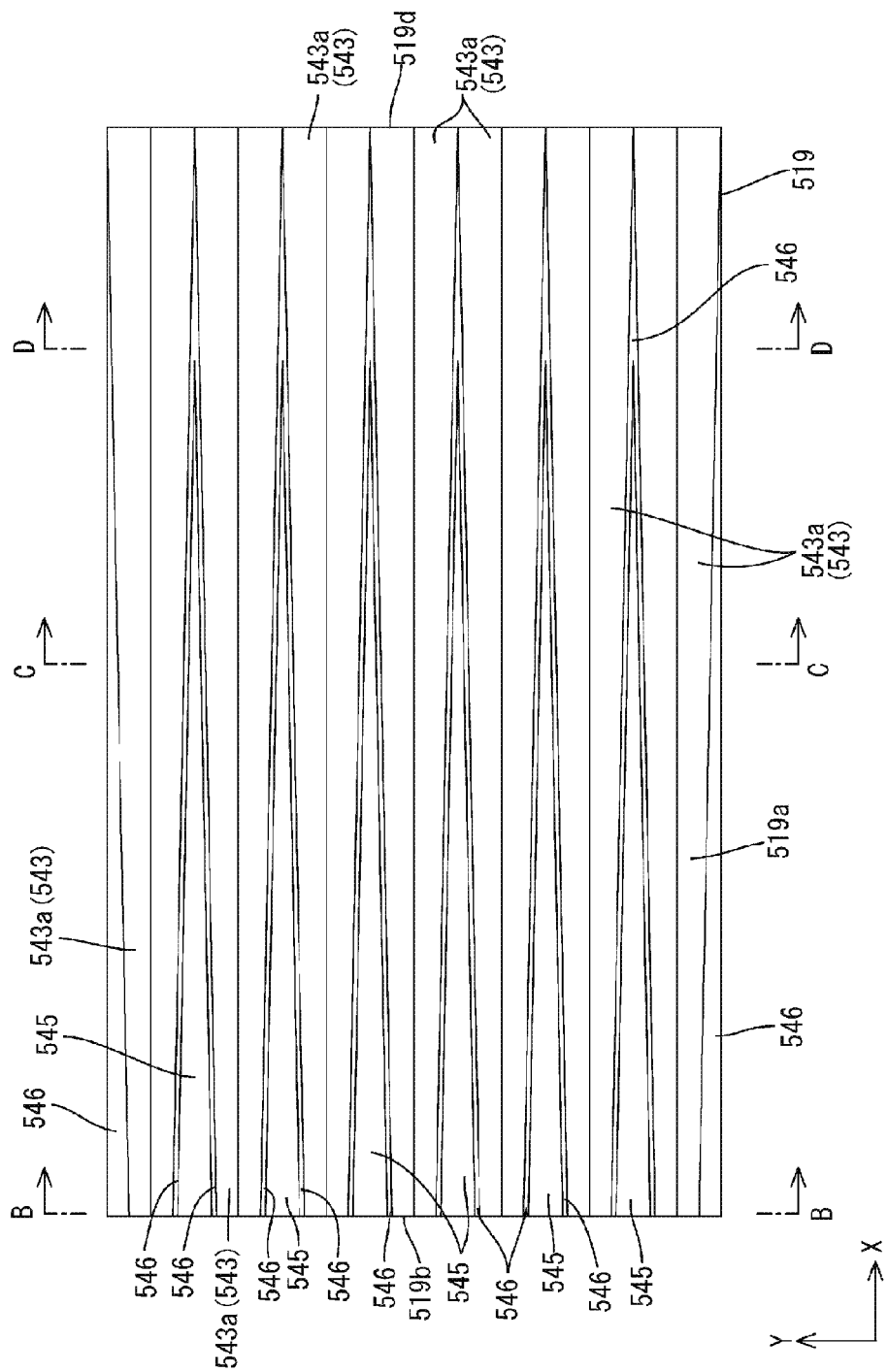
FIG. 29 is a plan view of a light guide plate according to Embodiment 6 of the present invention.
Figure 30:
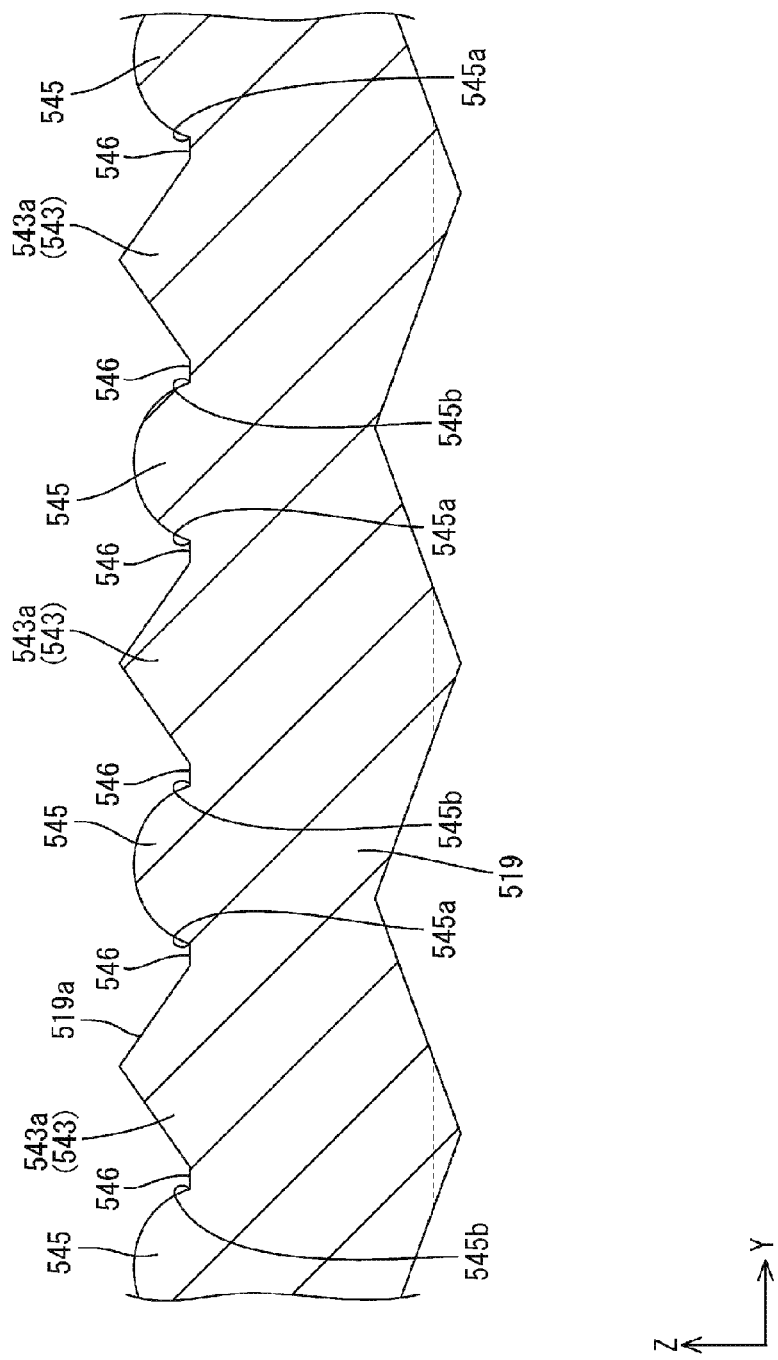
FIG. 30 is a cross-sectional view along the line B-B of FIG. 29.
Figure 31:
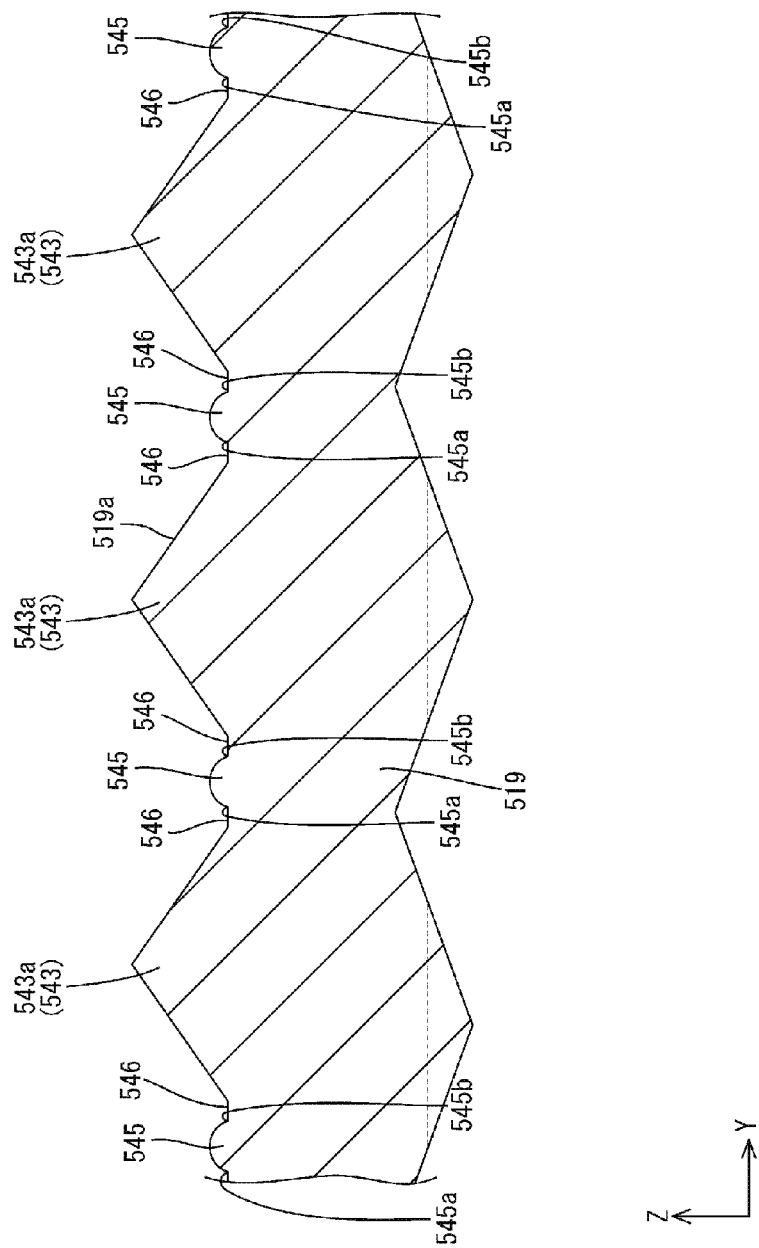
FIG. 31 is a cross-sectional view along the line C-C of FIG. 29.
Figure 32:
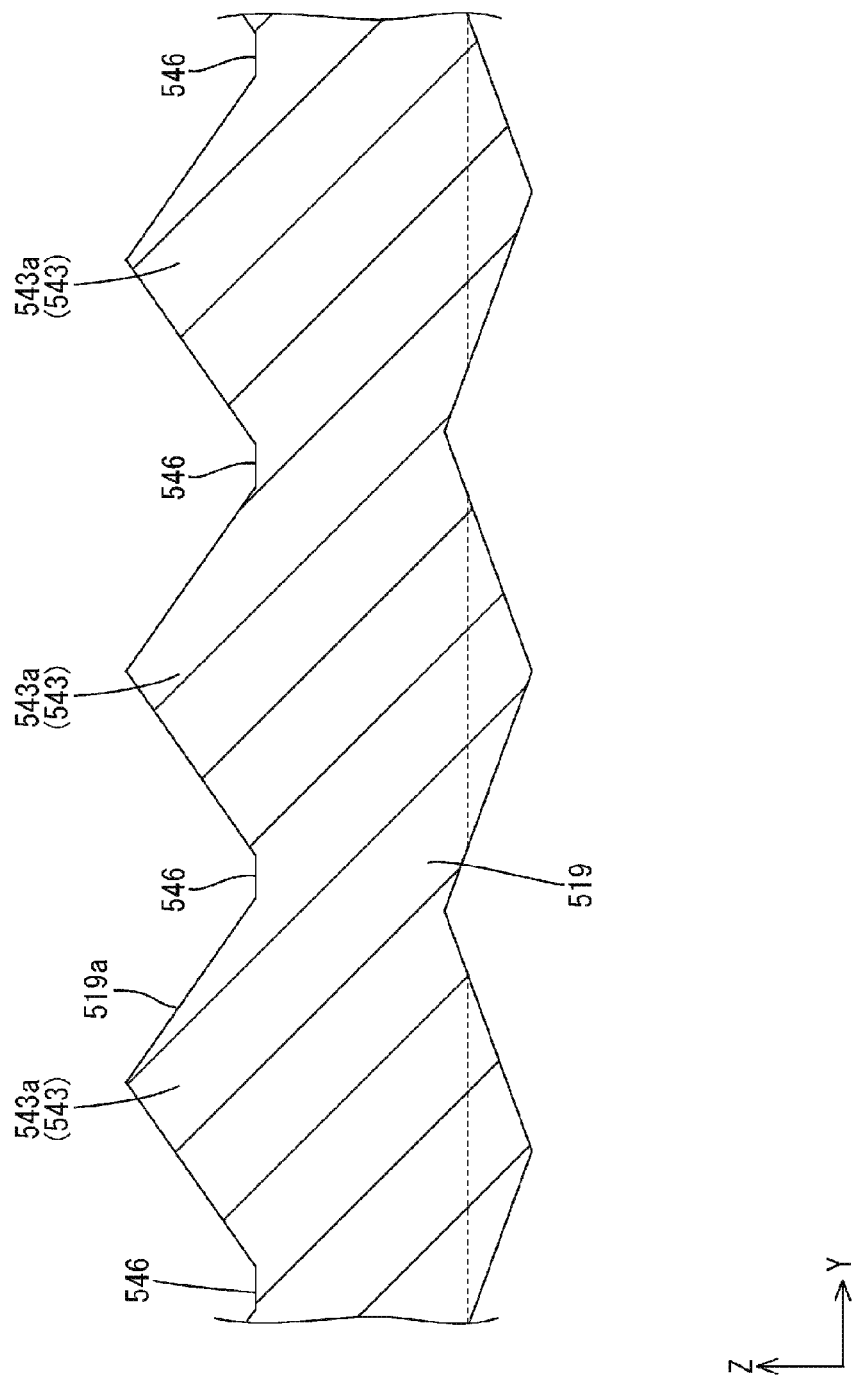
FIG. 32 is a cross-sectional view along the line D-D of FIG. 29.

As shown in FIGS. 29 to 32, a light-exiting surface 519a of a light guide plate 519 of the present embodiment, in addition to the light-exiting surface-side prism units 543a constituting the light-exiting surface-side prism portion 543 and the bow-shaped portions 545, is provided with flat portions 546 that are flat along the first direction (X axis direction) and the second direction (Y axis direction). Specifically, the light-exiting surface 519a of the light guide plate 519 is provided with light-exiting surface-side prism units 543a and bow-shaped portions 545 that are arranged alternately in the second direction, and the flat portions 546 that are each interposed between the light-exiting surface-side prism units 543a and the bow-shaped portions 545, which are adjacent to each other in the second direction. One of the edges of the flat portion 546 in the second direction is continuous with the inclined surface 543a1 of a light-exiting surface-side prism unit 543a adjacent thereto in the second direction, and the other edge of the flat portion 546 in the second direction is adjacent to either one of the edges 545a and 545b of a bow-shaped portion 545 adjacent thereto. Whereas the width of the light-exiting surface-side prism units 543a gradually and continuously increases from the light-receiving face 519b towards the non-light-receiving opposite face 519d in the first direction, the width of the bow-shaped portions 545 gradually and continuously decreases from the light-receiving face 519b towards the non-light-receiving opposite face 519d in the first direction. By contrast, the flat portions 546 are provided so as to extend along the entire length of the light guide plate 519 in the first direction, and the width thereof (in the second direction) gradually and continuously decreases from the light-receiving face 519b towards the non-light-receiving opposite face 519d in the first direction. The rate of change in the width of the flat portion 546 is equal to the rate of change in width of the bow-shaped portion 545. The bow-shaped portions 545 are not formed over the entire length of the light guide plate 519 in the first direction, and specifically, the bow-shaped portions 545 are formed from the edge towards the light-receiving face 519b up to a position before reaching the non-light-receiving opposite face 519d (position closer to light-receiving face 519b than the line D-D shown in FIG. 29). Thus, the pair of flat portions 546 disposed in both sides of the bow-shaped portion 545 in the second direction are, as shown in FIGS. 29, 31, and 32, arranged such that the portions farther towards the non-light-receiving opposite face 519d than the end position of the bow-shaped portion 545 are continuous with each other. The action and effects of the flat portions 546 are similar to those of Embodiments 3 and 4, and thus, detailed descriptions thereof are omitted.

Embodiment 7

Embodiment 7 of the present invention will be described with reference to FIGS. 33 to 36. Embodiment 7 shows a case in which the configuration of light-exiting surface-side prism units 643aA and 643aB constituting the light-exiting surface-side prism portion 643 differs from that of Embodiment 2. Descriptions of structures, operations, and effects similar to those of Embodiment 2 will be omitted.

Figure 33:
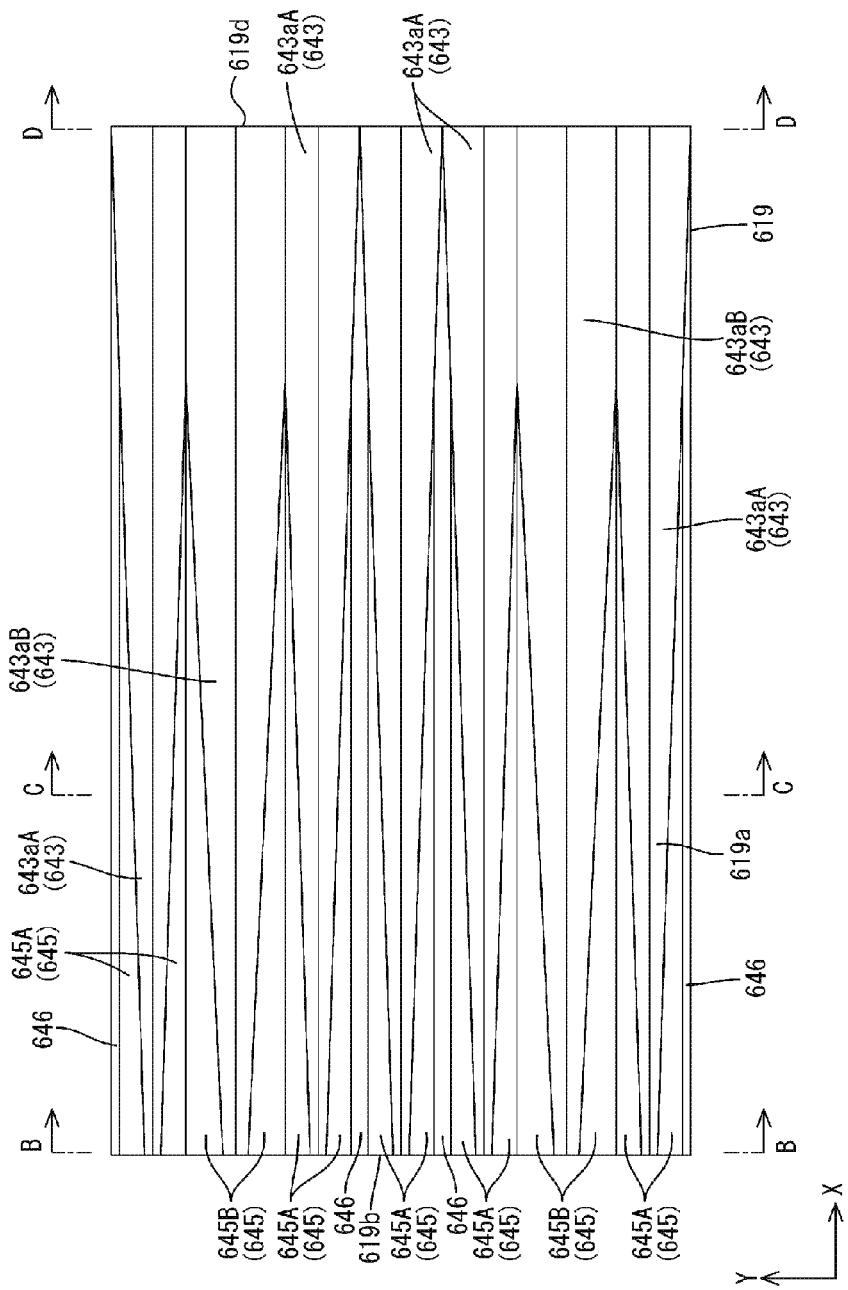
FIG. 33 is a plan view of a light guide plate according to Embodiment 7 of the present invention.
Figure 34:
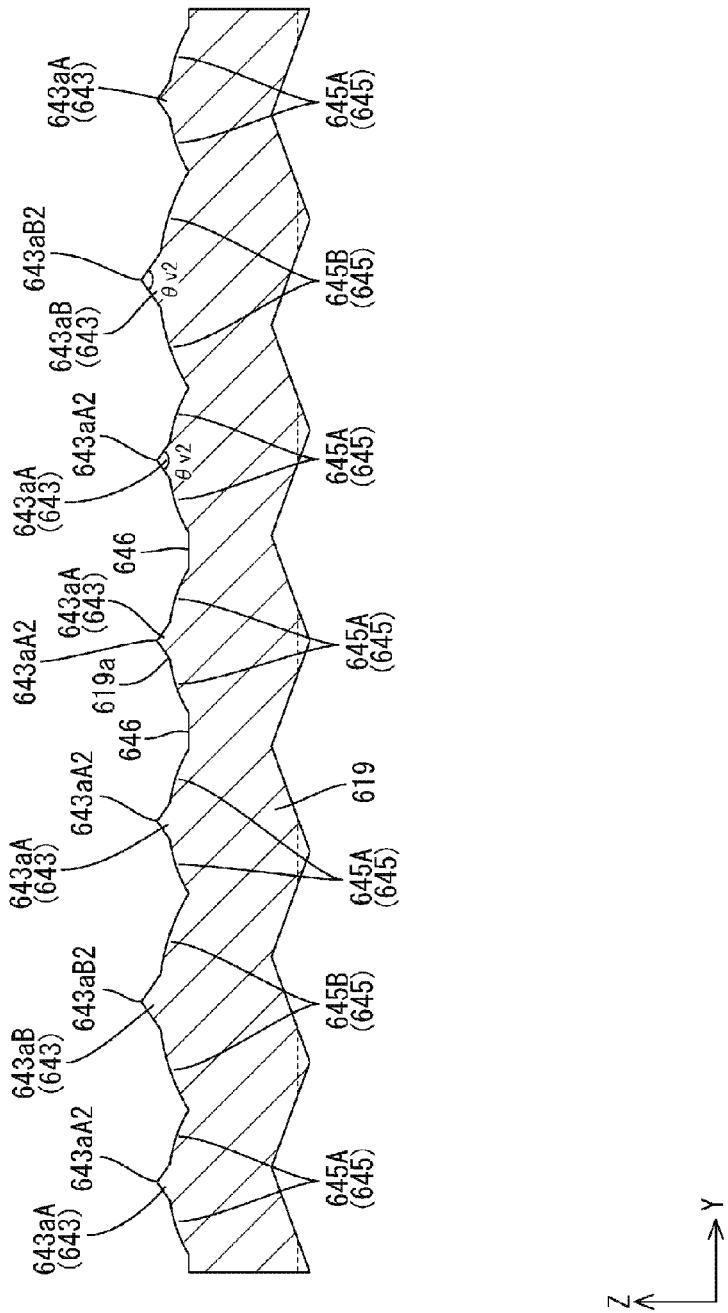
FIG. 34 is a cross-sectional view along the line B-B of FIG. 33.

As shown in FIGS. 33 and 34, the light-exiting surface-side prism portion 643 of the present embodiment includes first light-exiting surface-side prism units 643aA (first light-exiting surface-side prism units) having a relatively lower height, and second light-exiting surface-side prism units 643aB (second light-exiting surface-side prism units) having a relatively greater height. The first light-exiting surface-side prism units 643aA and the second light-exiting surface-side prism units 643aB have substantially isosceles triangular shapes in a cross-sectional view along the second direction (Y axis direction) with the vertex angle θv2 thereof being the same as the vertex angle of the light-exiting surface-side prism units 143a of Embodiment 2 (approximately 110°, for example). In other words, the first light-exiting surface-side prism units 643aA and the second light-exiting surface-side prism units 643aB have similar cross-sectional shapes to each other. The first light-exiting surface-side prism units 643aA include those that form pairs that sandwich each second light-exiting surface-side prism unit 643aB from both sides in the second direction, and those that are sandwiched in the second direction between two first light-exiting surface-side prism units 643aA that are adjacent in the second direction to each second light-exiting surface-side prism unit 643aB.

Figure 36:
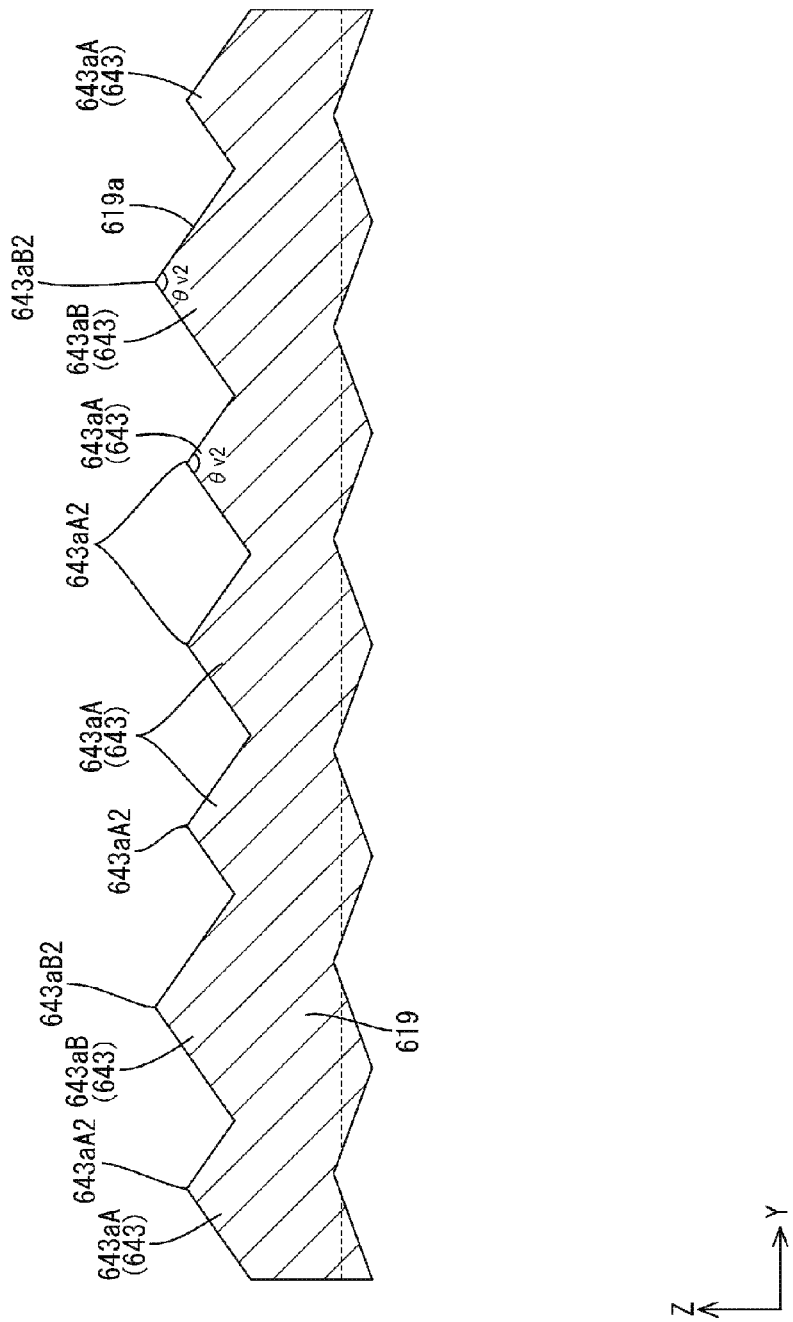
FIG. 36 is a cross-sectional view along the line D-D of FIG. 33.

As shown in FIG. 33, the width of the first light-exiting surface-side prism unit 643aA and the second light-exiting surface-side prism unit 643aB, that is the proportion of the light-exiting surface 619a occupied in the second direction, gradually and continuously increases from the light-receiving face 619b towards the non-light-receiving opposite face 619b in the first direction. In this manner, the first light-exiting surface-side prism units 643aA and the second light-exiting surface-side prism units 643aB have a uniform vertex angle θv2 along the entire length thereof in the first direction. As shown in FIGS. 33 and 36, the first light-exiting surface-side prism units 643aA and the second light-exiting surface-side prism units 643aB are provided so as to be continuous with each other in a position on the light guide plate 619 further towards the non-light-receiving opposite face 619d than the central position of the light guide plate 619 in the first direction. Thus, the bow-shaped portions 645 are not formed over the entire length of the light guide plate 619 in the first direction. According to this configuration, the first light-exiting surface-side prism units 643aA and the second light-exiting surface-side prism units 643aB can suitably improve luminance in portions of the light guide plate 619 towards the non-light-receiving opposite face 619d in the first direction where insufficient luminance is of concern.

Figure 35:
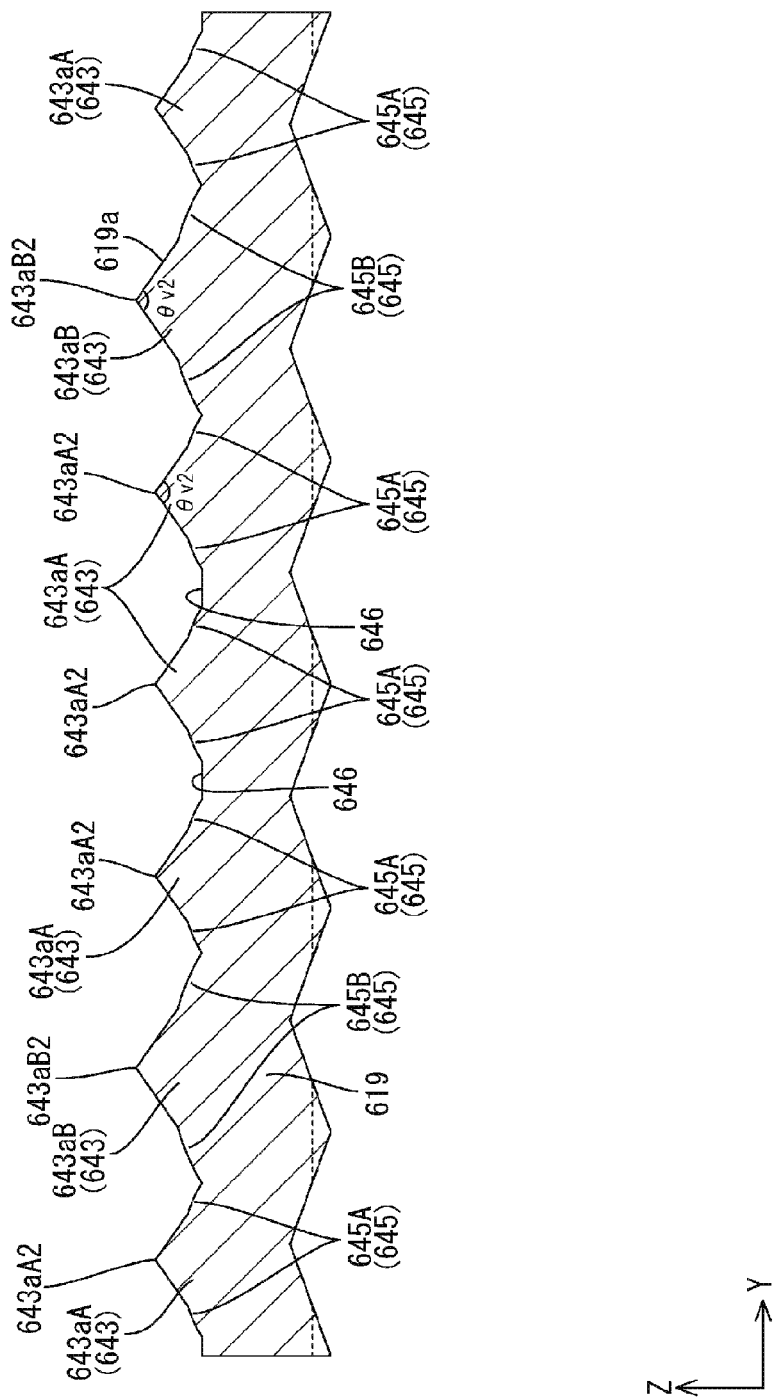
FIG. 35 is a cross-sectional view along the line C-C of FIG. 33.

As shown in FIGS. 33 to 35, the bow-shaped portions 645 include first bow-shaped portions 645A that form a pair sandwiching in the second direction the vertex portion 643aA2 of the first light-exiting surface-side prism unit 643aA, and second bow-shaped portions 645B that form a pair sandwiching in the second direction the vertex portion 643aB2 of the second light-exiting surface-side prism unit 643aB. The first bow-shaped portions 645A and the second bow-shaped portions 645B are sandwiched between the first light-exiting surface-side prism unit 643aA and the second light-exiting surface-side prism unit 643aB in the second direction. The width (second direction dimension (proportion)) of the first bow-shaped portion 645A is less than the width of the second bow-shaped portion 645B. The surfaces of the first bow-shaped portion 645A and the second bow-shaped portion 645B, which have arc shapes in a cross-sectional view along the second direction, have substantially the same curvature as each other. In addition, flat portions 646 that are flat along the first direction and the second direction are provided on the light-exiting surface 619a of the light guide plate 619 so as to be interposed between the first bow-shaped portions 645A that are adjacent to each other in the second direction. The flat portions 646 are provided so as to extend along the entire length of the light guide plate 619 in the first direction. In other words, a large portion of each flat portion 646 is sandwiched between adjacent first bow-shaped portions 645A, but the portion thereof towards the non-light-receiving opposite face 619d is sandwiched between first light-exiting surface-side prism units 643aA that are adjacent to each other in the second direction. The portion of the flat portion 646 adjacent to the first bow-shaped portion 645A has a uniform width, whereas the portion adjacent to the first light-exiting surface-side prism unit 643aA has a width that gradually decreases towards the non-light-receiving opposite face 619d. The action and effects of the flat portions 646 are as described in Embodiments 3 and 4, and thus, redundant descriptions thereof are omitted.

Furthermore, as shown in FIGS. 34 to 36, the height of the first light-exiting surface-side prism unit 643aA and the second light-exiting surface-side prism unit 643aB gradually and continuously increases from the light-receiving face 619b towards the non-light-receiving opposite face 619b in the first direction. The height of the first light-exiting surface-side prism units 643aA along the entire length thereof in the first direction is less than the height of the second light-exiting surface-side prism units 643aB. Therefore, the vertex portions 643aA2 of the first light-exiting surface-side prism units 643aA are lower than the vertex portions 643aB2 of the second light-exiting surface-side prism units 643aB. Thus, there is a gap between the first light-exiting surface-side prism units 643aA and a prism sheet (not shown) stacked on the front of the light guide plate 619. By such a gap being present, the light guide plate 619 and the prism sheet do not readily stick together, which means that uneven luminance is even further mitigated.

According to the present embodiment described above, the plurality of light-exiting surface-side prism units 643a constituting the light-exiting surface-side prism portion 643 include the first light-exiting surface-side prism units 643aA having vertex portions 643aA2 that are relatively low and second light-exiting surface-side prism units 643aB having vertex portions 643aB2 that are relatively high, and a gap is present between the first light-exiting surface-side prism units 643aA and the prism sheet. In this manner, a gap is formed between the first light-exiting surface-side prism units 643aA included among the plurality of light-exiting surface-side prism units 643a and the prism sheet, which means that the prism sheet is less susceptible to sticking to the light-exiting surface-side prism portion 643. In this manner, it is possible to mitigate the occurrence of uneven luminance for the light emitted by the backlight device.

Also, the bow-shaped portions 645 are sandwiched between the first light-exiting surface-side prism units 643aA and the second light-exiting surface-side prism units 643aB in the second direction. In this manner, the light that has reached the light-exiting surface 619a is totally reflected at the surface of the bow-shaped portions 645, enabling the totally reflected light to travel towards the first light-exiting surface-side prism units 643aA or the second light-exiting surface-side prism units 643aB, which are adjacent to each other in the second direction. Thus, compared to a case in which the first light-exiting surface-side prism units and the second light-exiting surface-side prism units are adjacent to each other in the second direction without the bow-shaped portions therebetween, the effect of mitigating uneven luminance by the bow-shaped portions 645 can be more suitably achieved.

Also, the proportion of the light-exiting surface 619a occupied by the first light-exiting surface-side prism unit 643aA and the second light-exiting surface-side prism unit 643aB in the second direction gradually and continuously increases farther away from the light-receiving face 619b in the first direction. In this manner, in portions towards the light-receiving face 619b in the first direction where insufficient luminance is of concern, the light-exiting surface-side prism units 643 can more suitably increase luminance.

Embodiment 8

Embodiment 8 of the present invention will be described with reference to FIG. 37. Embodiment 8 shows a case in which the shape of second light-exiting surface-side prism units 743aB is modified from Embodiment 7. Descriptions of structures, operations, and effects similar to those of Embodiment 7 will be omitted.

Figure 37:
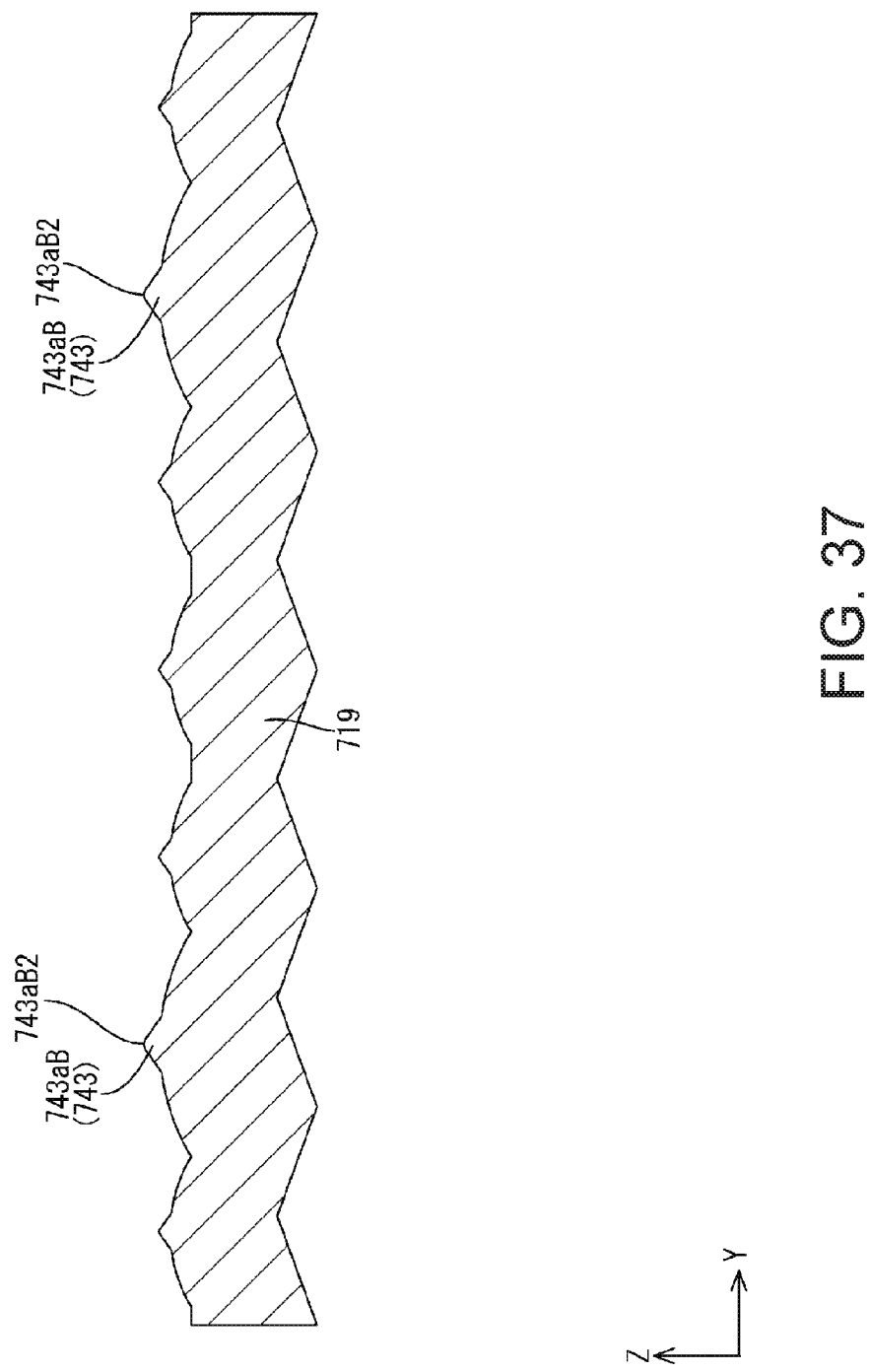
FIG. 37 is a cross-sectional view of a configuration taken along the shorter side direction of a light-receiving face edge of a light guide plate according to Embodiment 8 of the present invention.

As shown in FIG. 37, the second light-exiting surface-side prism units 743aB of the light-exiting surface-side prism portion 743 according to the present embodiment are configured such that the vertex portion 743aB2 thereof is rounded to an arc shape so as to have a curved surface. The vertex portion 743aB2 of the second light-exiting surface-side prism unit 743 aB is in direct contact with the rear surface of a prism sheet (not shown), but as a result of the rounded shape, there is less susceptibility for the vertex portion 743aB2 of the second light-exiting surface-side prism unit 743aB scraping past the prism sheet and causing abrasions to be formed in the prism sheet, or for the prism sheet interfering with the vertex portion 743aB2 of the second light-exiting surface-side prism unit 743aB to deform the vertex portion 743aB2. In this manner, the light guide plate 719 and the prism sheet are less susceptible to degradation in optical characteristics.

Embodiment 9

Embodiment 9 of the present invention will be described with reference to FIG. 38. Embodiment 9 shows a case in which the plan view shapes of light-exiting surface-side prism units 843a and bow-shaped portions 845 are modified from Embodiment 2. Descriptions of structures, operations, and effects similar to those of Embodiment 2 will be omitted.

Figure 38:
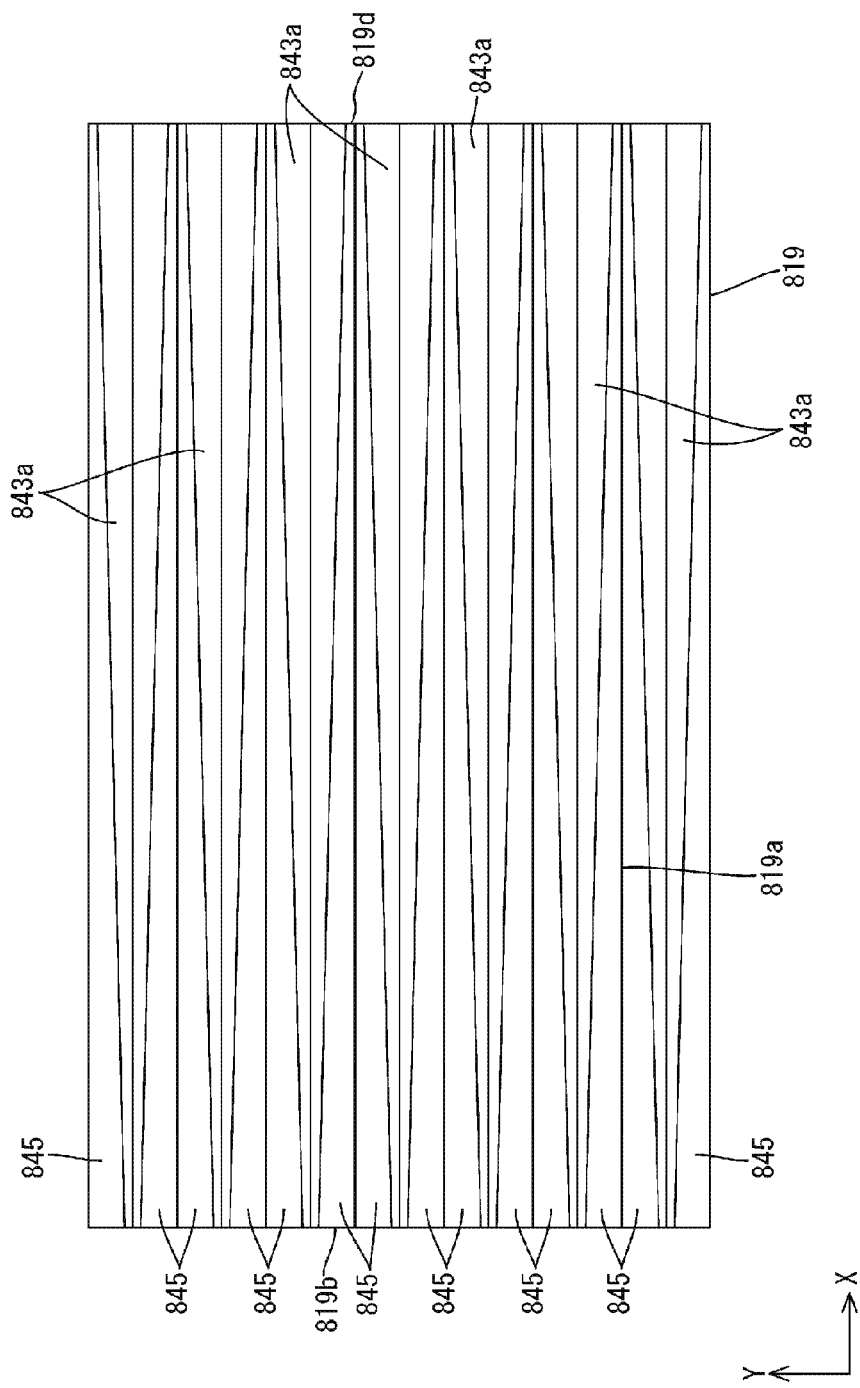
FIG. 38 is a plan view of a light guide plate according to Embodiment 9 of the present invention.

As shown in FIG. 38, the proportion of the light-exiting surface 819a occupied by the light-exiting surface-side prism units 843a of the present embodiment in the second direction is less than 100% (approximately 80%, for example) at the edge of the light guide plate 819 towards the non-light-receiving opposite face 819d. As a result, the bow-shaped portions 845 occupy a certain proportion (approximately 20%, for example) of the light-exiting surface 819a at the edge of the light guide plate 819 towards the non-light-receiving opposite face 819d. In other words, at the edge towards the non-light-receiving opposite face 819d, the width of the light-exiting surface-side prism unit 843a is less than the gap between the light-exiting surface-side prism units 843a aligned in the second direction (distance between vertices of the light-exiting surface-side prism units 843a in the second direction). The proportions occupied by the light-exiting surface-side prism units 843a and the bow-shaped portions 845 at the edge of the light guide plate 819 towards the light-receiving face 819b are equal, as in Embodiment 2. Thus, the rate of change in the proportions occupied by the light-exiting surface-side prism units 843a and bow-shaped portions 845 along the first direction is less than in Embodiment 2. Also, the light-exiting surface-side prism units 843a and the bow-shaped portions 845 have a narrow trapezoidal shape in a plan view. Even with such a configuration, it is possible to achieve a suitable balance between increase in luminance and mitigation of uneven luminance as in Embodiment 2.

Embodiment 10

Embodiment 10 of the present invention will be described with reference to FIG. 39. Embodiment 10 shows a case in which the plan view shapes of light-exiting surface-side prism units 943a and bow-shaped portions 945 are modified from Embodiment 2. Descriptions of structures, operations, and effects similar to those of Embodiment 2 will be omitted.

Figure 39:
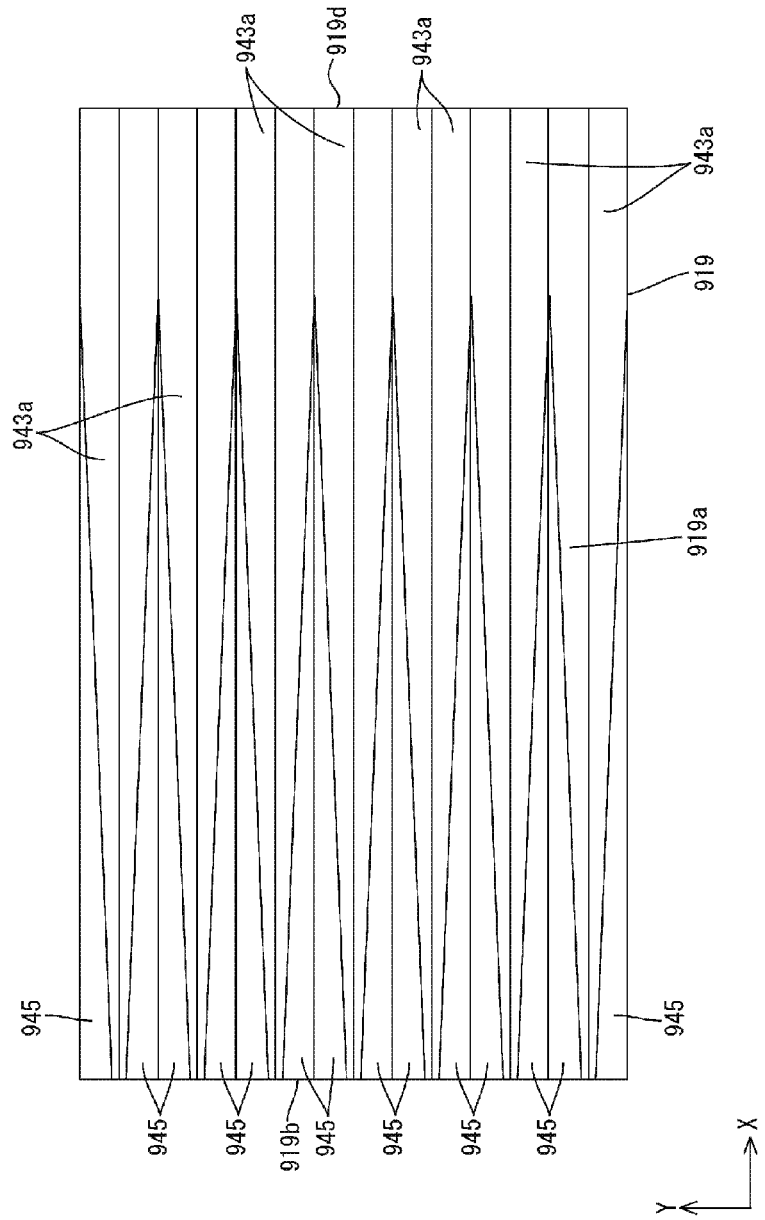
FIG. 39 is a plan view of a light guide plate according to Embodiment 10 of the present invention.

As shown in FIG. 39, the proportion of the light-exiting surface 919a occupied by the light-exiting surface-side prism units 943a of the present embodiment in the second direction gradually and continuously increases away from the light-receiving face 919b in the first direction, and reaches 100% immediately before the edge towards the non-light-receiving opposite face 919d. The bow-shaped portions 945 are not formed over the entire length of the light guide plate 919 in the first direction, and specifically, the bow-shaped portions 945 are formed from the edge towards the light-receiving face 919b up to a position before reaching the non-light-receiving opposite face 919d. The proportions occupied by the light-exiting surface-side prism units 943a and the bow-shaped portions 945 at the edge of the light guide plate 919 towards the light-receiving face 919b are equal, as in Embodiment 2. Thus, the rate of change in the proportions occupied by the light-exiting surface-side prism units 943a and bow-shaped portions 945 along the first direction is greater than in Embodiment 2. In addition, the light-exiting surface-side prism units 943a have a narrow trapezoidal shape in a plan view. Even with such a configuration, it is possible to achieve a suitable balance between increase in luminance and mitigation of uneven luminance as in Embodiment 2.

Embodiment 11

Embodiment 11 of the present invention will be described with reference to FIG. 40. Embodiment 11 shows a case in which the plan view shapes of light-exiting surface-side prism units 1043a and bow-shaped portions 1045 is modified from Embodiment 2. Descriptions of structures, operations, and effects similar to those of Embodiment 2 will be omitted.

Figure 40:
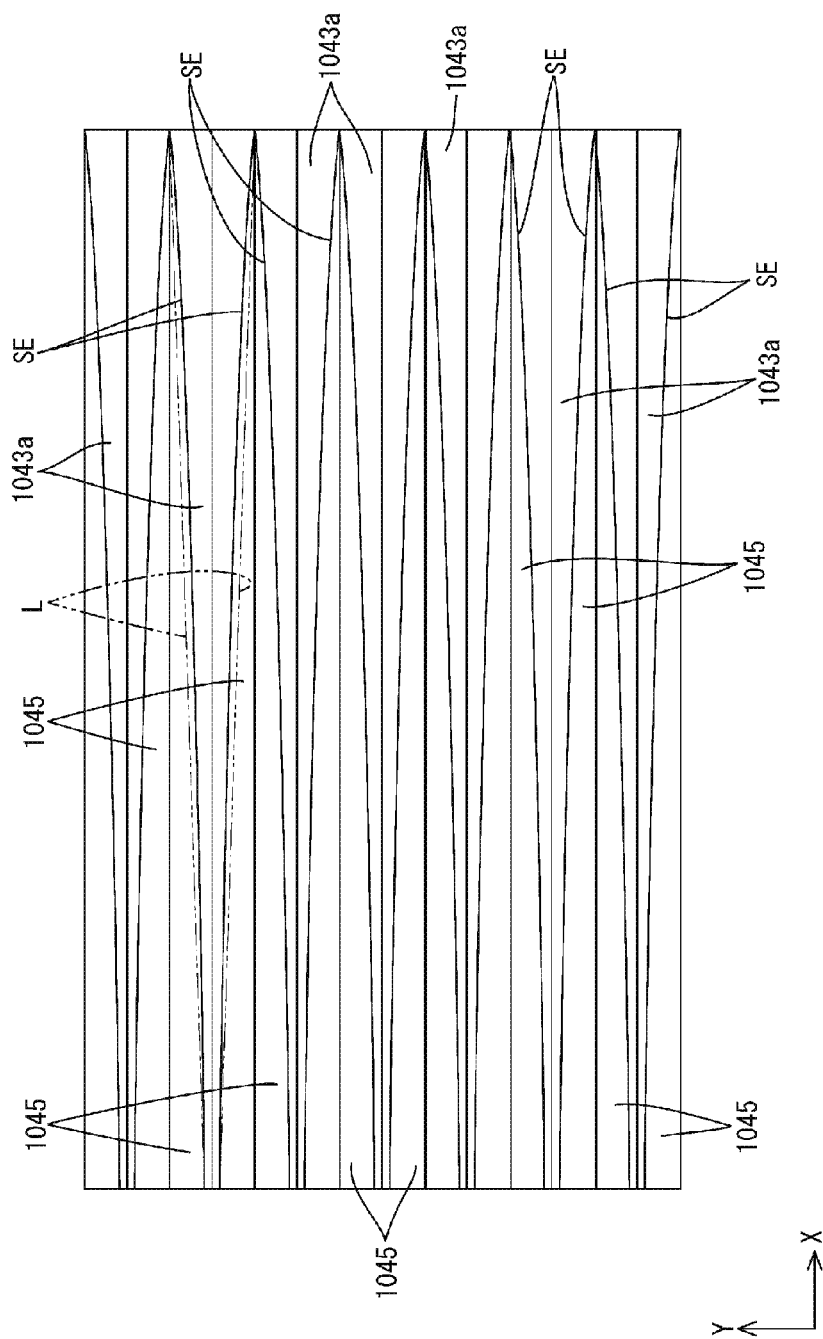
FIG. 40 is a plan view of a light guide plate according to Embodiment 11 of the present invention.

As shown in FIG. 40, the light-exiting surface-side prism units 1043a and the bow-shaped portions 1045 of the present embodiment are provided such that both side edges SE that define the widths thereof are substantially arced in a plan view. Specifically, both side edges SE of the light-exiting surface-side prism unit 1043a and the bow-shaped portion 1045 are formed so as to pass towards the light-exiting surface-side prism unit 1043a in relation to imaginary lines L (depicted in FIG. 40 with two-dot chain lines) drawn by connecting both ends of the respective side edges SE in the first direction. Even with such a configuration, it is possible to achieve a suitable balance between increase in luminance and mitigation of uneven luminance as in Embodiment 2.

Embodiment 12

Embodiment 12 of the present invention will be described with reference to FIG. 41. Embodiment 12 shows a case in which the plan view shapes of light-exiting surface-side prism units 1143*a* and bow-shaped portions 1145 are modified from Embodiment 2. Descriptions of structures, operations, and effects similar to those of Embodiment 2 will be omitted.

Figure 41:
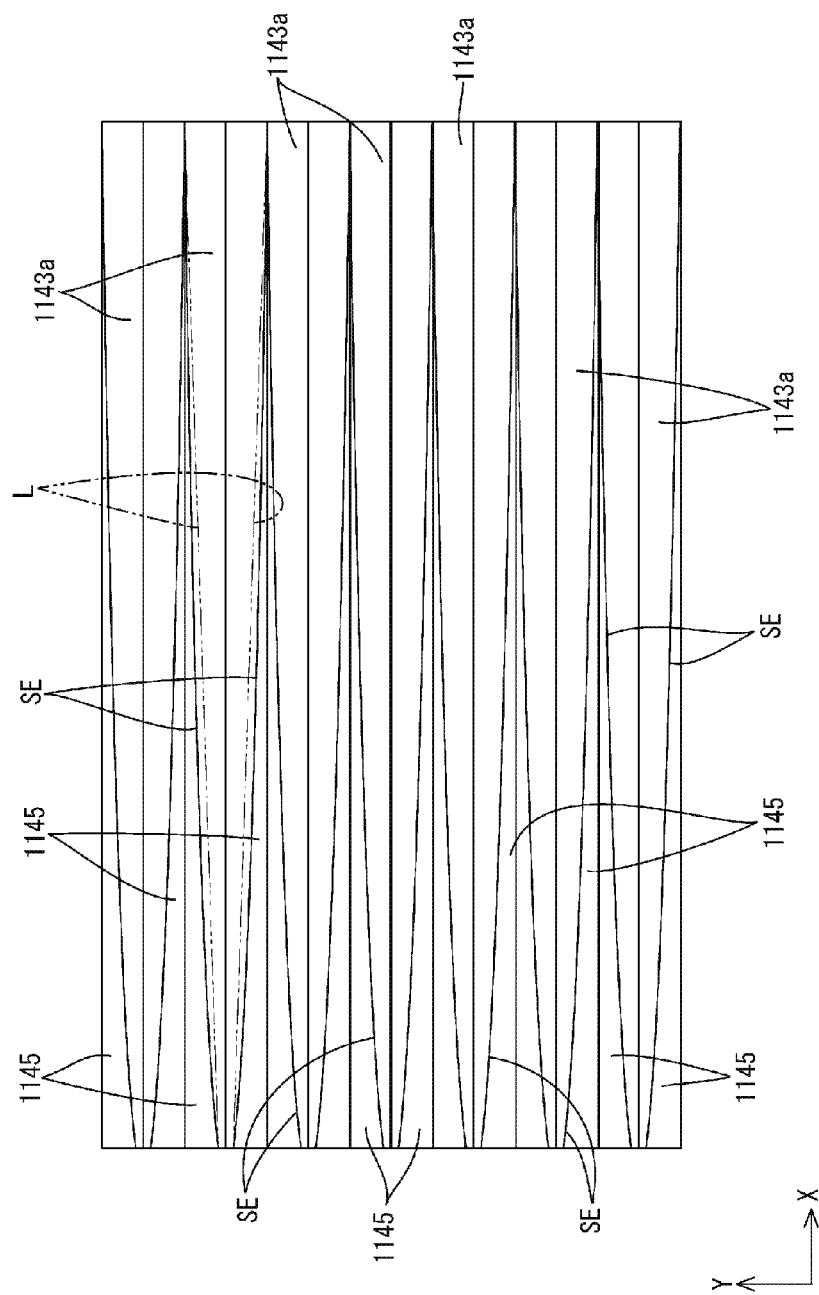
FIG. 41 is a plan view of a light guide plate according to Embodiment 12 of the present invention.

As shown in FIG. 41, the light-exiting surface-side prism units 1143*a* and the bow-shaped portions 1145 of the present embodiment are provided such that both side edges SE that define the widths thereof are substantially arced in a plan view. Specifically, both side edges SE of the light-exiting surface-side prism unit 1143*a* and the bow-shaped portion 1145 are formed so as to pass through the bow-shaped portion 1145 in relation to imaginary lines L (depicted in FIG. 41 with two-dot chain lines) drawn by connecting both ends of the respective side edges SE in the first direction. Even with such a configuration, it is possible to achieve a suitable balance between increase in luminance and mitigation of uneven luminance as in Embodiment 2.

Embodiment 13

Embodiment 13 of the present invention will be described with reference to FIG. 42. Embodiment 13 shows a case in which the plan view shapes of light-exiting surface-side prism units 1243*a* and bow-shaped portions 1245 are modified from Embodiment 2. Descriptions of structures, operations, and effects similar to those of Embodiment 2 will be omitted.

Figure 42:
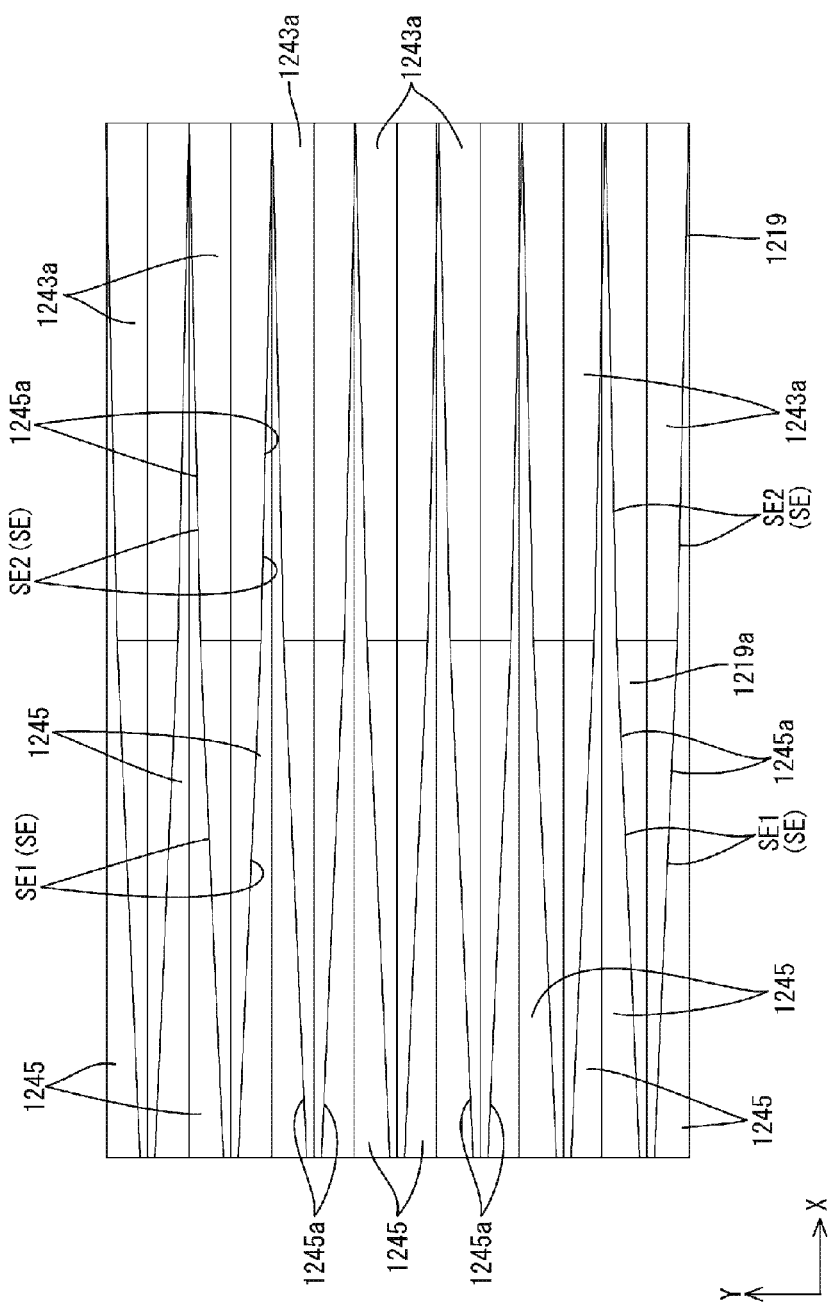
FIG. 42 is a plan view of a light guide plate according to Embodiment 13 of the present invention.

As shown in FIG. 42, the light-exiting surface-side prism units 1243*a* of the present embodiment are provided such that both side edges SE that define the width thereof have a two-step incline in a plan view. Specifically, the rate of change in the proportion of the light-exiting surface 1219*a* that the light-exiting surface-side prism units 1243*a* occupy in the second direction changes depending on the position in the first direction. In this manner, both side edges SE of the light-exiting surface-side prism unit 1243*a* include first inclined side edges SE1 having a relatively large incline angle with respect to the first direction, and second inclined side edges SE2 having a relatively small incline angle with respect to the first direction. The boundary position between the first inclined side edge SE1 and the second inclined side edge SE2 substantially matches the center of the light guide plate 1219 in the first direction. As a result, one edge 1245*a* of the bow-shaped portion 1245 that is continuous with the light-exiting surface-side prism unit 1243*a* has a two-step incline in a plan view, similar to the side edges SE of the light-exiting surface-side prism unit 1243*a*. Even with such a configuration, it is possible to achieve a suitable balance between increase in luminance and mitigation of uneven luminance as in Embodiment 2.

Embodiment 14

Embodiment 14 of the present invention will be described with reference to FIG. 43. Embodiment 14 shows a case in which the plan view shapes of light-exiting surface-side prism units 1343*a* and bow-shaped portions 1345 are modified from Embodiment 2. Descriptions of structures, operations, and effects similar to those of Embodiment 2 will be omitted.

Figure 43:
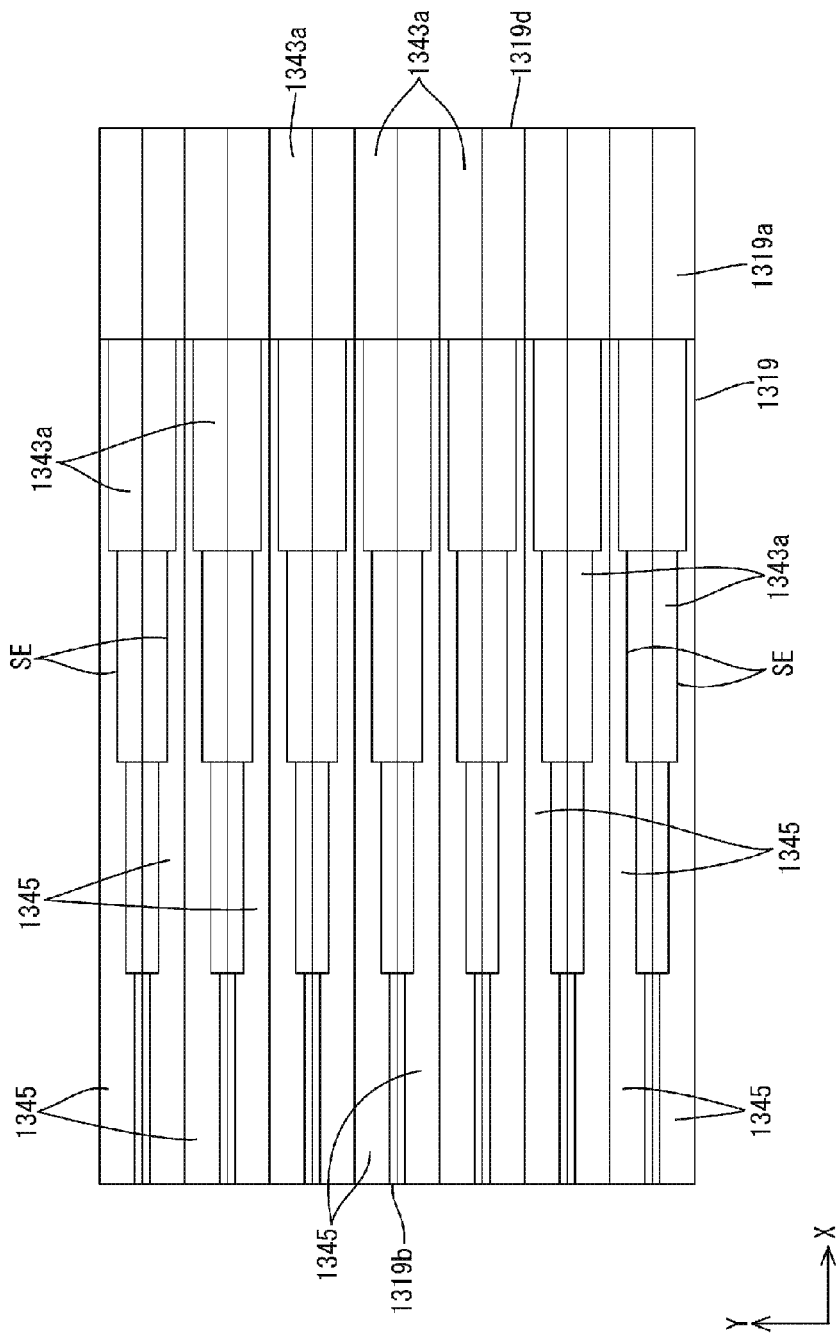
FIG. 43 is a plan view of a light guide plate according to Embodiment 14 of the present invention.

As shown in FIG. 43, the light-exiting surface-side prism units 1343*a* and the bow-shaped portions 1345 of the present embodiment are provided such that side edges SE that define the respective widths thereof have a multi-step form in a plan view. The proportion of the light-exiting surface 1319*a* occupied in the second direction by the light-exiting surface-side prism unit 1343*a* sequentially increases in a stepwise fashion from the light-receiving face 1319*b* towards the non-light-receiving opposite face 1319*b* in the first direction. The proportion of the light-exiting surface 1319*a* occupied by the bow-shaped portions 1345 sequentially decreases in a stepwise fashion from the light-receiving face 1319*b* towards the non-light-receiving opposite face 1319*b* in the first direction. Thus, both side edges SE of the light-exiting surface-side prism units 1343*a* and the bow-shaped portions 1345 have a configuration where portions parallel to the first direction are connected to portions parallel to the second direction. In the present embodiment, the light-exiting surface-side prism units 1343*a* and the bow-shaped portions 1345 are provided such that the widths thereof decrease in five stages. Even with such a configuration, it is possible to achieve a suitable balance between increase in luminance and mitigation of uneven luminance as in Embodiment 2.

Embodiment 15

Embodiment 15 of the present invention will be described with reference to FIG. 44. Embodiment 15 shows a case in which the cross-sectional shape of the reflection units 1441*a* of the light emission reflection portion 1441 has been modified from that of Embodiment 1. Descriptions of structures, operations, and effects similar to those of Embodiment 1 will be omitted.

Figure 44:
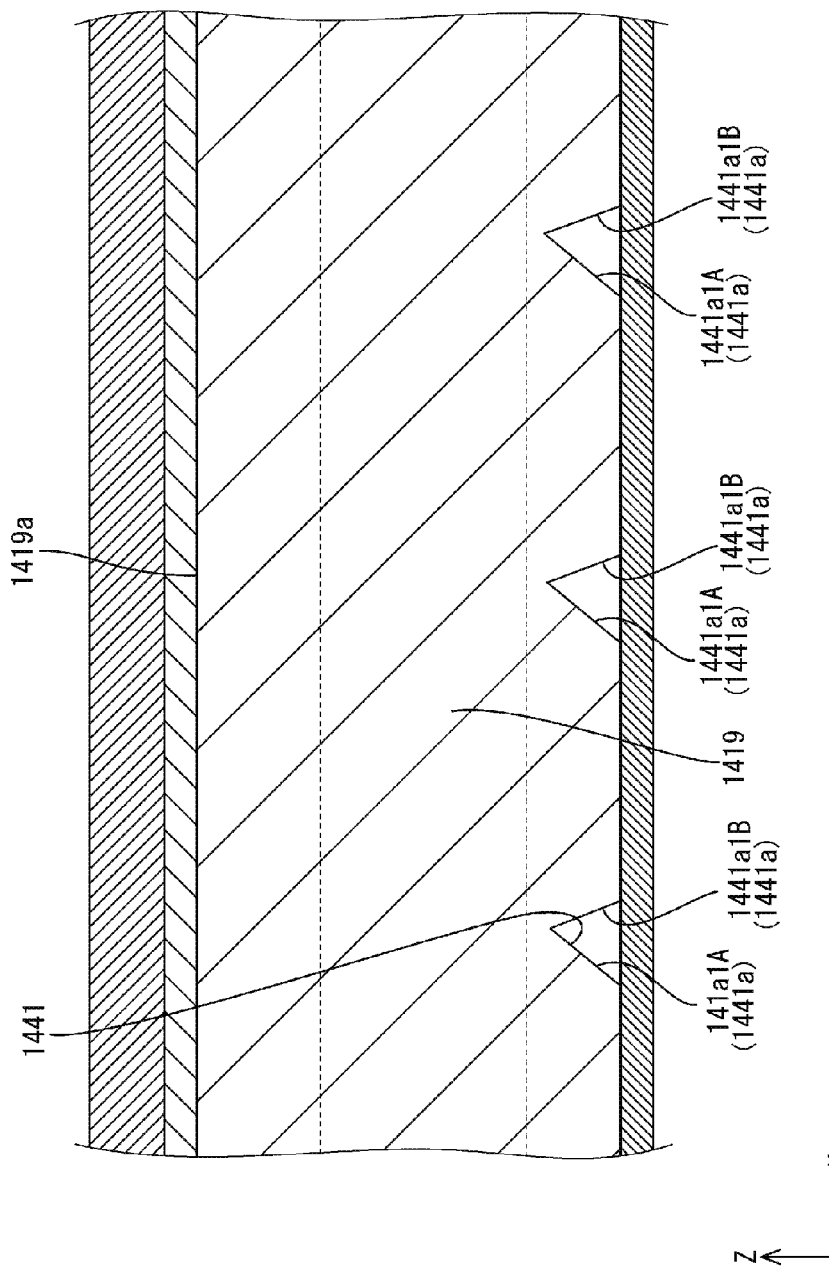
FIG. 44 is a cross-sectional view of a configuration of the backlight device along the longer side direction (first direction, X axis direction) according to Embodiment 15 of the present invention.

As shown in FIG. 44, the reflection units 1441*a* of the light emission reflection portion 1441 of the present embodiment have a non-right triangular cross-section. The reflection units 1441*a* have a pair of inclined surfaces 1441*a*1A and 1441*a*1B that are inclined with respect to the third direction (Z axis direction) and the first direction (X axis direction). Of these, the first inclined surface 1441*a*1A towards the light-receiving face (not shown; to the left of FIG. 44) in the first direction forms an angle with respect to the first direction that is smaller than the angle formed between the first direction and the second inclined surface 1441*a*1B disposed in the opposite edge face (not shown; to the right of FIG. 44) in the first direction. Specifically, the angle between the first inclined surface 1441*a*1A and the first direction is approximately 50°, for example, while the angle between the second inclined surface 1441*a*1B and the first direction is approximately 70°, for example. Even with such a configuration, the reflection units 1441*a* primarily reflect light at the first inclined surfaces 1441*a*1A, thereby producing light incident on the light-exiting surface 1419*a* that does not exceed the critical angle, thereby encouraging light to be emitted from the light-exiting surface 1419*a*. Also, the reflection units 1441*a* are arranged so as to become gradually taller in the height direction (third direction) with the areas (surface areas) of the inclined surfaces 1441*a*1A and 1441*a*1B becoming gradually larger, moving away from the light-receiving face (not shown) in the first direction.

Embodiment 16

Embodiment 16 of the present invention will be described with reference to FIG. 45. Embodiment 16 shows a case in which the configuration of the prism sheet 1542 differs from that of Embodiment 1. Descriptions of structures, operations, and effects similar to those of Embodiment 1 will be omitted.

Figure 45:
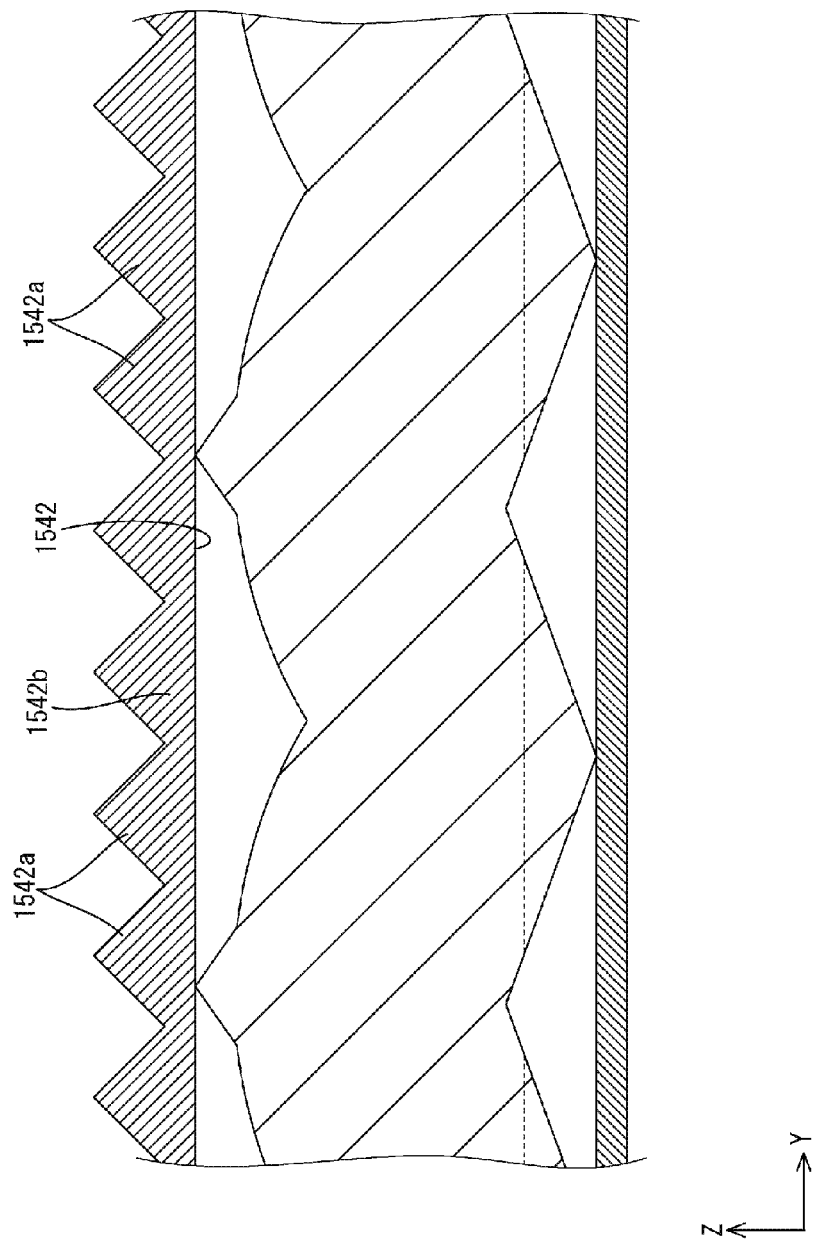
FIG. 45 is a cross-sectional view of a configuration of the backlight device along the shorter side direction (second direction, Y axis direction) according to Embodiment 16 of the present invention.

As shown in FIG. 45, the prism sheet 1542 of the present embodiment has a configuration in which light-exiting side unit prisms 1542*a* and a sheet base member 1542*b* are formed integrally and of the same material. The prism sheet 1542 is made of polycarbonate (PC), for example, with an index of refraction of approximately 1.59. Even with such a configuration, operations and effects similar to those of Embodiment 1 can be attained.

Embodiment 17

Embodiment 17 of the present invention will be described with reference to FIG. 46. Embodiment 17 is a modification example of Embodiment 2, in which two LED substrates 1618 having LEDs 1617 are formed so as to sandwich the light guide plate 1619. Descriptions of structures, operations, and effects similar to those of Embodiment 2 will be omitted.

Figure 46:
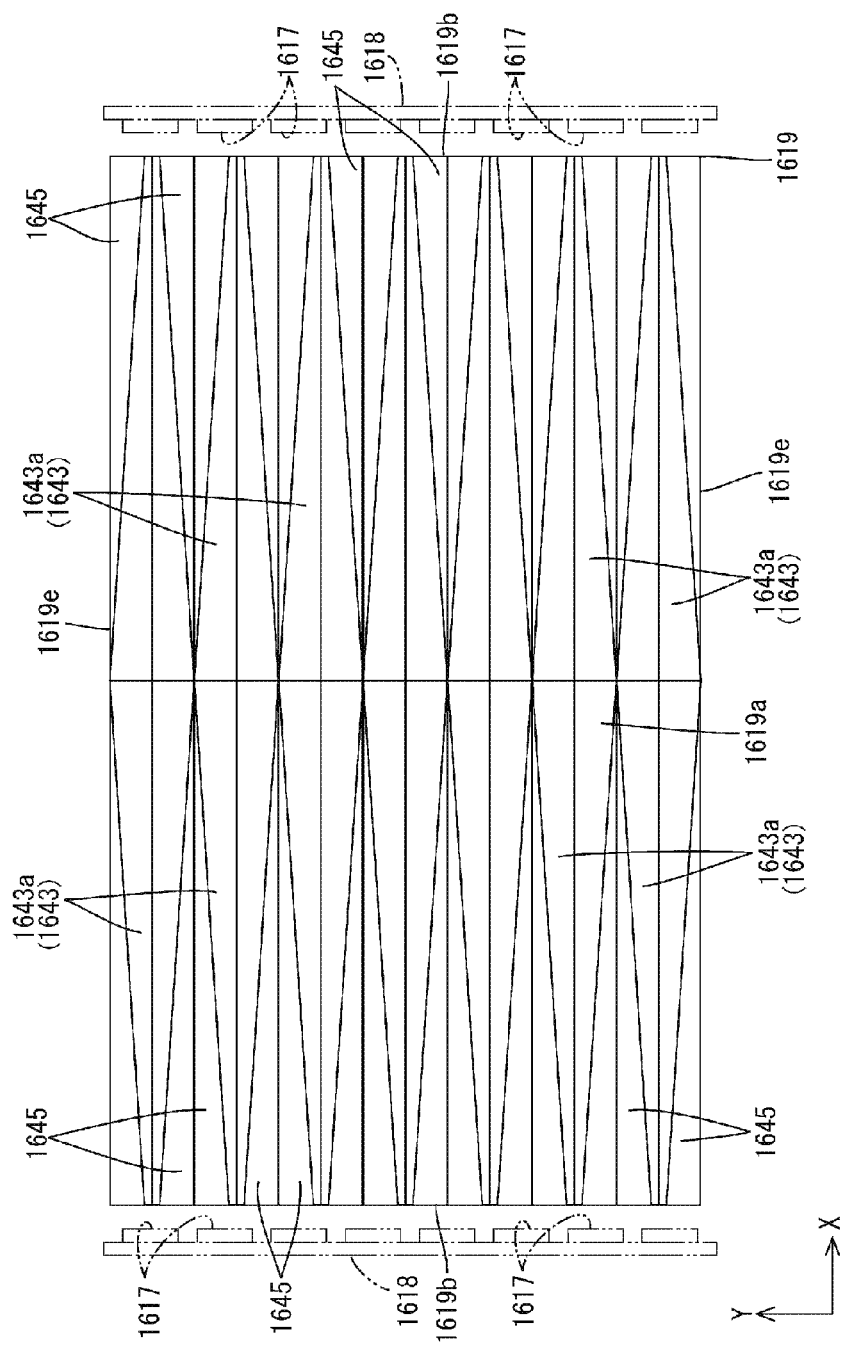
FIG. 46 is a plan view of a light guide plate according to Embodiment 17 of the present invention.

As shown in FIG. 46, two LED substrates 1618 having the LEDs 1617 of the present embodiment are arranged so as to sandwich the light guide plate 1619 from both sides in the first direction (X axis direction). In such a configuration, of the outer edge faces of the light guide plate 1619, the pair of short edge faces are designated as light-receiving faces 1619*b* into which light from the LEDs 1617 is radiated, and the pair of long edge faces are designated as the non-light-receiving side faces 1619*e*. In other words, the outer edge faces of the light guide plate 1619 do not include the non-light-receiving opposite face 119*d* (see FIG. 12) such as in Embodiment 2. In FIG. 46, the LEDs 1617 and the LED substrates 1618 are depicted with two-dot chain lines.

As a result of the LED substrates 1618 being arranged in this manner, the light-exiting surface-side prism portion 1643 and the bow-shaped portion 1645 provided on the light-exiting surface 1619*a* of the light guide plate 1619 have the following configuration. In the light-exiting surface-side prism portion 1643, whereas the proportion of the light-exiting surface 1619*a* occupied by the light-exiting surface-side prism units 1643*a* is lower towards the light-receiving faces 1619*b* in the first direction, in the central portion in the first direction, the light-exiting surface-side prism units 1643*a* occupy a larger proportion of the light-exiting surface 1619*a*. By contrast, the bow-shaped portions 1645 occupy a greater proportion of the light-exiting surface 1619*a* towards the light-receiving faces 1619*b* in the first direction, and in the central portion in the first direction, the bow-shaped portions 1645 occupy a smaller proportion of the light-exiting surface 1619*a*.

Specifically, the light-exiting surface-side prism units 1643*a* gradually and continuously increase in the proportion (width) of the light-exiting surface 1619*a* occupied in the second direction from the light-receiving faces 1619*b* towards the central portion (portion furthest from the light-receiving faces 1619*b*) in the first direction, whereas the proportion occupied by the light-exiting surface-side prism units 1643*a* gradually and continuously decreases from the central portion towards the light-receiving faced 1619*b* in the first direction. The light-exiting surface-side prism units 1643*a* occupy a minimum of approximately 20-30% of the light-exiting surface 1619*a* at the edges (edge positions) towards the light-receiving faces 1619*b* in the first direction of the light guide plate 1619, whereas the proportion occupied at the central portion is at a maximum of approximately 100%, for example. Thus, at central portion in the first direction, the width of the light-exiting surface-side prism unit 1643*a* is substantially equal to the gap between the light-exiting surface-side prism units 1643*a* aligned in the second direction (distance between vertices of the light-exiting surface-side prism units 1643*a* in the second direction). By contrast, the bow-shaped portions 1645 gradually and continuously decrease in the proportion of the light-exiting surface 1619*a* occupied from the light-receiving faces 1619*b* towards the central portion in the first direction, whereas the proportion of the light-exiting surface 1619*a* occupied by the bow-shaped portions 1645 gradually and continuously increases from the central portion towards the light-receiving faces 1619*b* in the first direction. The bow-shaped portions 1645 occupy a maximum of approximately 70-80% of the light-exiting surface 1619*a* at the edges towards the light-receiving faces 1619*b* in the first direction of the light guide plate 1619, whereas the proportion occupied at the central portion is at a minimum of approximately 0%, for example. In other words, at the central portion in the first direction, no bow-shaped portion 1645 is present between the plurality of light-exiting surface-side prism units 1643*a* in the second direction, and the light-exiting surface-side prism units 1643*a* are adjacent to each other. The rate of change in the proportion occupied by the light-exiting surface-side prism units 1643*a* and the bow-shaped portions 1645 is the same between both. In this manner, the light-exiting surface-side prism units 1643*a* and the bow-shaped portions 1645 are approximately the same width at the edge of the light guide plate 1619 towards the light-receiving face 1619*b* in the first direction, whereas at the central portion in the first direction, no bow-shaped portion 1645 is present and only the light-exiting surface-side prism units 1643*a* are present. Even with such a configuration, it is possible to achieve a suitable balance between increase in luminance and mitigation of uneven luminance as in Embodiment 2.

As described above, according to the present embodiment, the light guide plate 1619 outer edge faces with a pair of edge faces included thereamong are designated as the light-receiving faces 1619*b*, and the light-exiting surface-side prism units 1643*a* occupy a lower proportion of the light-exiting surface 1619*a* in the second direction in areas towards the light-receiving faces 1619*b* in the first direction while the proportion occupied by the bow-shaped portions 1645 is greater, whereas the light-exiting surface-side prism units 1643*a* occupy a greater proportion in areas towards the center in the first direction while the proportion occupied by the bow-shaped portions 1645 is less. In a double light-receiving type light guide plate 1619, areas towards the light-receiving faces 1619*b* in the first direction are more susceptible to uneven luminance in light emitted from the light-exiting surface 1619*a* compared to the central portion, whereas areas towards the center in the first direction are more susceptible to insufficient luminance in light emitted from the light-exiting surface 1619*a* compared to areas close to the light-receiving faces 1619*b*. By contrast, the proportion of the light-exiting surface 1619*a* occupied in the second direction is lowest for the light-exiting surface-side prism units 1643*a* and highest for the bow-shaped portions 1645 in areas towards the light-receiving faces 1619*b* in the first direction, and thus, in areas towards the light-receiving faces 1619*b* in the first direction where uneven luminance is of concern, uneven luminance is more suitably mitigated by the bow-shaped portions 1645. Additionally, the proportion of the light-exiting surface 1619*a* occupied in the second direction is highest for the light-exiting surface-side prism units 1643*a* and lowest for the bow-shaped portions 1645 in areas towards the center in the first direction, and thus, in areas towards the center in the first direction where insufficient luminance is of concern, luminance is more suitably improved by the light-exiting surface-side prism units 1643*a*. In this manner, it is possible to more suitably achieve a balance between improvement of luminance and mitigation of uneven luminance for the light emitted by the backlight device.

Other Embodiments

The present invention is not limited to the embodiments shown in the drawings and described above, and the following embodiments are also included in the technical scope of the present invention, for example.

(1) In Embodiment 1, the light-exiting surface-side prism units and the bow-shaped portions have the same widths across the entire length thereof in the first direction, whereas in Embodiment 2, the widths of the light-exiting surface-side prism units and the bow-shaped portions change over the entire length thereof. However, it is possible to have a configuration whereby the light-exiting surface-side prism units and the bow-shaped portions have the same widths over a prescribed range, but outside of that range, the widths change. Specifically, a configuration can be adopted in which in portions towards the light-receiving face in the first direction, the light-exiting surface-side prism units and the bow-shaped portions are kept at uniform widths but in portions towards the non-light-receiving opposite face, the light-exiting surface-side prism units and the bow-shaped portions have changing widths. Conversely, a configuration can be adopted in which in portions towards the light-receiving face in the first direction, the light-exiting surface-side prism units and the bow-shaped portions have changing widths but in portions towards the non-light-receiving opposite face, the light-exiting surface-side prism units and the bow-shaped portions are kept at uniform widths.

(2) In the embodiments above, the vertex angle of the light-exiting surface-side prism units constituting the light-exiting surface-side prism portion is uniform throughout the entire length thereof, but a configuration can be adopted in which the vertex angle of the light-exiting surface-side prism units changes according to the position in the first direction. In such a case, it is possible for the light-exiting surface-side prism units to have a uniform height throughout the entire length thereof. Additionally, it is possible to adopt a configuration in which the height and vertex angle of the light-exiting surface-side prism units changes depending on the position in the first direction.

(3) In the embodiments above, the light-exiting surface-side prism units constituting the light-exiting surface-side prism portion have an isosceles triangular cross-sectional shape, but a configuration can be adopted in which the cross-sectional shape of the light-exiting surface-side prism units is, for example, a scalene triangle in which the sides all have different lengths, a right triangle, or the like.

(4) In the embodiments above, the opposite plate surface-side unit prisms constituting the opposite plate surface-side prism portion have an isosceles triangular cross-sectional shape, but a configuration can be adopted in which the cross-sectional shape of the opposite plate surface-side unit prisms is, for example, a scalene triangle in which the sides all have different lengths, a right triangle, or the like.

(5) Besides the embodiments above, specific values such as the vertex angle, height, width, and the interval in the second direction of the light-exiting surface-side prism units constituting the light-exiting surface-side prism portion can be appropriately modified. Similarly, specific values such as the width and the interval in the second direction of the bow-shaped portions can be appropriately modified. Similarly, specific values such as the vertex angle, height, width, and the interval in the second direction of the opposite plate surface-side unit prisms constituting the opposite plate surface-side prism portion can be appropriately modified. Similarly, specific values such as the vertex angle, height, width, and the interval in the second direction of the light-exiting side unit prisms constituting the prism sheet can be appropriately modified.

(6) In the embodiments above, the opposite plate surface-side prism portion provided on the opposite plate surface of the light guide plate was described as being constituted of opposite plate surface-side unit prisms having triangular cross-sections, but instead of such an opposite plate surface-side prism portion, an opposite plate surface-side lenticular lens portion constituted of a plurality of cylindrical lenses having a substantially semicylindrical form with an axis direction matching the first direction (X axis direction) may be provided on the opposite plate surface of the light guide plate as an "opposite plate surface-side anisotropic light focusing portion".

(7) In the embodiments above, the prism sheet was described as being provided with light-exiting side unit prisms having triangular cross-sections, but instead of such light-exiting side unit prisms, a plurality of cylindrical lenses having a substantially semicylindrical form with an axis direction matching the first direction (X axis direction) may be provided on the prism sheet.

(8) In the embodiments above, the light-exiting surface-side prism portion was described as being provided integrally on the light-exiting surface of the light guide plate, but a configuration can be adopted in which the light-exiting surface-side prism portion is provided as a separate item on the light guide plate, and the separate light-exiting surface-side prism portion is disposed so as to coincide in position with the light-exiting surface of the light guide plate. In such a case, it is preferable that the index of refraction of the material forming the separate light-exiting surface-side prism portion be the same as the index of refraction of the material forming the light guide plate. Furthermore, it is preferable that the material forming the separate light-exiting surface-side prism portion be the same as the material forming the light guide plate.

(9) In the embodiments above (excluding Embodiments 1 and 3), besides what is shown in the drawings, the proportion of the light-exiting surface occupied in the second direction by the light-exiting surface-side prism units and the bow-shaped portions can be appropriately modified, respectively, at the edge towards the light-receiving face in the first direction, the edge towards the non-light-receiving opposite face in the first direction, and the central portion in the first direction.

(10) In Embodiments 3 and 4, a case was described in which the flat portions occupy substantially the same proportion of the light guide plate in the second direction from the light-receiving face to the non-light-receiving opposite face, but a configuration may be adopted in which the proportion of the light guide plate occupied by the flat portions in the second direction changes from the light-receiving face to the non-light-receiving opposite face.

(11) In Embodiments 5 and 6, a configuration was illustrated in which the bow-shaped portions have a lower height than the light-exiting surface-side prism units, but configurations in which the bow-shaped portions have the same height as the light-exiting surface-side prism units, or have a greater height than the light-exiting surface-side prism units are also included in the present invention.

(12) In Embodiment 7 above, the bow-shaped portions were not formed over the entire length of the light guide plate in the first direction, but in the configuration of Embodiment 7, a configuration can be adopted in which the bow-shaped portions are formed over the entire length of the light guide plate in the first direction. As a modification example of Embodiment 7, the flat portions can be omitted.

(13) In Embodiment 7, the specific position at which the first light-exiting surface-side prism unit is connected to the second light-exiting surface-side prism unit can be appropriately modified.

(14) In Embodiment 7, a configuration was described in which the first light-exiting surface-side prism units have a similar cross-sectional shape to the second light-exiting surface-side prism units, but a configuration in which the first light-exiting surface-side prism units differ in cross-sectional shape from the second light-exiting surface-side prism units is also included in the present invention. Specifically, the vertex angle of the first light-exiting surface-side prism units may be different from the vertex angle of the second light-exiting surface-side prism units. The surface curvatures of the first bow-shaped portions and the second bow-shaped portions can also differ from each other.

(15) In Embodiment 7, the light-exiting surface-side prism portion was described as being constituted of two types of light-exiting surface-side prism units having different heights, but the light-exiting surface-side prism portion can be constituted of three or more types of light-exiting surface-side prism units having different heights.

(16) In Embodiment 2 above, the bow-shaped portions were formed so as to have a uniform height over the entire length thereof in the first direction, but the bow-shaped portions can have changing heights over the entire length thereof in the first direction. Specifically, the height of the bow-shaped portions can gradually and continuously increase from the light-receiving face towards the non-light-receiving opposite face in the first direction. Conversely, the height of the bow-shaped portions can gradually and continuously decrease from the light-receiving face towards the non-light-receiving opposite face in the first direction. This configuration can be similarly applied to Embodiments 4 to 17. Additionally, this configuration can be applied to Embodiments 1 and 3.

(17) In Embodiment 8, a case was described in which the vertex portions of the second light-exiting surface-side prism units were rounded, but the vertex portions of the first light-exiting surface-side prism units can also be similarly rounded. Furthermore, the vertex portions of the opposite plate surface-side unit prisms can also be rounded.

(18) Embodiment 13 illustrated a configuration in which both edges that define the widths of the light-exiting surface-side prism units and the bow-shaped portions have a two-step incline, but the edges can have a three or more-step incline in a plan view.

(19) Embodiment 14 illustrated an example in which the widths of the light-exiting surface-side prism units and the bow-shaped portions increased or decreased in five steps according to position along the first direction, but the widths may increase/decrease in four steps or fewer or six steps or more according to position in the first direction.

(20) It is also possible to combine the configurations of Embodiments 7 and 8 with the configuration of Embodiment 1 such that the light-exiting surface-side prism portion (light-exiting surface-side anisotropic light focusing prism portion) is constituted of two types of light-exiting surface-side prism units, large and small, of uniform width.

(21) It is also possible to combine the configurations of Embodiments 5 and 6 with the configuration of Embodiment 1 such that bow-shaped portions constituted of cylindrical lenses of a uniform width are provided on the light-exiting surface.

(22) The embodiments (excluding Embodiments 5 and 6) disclose arranging the bow-shaped portions so as to form a pair sandwiching the vertex portion of the light-exiting surface-side prism unit, but the present invention also includes a configuration whereby the bow-shaped portion is adjacent only to one side of the vertex portion of the light-exiting surface-side prism unit.

(23) It is also possible to combine the configurations of Embodiment 13 with the configurations of Embodiments 9 and 10 such that both edges of the light-exiting surface-side prism unit are formed in a two-step incline in a plan view.

(24) It is also possible to combine the configurations of Embodiment 13 with the configurations of Embodiment 14 such that the portion of both edges, of the light-exiting surface-side prism unit, extending in the first direction are formed in a two-step incline in a plan view.

(25) It is also possible to combine the configurations of Embodiment 14 with the configurations of Embodiments 2, 9, and 10 such that the portion of both edges, of the light-exiting surface-side prism unit, extending in the first direction are formed in an incline in a plan view.

(26) It is also possible to combine the configurations of Embodiment 14 with the configurations of Embodiments 11 and 12 such that the portion of both edges, of the light-exiting surface-side prism unit, extending in the first direction are formed in an arc shape in a plan view.

(27) It is also possible to appropriately combine the configurations of Embodiments 9 to 14 with the configuration of Embodiment 17.

(28) Aside from the embodiments, it is possible to appropriately modify the specific index of refraction of the material forming the light guide plate.

(29) In the embodiments, a case was described in which a plurality of reflection units constituting the light emission reflection portion are arranged at an even interval along the first direction (arranged at an even pitch), but the present invention also includes an uneven pitch arrangement for the plurality of reflection units along the first direction. In such a case, it is preferable that the interval between adjacent reflection units be set so as to be gradually shorter from the light-receiving face towards the opposite edge face of the light guide plate, so as to mitigate uneven luminance.

(30) In the configuration of (29) (where a plurality of reflection units are arranged at an uneven pitch), it is possible to set the height of the plurality of reflection units so as to be uniform along the first direction.

(31) In the embodiments, the height of the reflection units of the light emission reflection portion was set to be less than the height of the opposite plate surface-side unit prisms of the opposite plate surface-side prism portion, but it is possible, for example, to set the height of the reflection units to be approximately the same height as the opposite plate surface-side unit prisms. Furthermore, it is possible to set the height of the reflection units to be greater than the height of the opposite plate surface-side unit prisms, and in such a case, the reflection units continuously extend along the entire length of the light guide plate in the second direction.

(32) Aside from the embodiments, it is possible to appropriately modify the specific cross-sectional shape of the reflection units of the light emission reflection portion. The cross-sectional shape of the reflection units can be an isosceles triangle, for example. Also, it is possible to modify the specific angle of each of the vertices of the reflection units with triangular cross-sections. Furthermore, specific values such as the height, width, and the interval in the first direction of the reflection units constituting the light emission reflection portion can be appropriately modified.

(33) In the embodiments above, only one prism sheet was included as an optical sheet, but it is possible to add other types of optical sheets (such as a diffusion sheet and a reflective type polarizing sheet). In addition, it is possible to provide a plurality of prism sheets.

(34) In the embodiments above, one LED substrate is provided along the light-receiving face of the light guide plate, but the present invention also includes an arrangement in which two or more LED substrates are disposed along the light-receiving face of the light guide plate.

(35) In the embodiments above, one short edge face of the light guide plate is the light-receiving face and an LED substrate was provided so as to oppose the light-receiving face, but a configuration in which a long edge face of the light guide plate is the light-receiving face and an LED substrate is provided so as to oppose the light-receiving face is also included in the present invention. In such a case, the extension direction of the light-exiting side unit prisms, the bow-shaped portions, the light-exiting surface-side prism units, and the opposite plate surface-side unit prisms would be set to match the shorter side direction of the light guide plate, and the width direction (alignment direction) of the light-exiting side unit prisms, the bow-shaped portions, the light-exiting surface-side prism units, and the opposite plate surface-side unit prisms would be set to match the longer side direction of the light guide plate.

(36) Besides what was described in (35), the present invention also includes a configuration in which the pair of long edge faces of the light guide plate are both set as light-receiving faces with a pair of LED substrates facing the light-receiving faces, respectively.

(37) In the embodiments, the light guide plate is described as being rectangular, but the light guide plate may be square. In addition, the light guide plate need not necessarily be a perfect rectangle, and cutouts may be formed in portions of the outer edges.

(38) In the embodiments, top-emitting type LEDs were used, but the present invention can also be applied to a configuration using side-emitting type LEDs in which side faces that are adjacent to the mounting surface by which the LEDs are mounted onto the LED substrate is the light-emitting surface.

(39) In the embodiments above, the touch panel pattern on the touch panel was of a projected capacitive type, but besides this, the present invention can be applied to a surface capacitive type, a resistive film type, an electromagnetic induction type touch panel pattern, or the like.

(40) Instead of the touch panel in the embodiments above, a parallax barrier panel (switching liquid crystal panel) may be formed, the parallax barrier panel having a parallax barrier pattern for allowing a viewer to see a three dimensional image (3D image) by separating by parallax images displayed in the display surface of the liquid crystal panel. In addition, it is possible to have both a parallax barrier panel and a touch panel.

(41) It is also possible to form a touch panel pattern on the parallax barrier panel in (40) such that the parallax barrier panel doubles as a touch panel.

(42) In the embodiments above, the display size of the liquid crystal panel used in the liquid crystal display device is approximately 20 inches, but the specific display size of the liquid crystal panel can be appropriately modified to a size other than 20 inches. In particular, if the display size is only a few inches, it is suitable to be used in electronic devices such as smartphones.

(43) In the respective embodiments above, the colored portions of the color filters provided in the liquid crystal panel included the three colors of R, G, and B, but it is possible for the colored portions to include four or more colors.

(44) In the respective embodiments above, LEDs were used as the light source, but other types of light sources such as organic EL elements may also be used.

(45) In the embodiments above, the frame is made of metal, but can also be made of a synthetic resin.

(46) In the respective embodiments above, the cover panel is made of tempered glass that is tempered by being chemically strengthened, but a tempered glass that is strengthened by air cooling (physical strengthening) naturally can be used.

(47) In the respective embodiments above, a tempered glass being used as the cover panel was shown as an example, but an ordinary glass material (non-tempered glass) or a synthetic resin can also be used.

(48) In the respective embodiments above, a cover panel is used on the liquid crystal display device, but the cover panel can be omitted. Similarly, the touch panel can also be omitted.

(49) In the embodiments above, TFTs are used as the switching elements in the liquid crystal display device, but the present invention can be applied to a liquid crystal display device that uses switching elements other than TFTs (thin film diodes (TFD), for example), and, besides a color liquid crystal display device, the present invention can also be applied to a black and white liquid crystal display device.

DESCRIPTION OF REFERENCE CHARACTERS

10 liquid crystal display device (display device)
11 liquid crystal panel (display panel)
11*a*, 11*b* substrate
12 backlight device (illumination device)
17, 1617 LED (light source)
19, 119, 219, 319, 419, 519, 619, 719, 819, 919, 1219, 1319, 1419, 1619 light guide plate
19*a*, 119*a*, 219*a*, 319*a*, 419*a*, 519*a*, 619*a*, 819*a*, 919*a*, 1219*a*, 1319*a*, 1419*a*, 1619*a* light-exiting surface
19*b*, 119*b*, 319*b*, 419*b*, 519*b*, 619*b*, 819*b*, 919*b*, 1319*b*, 1619*b* light-receiving face
19*c*, 119*c*, 219*c*, 319*c* opposite plate surface (plate surface)
19*d*, 119*d*, 319*d*, 419*d*, 519*d*, 619*d*, 819*d*, 919*d*, 1319*d* non-light-receiving opposite face
19*e*, 1619*e* non-light-receiving side face (pair of edge faces not including light-receiving face)
41, 141, 1441 light emission reflection portion
41*a*, 1441*a* reflection unit
42, 1542 prism sheet (light-exiting side anisotropic light focusing member)
42*a*, 1542*a* light-exiting side unit prism (light-exiting side unit light focusing unit)
43, 143, 243, 343, 543, 643, 743, 1643 light-exiting surface-side prism portion (light-exiting surface-side anisotropic light focusing prism portion)
43*a*, 143*a*, 243*a*, 343*a*, 443*a*, 543*a*, 643*a*, 843*a*, 943*a*, 1043*a*, 1143*a*, 1243*a*, 1343*a*, 1443*a*, 1643*a* light-exiting surface-side prism unit 43a1, 143a1, 443a1, 543a1 inclined surface
43a2, 143a2, 243a2, 343a2 vertex portion
44, 144 opposite plate surface-side prism portion (opposite plate surface-side anisotropic light focusing portion)
44a, 144a opposite plate surface-side unit prism (opposite plate surface-side unit light focusing unit)
45, 145, 245, 345, 445, 545, 645, 745, 845, 945, 1045, 1145, 1245, 1345, 1445, 1645 bow-shaped portion
45a, 145a, 545a, 1245a one edge
45b, 145b, 245b, 445b, 545b other edge
46, 346, 546, 646 flat portion
643aA first light-exiting surface-side prism unit
643aA2 vertex portion
643aB, 743aB second light-exiting surface-side prism unit
643aB2, 743aB2 vertex portion
645A first bow-shaped portion (bow-shaped portion)
645B second bow-shaped portion (bow-shaped portion)
θv1 vertex angle of light-exiting side unit prism 42a
θv2 vertex angle of light-exiting surface-side prism unit 43a

What is claimed is:

1. An illumination device, comprising:
a light source;
a light guide plate having a rectangular plate shape, a light-receiving face formed from at least one of a pair of edge faces forming opposing sides among outer edge faces of the light guide plate and into which light emitted by the light source is radiated, a light-exiting surface formed from one plate surface of the light guide plate and from which light exits, and an opposite plate surface formed from another plate surface of the light guide plate; and
a light-exiting side anisotropic light focusing member disposed on a light-exiting side of the light guide plate, the light-exiting side anisotropic light focusing member being formed by arranging a plurality of light-exiting side light focusing units that extend along a first direction in a second direction, the first direction being parallel to a pair of edge faces of the light guide plate that do not include the light-receiving face, and the second direction being perpendicular to the first direction,
wherein the light guide plate further includes:
a light-exiting surface-side anisotropic light focusing prism that is disposed in the light-exiting surface of the light guide plate, and that is formed by arranging a plurality of light-exiting surface-side light focusing prism units, extending in the first direction, along the second direction;
a light emission reflection portion that is disposed in the opposite plate surface of the light guide plate and that is formed by arranging a plurality of reflection units, extending in the second direction, along the first direction with gaps therebetween;
an opposite plate surface-side anisotropic light focusing portion that is disposed in the opposite plate surface of the light guide plate, and that is formed by arranging a plurality of opposite plate surface-side light focusing units, extending in the first direction, along the second direction; and
bow-shaped portions that are arranged adjacent in the second direction to the light-exiting surface-side prism units in the light-exiting surface of the light guide plate, and that extend in the first direction and have a bow shaped cross-section in the second direction, and
wherein the light-exiting surface-side prism units and the bow-shaped portions are arranged such that, with respect to proportions occupied by each in the light-exiting surface in the second direction, the proportion occupied by the light-exiting surface-side prism units is low and the proportion occupied by the bow-shaped portions is high in areas close to the light-receiving face in the first direction, whereas the proportion occupied by the light-exiting surface-side prism units is high and the proportion occupied by the bow-shaped portions is low in areas far from the light-receiving face in the first direction.

2. The illumination device according to claim 1, wherein the light-exiting surface-side prism units and the bow-shaped portions are arranged such that the proportion in the light-exiting surface occupied by the light-exiting surface-side prism units gradually and continuously increases farther away from the light-receiving face in the first direction, whereas the proportion in the light-exiting surface occupied by the bow-shaped portions gradually and continuously decreases farther away from the light-receiving face in the first direction.

3. The illumination device according to claim 2,
wherein, in the light guide plate, one of the pair of edge faces that are opposite sides among the outer edge faces is the light-receiving face, whereas another of the pair of edge faces is a non-light-receiving opposite face into which light from the light source is not radiated, and
wherein the light-exiting surface-side prism units and the bow-shaped portions are arranged such that, from the light-receiving face to the non-light-receiving opposite face in the first direction, the proportion in the light-exiting surface occupied by the light-exiting surface-side prism units gradually and continuously increases, whereas the proportion in the light-exiting surface occupied by the bow-shaped portions gradually and continuously decreases.

4. The illumination device according to claim 2, wherein the proportion in the light-exiting surface occupied by the light-exiting surface-side prism units is 100% of the light-exiting surface in portions farthest from the light-receiving face in the first direction.

5. The illumination device according to claim 2, wherein the bow-shaped portions are arranged such that a width and a height of the light-exiting surface-side prism units gradually and continuously increase farther away from the light-receiving face in the first direction, whereas vertex angles of the bow-shaped portions remain the same.

6. The illumination device according to claim 1, wherein the bow-shaped portions are arranged such that one edge in the second direction is continuous with an inclined surface of the light-exiting surface-side prism unit, whereas another edge in the second direction is at a lower position than said one edge.

7. The illumination device according to claim 1, wherein the light-exiting surface of the light guide plate is provided with flat portions that are flat along the first direction and the second direction, and that are disposed so as to be adjacent to the bow-shaped portions in the second direction.

8. The illumination device according to claim 1,
wherein a plurality of said light-exiting surface-side prism units forming the light-exiting surface-side anisotropic light focusing prism portion include a first light-exiting surface-side prism unit having a vertex portion, and a second light-exiting surface-side prism unit having a vertex portion, the vertex portion of the first light-exiting surface-side prism unit being lower than the vertex portion of the second light-exiting surface-side prism unit, and wherein a gap is present between the first light-exiting surface-side prism unit and the light-exiting side anisotropic light focusing member.

9. The illumination device according to claim 8, wherein the bow-shaped portions are interposed between the first light-exiting surface-side prism units and the second light-exiting surface-side prism units in the second direction.

10. The illumination device according to claim 8, wherein the first light-exiting surface-side prism units and the second light-exiting surface-side prism units are arranged such that a proportion occupied by both in the light-exiting surface in the second direction gradually and continuously increases farther away from the light-receiving face in the first direction.

11. The illumination device according to claim 1, wherein the light-exiting surface-side prism units and the bow-shaped portions both occupy, along an entire length of the light guide plate in the first direction, the same proportions in the light-exiting surface in the second direction.

12. A display device, comprising:
the illumination device according to claim 1; and
a display panel that performs display using light from the illumination device.

13. The display device according to claim 12, wherein the display panel is a liquid crystal panel including a pair of substrates with liquid crystal sealed therebetween.

* * * * *